July 18, 1950 H. AHO 2,515,387

INFORMATION INDICATING SYSTEM

Filed April 15, 1947 21 Sheets-Sheet 1

INVENTOR.
HJALMAR AHO
Hjalmar Aho

INFORMATION INDICATING SYSTEM

Filed April 15, 1947 21 Sheets-Sheet 2

INVENTOR.
HJALMAR AHO
Hjalmar Aho

July 18, 1950 H. AHO 2,515,387

INFORMATION INDICATING SYSTEM

Filed April 15, 1947 21 Sheets-Sheet 3

INVENTOR.
HJALMAR AHO
Hjalmar Aho

INVENTOR.
HJALMAR AHO
Hjalmar Aho

July 18, 1950 H. AHO 2,515,387

INFORMATION INDICATING SYSTEM

Filed April 15, 1947 21 Sheets-Sheet 5

INVENTOR.
HJALMAR AHO
Hjalmar Aho

INVENTOR.
HJALMAR AHO
Hjalmar Aho

INVENTOR.
HJALMAR AHO
Hjalmar Aho

INVENTOR.
HJALMAR AHO
Hjalmar Aho

INVENTOR.
HJALMAR AHO
Hjalmar Aho

INVENTOR.
HJALMAR AHO
Hjalmar Aho

INFORMATION INDICATING SYSTEM

Filed April 15, 1947 21 Sheets-Sheet 11

INVENTOR.
HJALMAR AHO
Hjalmar Aho

INVENTOR.
HJALMAR AHO
Hjalmar Aho

INFORMATION INDICATING SYSTEM

Filed April 15, 1947 21 Sheets-Sheet 13

INVENTOR.
HJALMAR AHO
Hjalmar Aho

July 18, 1950 H. AHO 2,515,387

INFORMATION INDICATING SYSTEM

Filed April 15, 1947 21 Sheets-Sheet 14

INVENTOR.
HJALMAR AHO
Hjalmar Aho

INFORMATION INDICATING SYSTEM

INVENTOR.
HJALMAR AHO
Hjalmar Aho

INVENTOR.
HJALMAR AHO
Hjalmar Aho

INFORMATION INDICATING SYSTEM

INVENTOR.
HJALMAR AHO
Hjalmar Aho

July 18, 1950 H. AHO 2,515,387

INFORMATION INDICATING SYSTEM

Filed April 15, 1947 21 Sheets-Sheet 18

INVENTOR.
HJALMAR AHO
Hjalmar Aho

July 18, 1950 H. AHO 2,515,387

INFORMATION INDICATING SYSTEM

Filed April 15, 1947 21 Sheets-Sheet 19

INVENTOR.

HJALMAR AHO

Hjalmar Aho

July 18, 1950 H. AHO 2,515,387

INFORMATION INDICATING SYSTEM

Filed April 15, 1947 21 Sheets-Sheet 20

INVENTOR.
HJALMAR AHO
Hjalmar Aho

INVENTOR.
HJALMAR AHO
Hjalmar Aho

Patented July 18, 1950

2,515,387

UNITED STATES PATENT OFFICE 2,515,387

INFORMATION INDICATING SYSTEM

Hjalmar Aho, New York, N. Y.

Application April 15, 1947, Serial No. 741,671

18 Claims. (Cl. 177—353)

Figure 1:
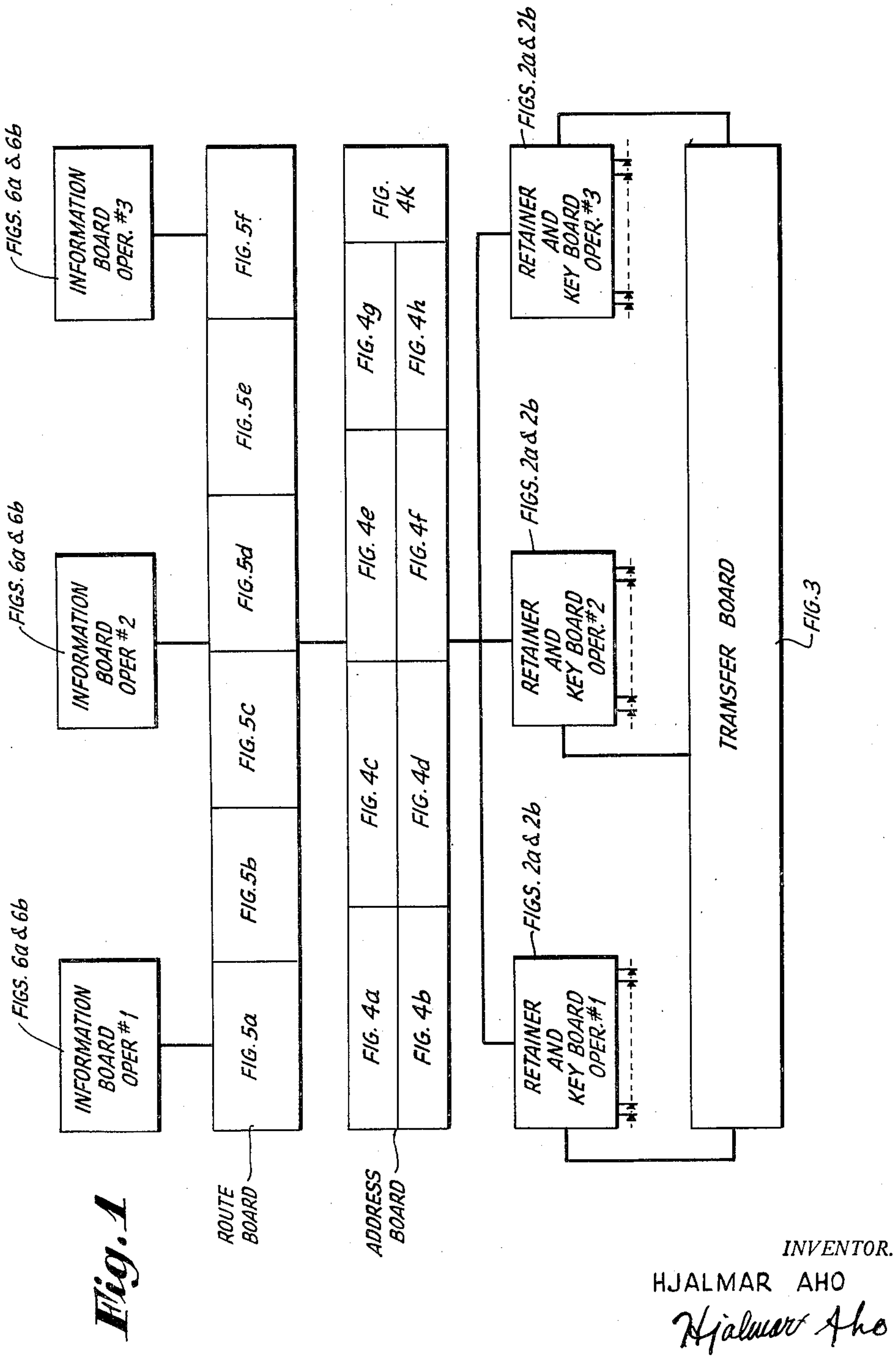

This invention relates to an electrically operated information indicating system, and more particularly to a keyboard-operated route indicating system by means of which information concerning the travel route between a point of departure and a point of arrival may be indicated quickly and efficiently.

The invention aims to provide a new type of service for telephone subscribers and others who may wish to know the shortest and quickest (or most expedient) travel route from a particular point or station of departure to a particular point or station of arrival. The travel route may be by public conveyance, such as street car, subway, elevated car, and bus, or by private vehicle. The subscriber need only pass his request for such information over the telephone line to the telephone operator at a central office, who, in turn, will depress the keys of her keyboard and set up the addresses corresponding to the point of departure and point of arrival. The system of the invention will then quickly and automatically establish, and then indicate on a special information board the route of travel including all necessary transfer points to be taken between terminal stations. The route indication may remain displayed for more or less temporary intervals on the information board in accordance with the wishes of the operator, who can restore those portions of the system which do not automatically restore themselves to normal merely by operating a key. In this way any person having access to a telephone can quickly obtain information concerning the exact travel route to be taken between any two points in a large city or town, or within suburban areas, or between towns, cities, etc. In practice, the waiting period for a subscriber to receive the desired information after he has passed along his question to the operator, may be of the order of 10 seconds.

Accordingly, a primary object of the present invention is to provide a system so designed that upon designation of a pair of geographically spaced localities, there will be automatically displayed the information necessary to travel between these localities.

Another object of the invention is to provide a keyboard-operated information indicating system which, in response to the action of an operator in typing out a point of departure location and a point of arrival location, automatically indicates the route of travel to be taken between these two points.

A further object is to provide a system of the foregoing type which enables a plurality of operators to work at the same time and utilize common equipment in furnishing travel route information to different calling subscribers, with a minimum of interference with one another.

The invention is hereinafter described with particular reference to a system furnishing public conveyance travel route information for a city as large as New York city, but it should be distinctly understood that the principles are equally applicable to a system which supplies travel route information for terminal points located within a town, or a suburban area, or between towns and cities, whether the mode of travel is by public conveyance or private vehicle.

Briefly stated, the system of the invention includes five important circuits: first, the keyboard and Retainer circuit; second, the Transfer circuit; third, the Address Board; fourth, the Route Board; and fifth, the Information Board.

The keyboard may be somewhat similar to that used on a conventional typewriter and enables the operator to set up the point of departure address or location and in the point of arrival address or location. The keys on the keyboard are, in effect, electrical switches which operate the Retainer part of the circuit. The Retainer functions to store information corresponding to the terminal locations set up by the operator.

The Address Board receives the information stored on the Retainer and operates specific circuits corresponding to the localities set up on the operator's keyboard and the general areas surrounding these localities, and conditions the Route Board to establish circuits which are assigned to these specific localities and areas.

The Route Board establishes the desired travel route and transmits the specific information to the Information Board which, in turn, displays this information.

There are provided as many Information Boards and keyboard-Retainer circuits as there are operators' positions. Each operator has assigned to her position a particular keyboard-Retainer circuit and a particular Information Board. The Transfer Circuit Board and the Route Board, however, are used in common for all operators.

The Transfer circuit permits the Retainer of only the first of several operators setting-up their respective terminal addresses in close time sequence to seize the Address Board for a time interval sufficient to pass along the information stored on the Retainer, and to enable the Route Board to establish the desired locations. A non-interfering or interlocking arrangement in the Transfer circuit enables the different Retainers to sequentially empty the stored terminal address information into the common Address Board.

Figure 2A:
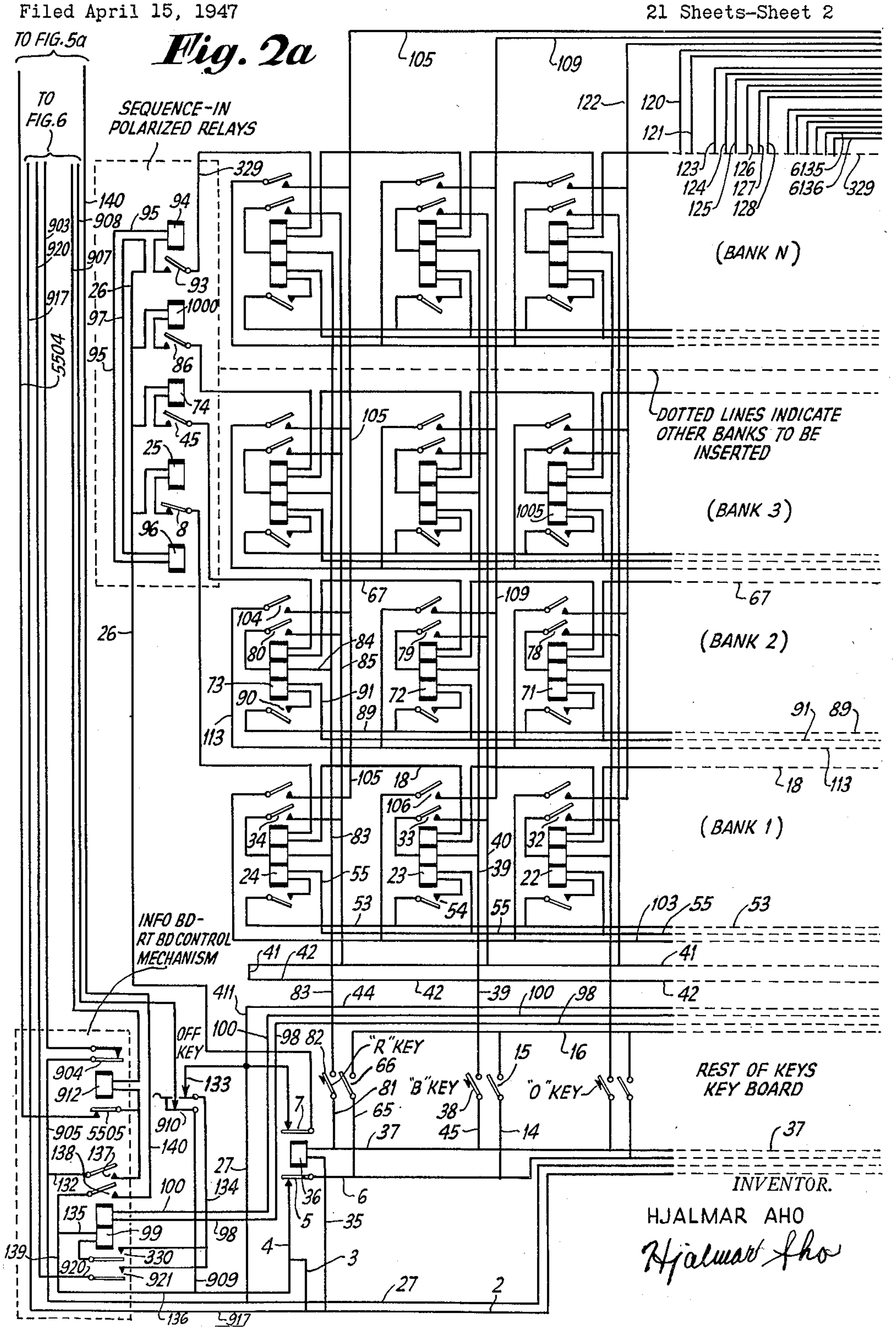
Figure 2B:
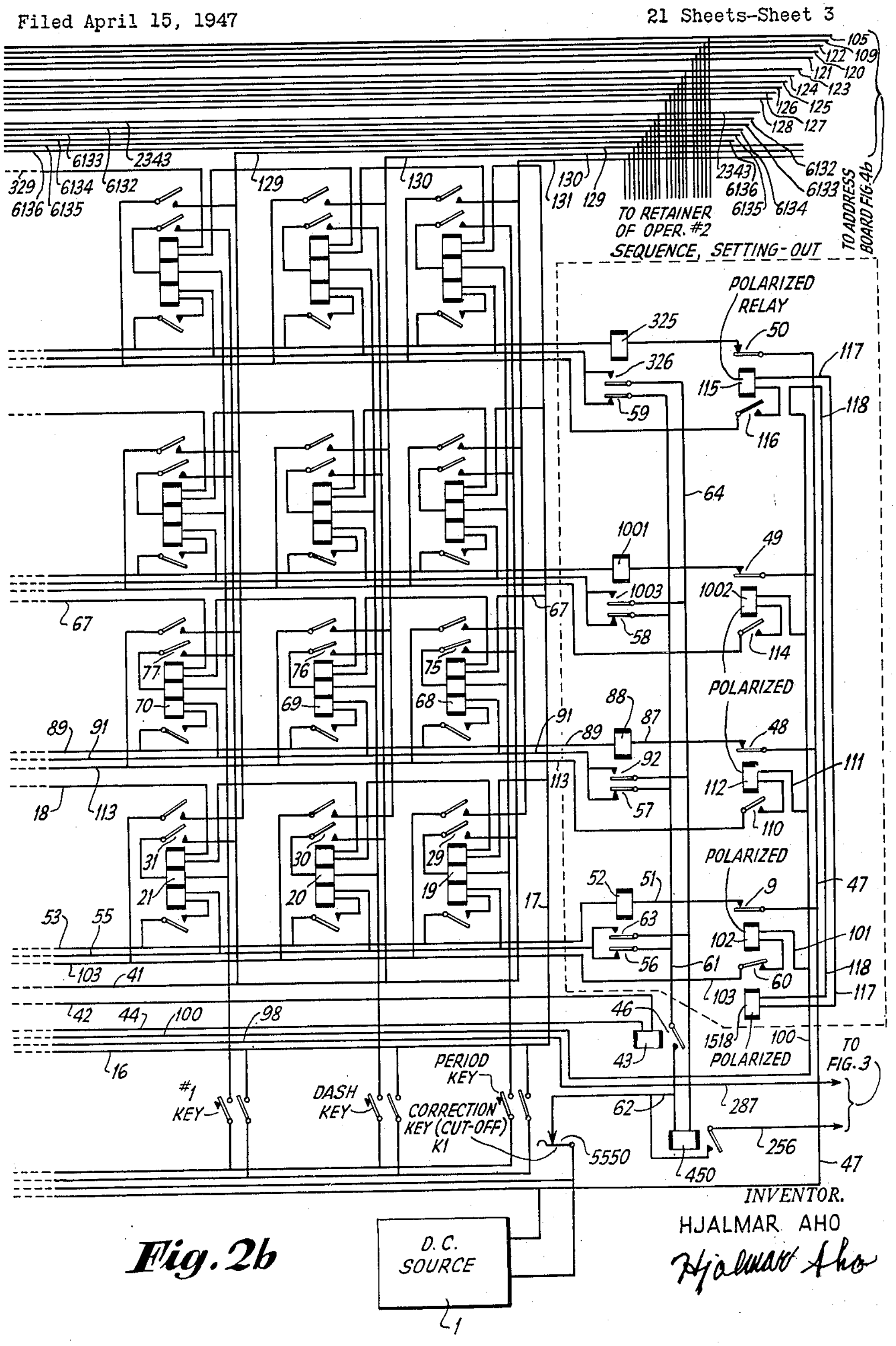
Figure 3:
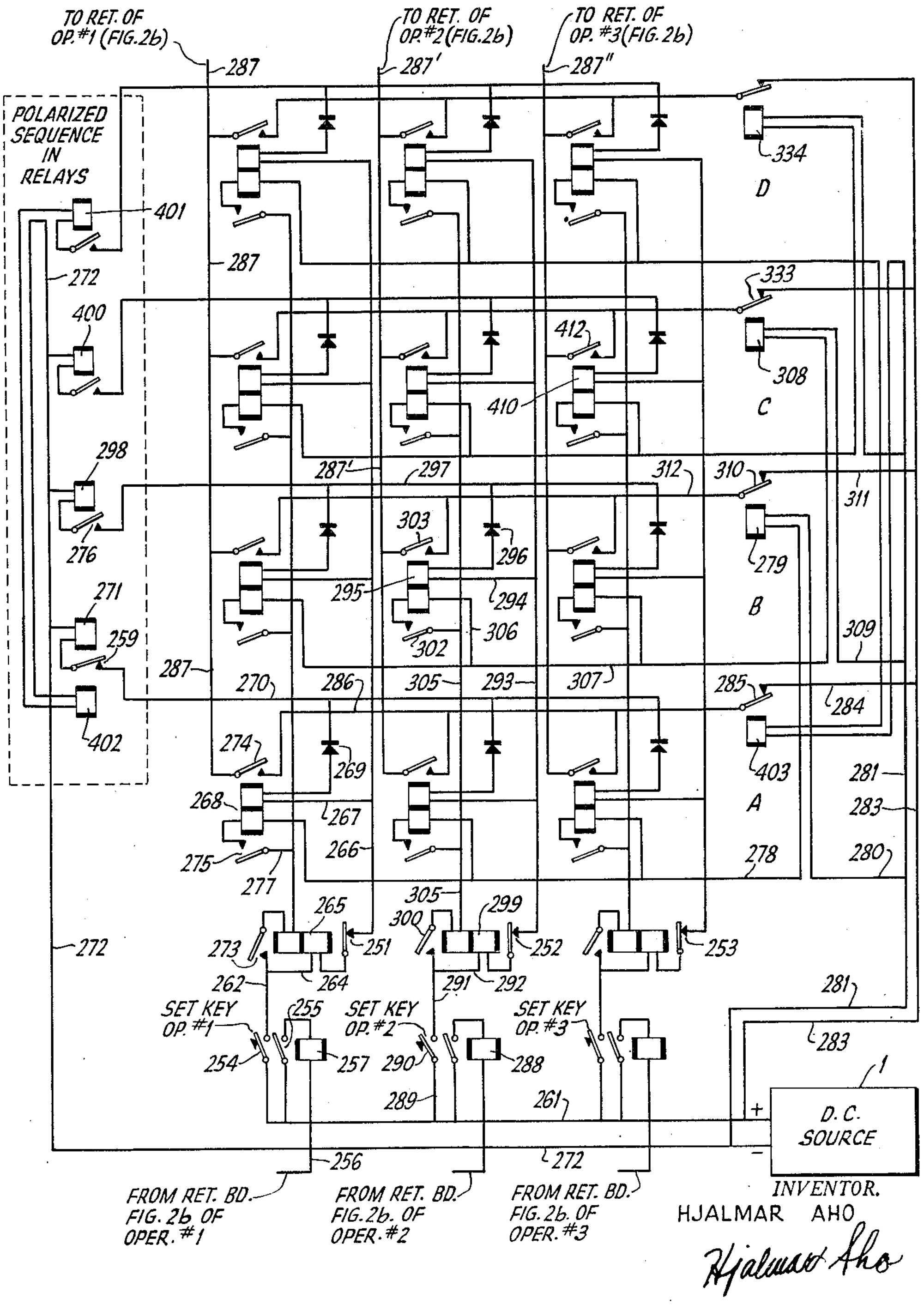

A more detailed description of the invention follows in conjunction with drawings, wherein:

Fig. 1 shows in box form the general arrangement of the essential elements of a complete route indicating system in accordance with the principles of the invention. In this figure the arrangement of the sheets of Figs. 4*a* to 4*k* and Figs. 5*a* to 5*f* is also shown;

Figs. 2*a* and 2*b* together show the circuit details of the keyboard-operated Retainer circuit;

Fig. 3 shows the Transfer circuit which controls the exact time at which the information stored on a Retainer circuit is passed along to the Address Board;

Figs. 4*a* to 4*k* together show the circuit details of the Address Board;

Figs. 5*a* to 5*f* show the circuit details of the Route Board, and

Figure 6A:
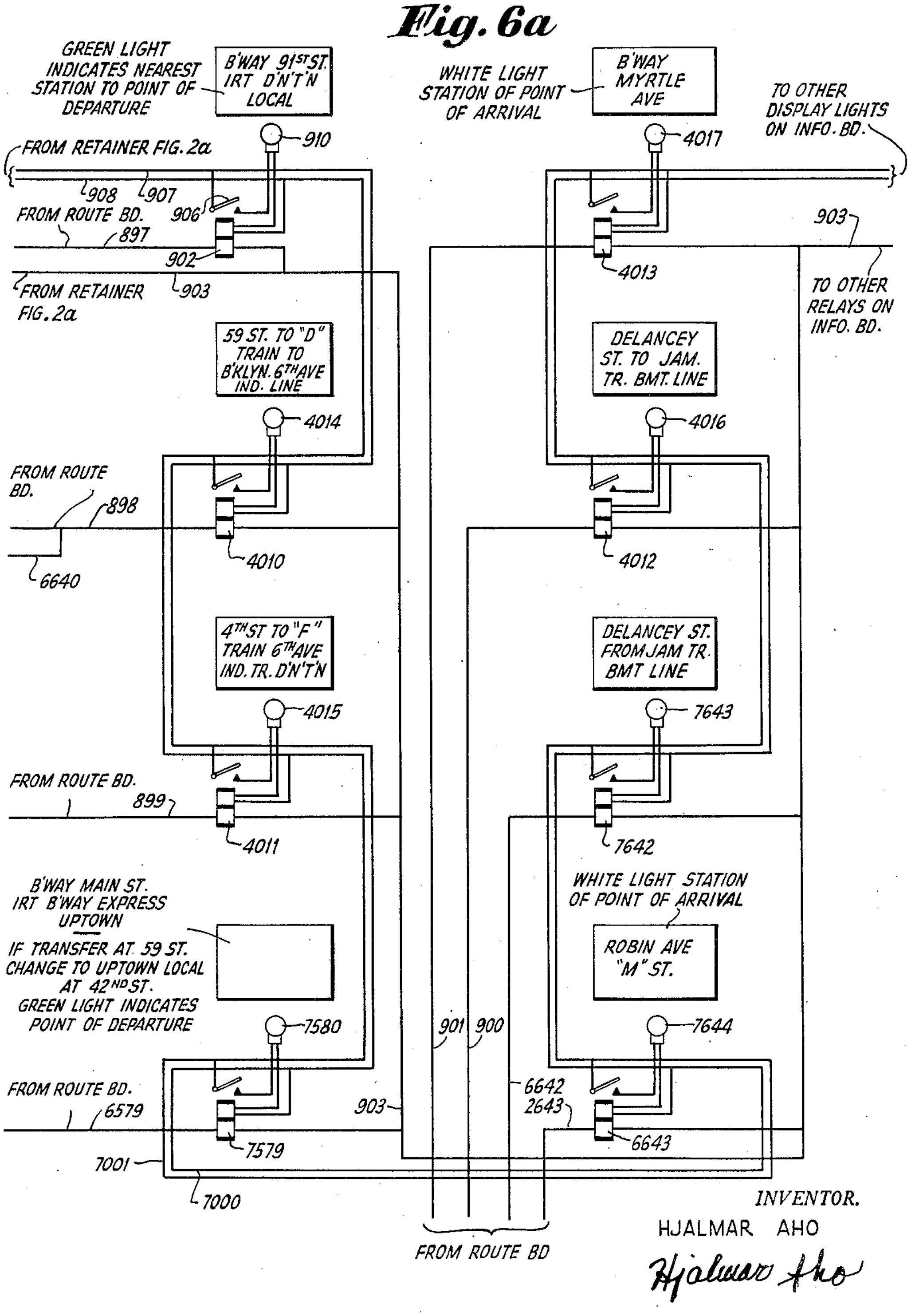
Figure 6B:
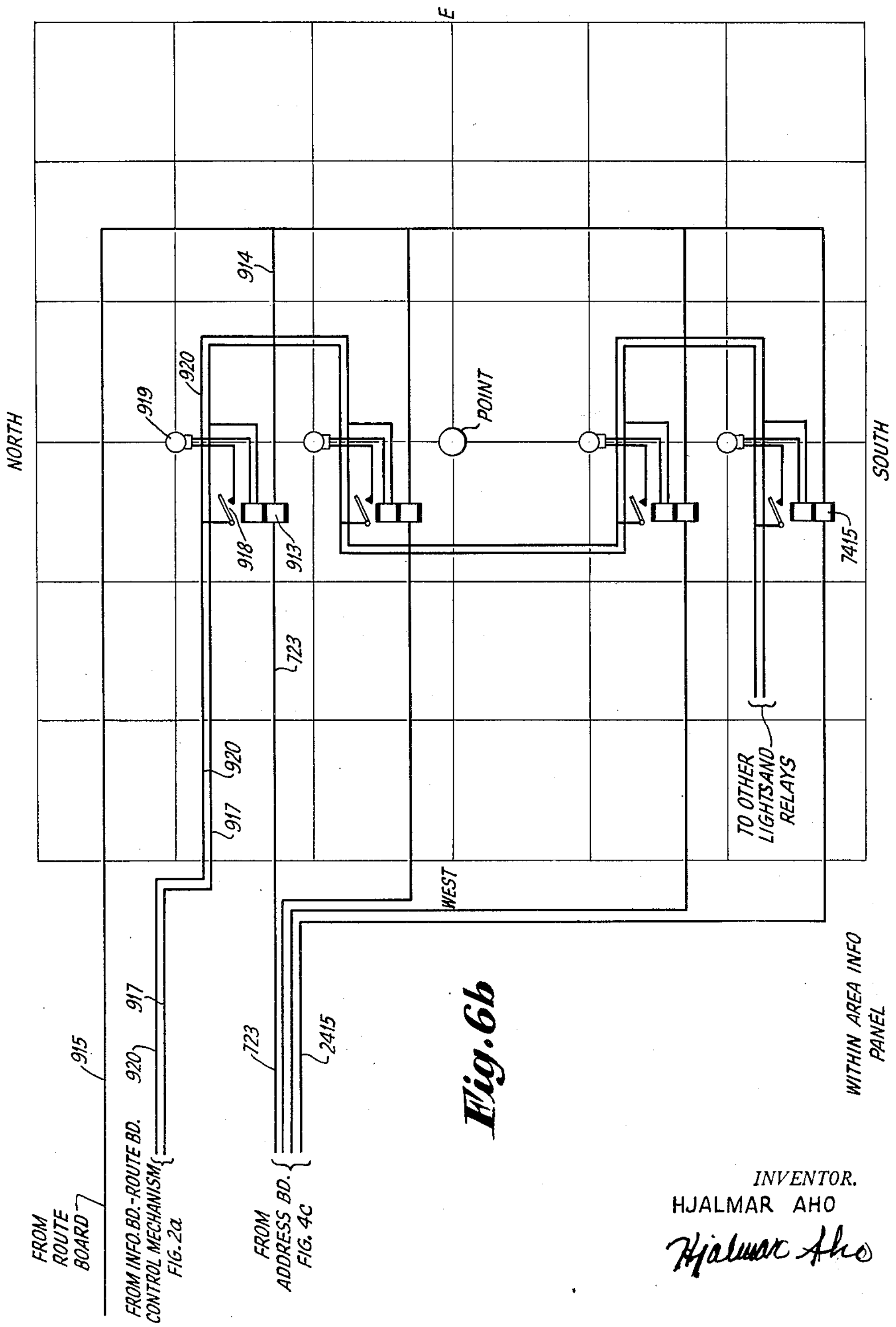

Figs. 6*a* and 6*b* together show the circuit details of the Information Board.

Throughout the figures of the drawings, the same parts are represented by the same reference characters.

*General features of system*

Fig. 1 diagrammatically shows the system of the invention equipped for three operators' positions, located at a central office. Obviously, any number of operators' positions may be employed from one upward without departing from the principles herein described. Each box in Fig. 1 is descriptively labeled and designated by a figure number which corresponds to that figure in the drawings which illustrates the circuit details thereof.

Each operator has her own individual Retainer and keyboard. The keyboard is used by the operator to type up the information as to point of departure and point of arrival. Thus, assuming there are three operators, there are shown three Retainers and keyboards.

There is a single Transfer circuit which is common to the entire system. In this Transfer circuit there is a set-key for each operator. When an operator depresses her set-key, a pulse is passed from the Transfer circuit through the particular Retainer and keyboard circuit permanently assigned to that operator, and this pulse causes the information which is stored on the Retainer to flow into the Address Board in the form of impulses. The Transfer circuit is so arranged that only one operator at a time can operate her Retainer so as to pass on to the common Route Board the information stored on her Retainer. An interlocking system in the Transfer circuit enables the different Retainers to pass in sequence the information stored on their respective circuits onto the Address Board, but the Address Board does not receive information from any one Retainer until it, the Address Board, has cleared through to the Route Board the locations as to areas of points of departure and arrival obtained from a preceding Retainer circuit and has also cleared through to the Information Board the within area information.

The Address Board receives the address information passed along to it by the Retainer and operates specific circuits which correspond to specific localities and areas, and conditions the Route Board to set up circuits which are assigned to these specific localities and areas.

The Route Board performs three functions in the following order: (1) It sets up the points of departure and arrival under the control of the Address Board; (2) It then selects the desired travel route in accordance with the information as to point of departure and point of arrival passed along to it by the Address Board; and (3) It then transmits the specific information determined by the set-up of the travel route to a particular Information Board which is permanently assigned to the particular operator desiring this information.

There are as many Information Boards as there are operators; in this case, three such boards for the assumption that there are three operators. The Information Board produces indications representative of the precise travel route to be followed from the point of departure to the point of arrival. These indications inform the operator of the mode of travel; that is the type of conveyance to be used (whether subway, bus, street car or elevated line, etc.); the terminal stations on this mode of travel, the locations of transfer or interconnecting points, and also the exact route to be followed to reach a specific address from a terminal station. In the system described herein, lamps of different colors are employed on the Information Board to highlight or differentiate the different types of information presented thereon.

*Keyboard-operated retainer*

The Retainer circuit for each operator is shown in Fig. 2 and includes a keyboard which has keys for all letters of the alphabet, keys for all numbers, special keys designating special districts like Manhattan, Bronx, Brooklyn, Queens, etc., keys having designations such as Avenue, Street, Road, Boulevard, East, West, South, North, etc., and other keys which distinguish between an address number and a numbered thoroughfare. For example, the number 100 may designate a house on a particular strees or might be 100th Street. The keyboard will also have keys designating a period and a dash. The dash is used to separate the parts of an intersection, thus Broadway—91st Street and also to separate the address number from the thorofare. The period is used to separate the terminal point of departure address from the terminal point of arrival address.

In the following description, the point of departure will be typed up first on the keyboard and then followed by the point of arrival, both of which are addresses used by the subscriber in requesting information concerning a route of travel therebetween.

A keyboard may have as many as 45 different keys, and the number of these keys may vary with different localities to be serviced. The larger the city or town to be serviced, the greater will be the number of keys required in comparison to that required for a smaller city or town, as a general rule.

The Retainer also includes a group of sequence-in relays shown within a dashed line box appropriately labeled, a group of sequence setting and sequence out relays shown within another dashed line box appropriately labeled, a series of banks of relays 1, 2, 3—etc., and an Information Board-Route Board control mechanism shown within a dashed line box and appropriately labeled. The Retainer is also provided with a correction key and an "off" key.

Only several of the keys of the keyboard are shown for the purpose of explaining the operation of the Retainer. These keys are the letter keys R, B, O, the numeral key 1, and the dash and period symbol keys.

Only several banks of relays have been shown, but it should be understood that there are as many banks of relays as the largest number of letters necessary to set up the greatest number of combinations which include the address or locality constituting the point of departure and the address or locality constituting the destination or point of arrival.

Each bank of relays is used to store a letter or symbol when a key on the keyboard is depressed by the operator. The banks of relays operate sequentially to store sequentially appearing letters or symbols.

The function of the sequence-in relays and the sequence setting-out relays is to establish a circuit for enabling the relays in the banks to operate sequentially. There are as many sequence-in and sequence-out relays plus one, as there are banks of relays in the Retainer. There are as many sequence setting relays as there are banks of relays in the Retainer.

The depression of a key on the keyboard causes a new relay in the sequence-in group to operate and a new relay in the following bank of relays to operate, as well as a new relay in the sequence setting-out group to operate, as will appear in more detail hereinafter. When the last sequence-in relay of the group is operated, corresponding to the uppermost relay shown in the group of sequence-in relays, it will operate over a circuit which includes the winding of the first (lowermost) setting-in relay, thus setting up a connection for the commencement of a new cycle of operations.

The sequence-in relays are polarized relays and are identified as 96, 25, 74, 1000 and 94. Relays 96 and 25 both control the position of the armature of contacts 8 located between them, depending upon which one of these relays has last been energized to pull the armature of contacts 8 up or down. The armature will remain in the position to which it is last drawn (closed or open) until an opposing force pulls it to its other position (open or closed). Thus this particular armature is responsive to both relays 96 and 25. Similarly, relays 25 and 74 both control the position of the armature of contacts 45, depending upon which relay has last been energized. Similarly, polarized relays 74 and 1000 both control the position of the armature of contacts 86, depending upon which one of these relays has last been energized. Similarly, polarized relays 1000 and 94 both control the position of the armature of contacts 93, depending upon which one of these relays has last been energized. Only one set of contacts in this group of sequence-in relays will be closed at any one time.

The box of relays designated sequence setting-out relays includes a group of sequence setting relays 325, 1001, 88, and 52, and also a group of polarized sequence-out relays 115, 1001, 112, 102 and 1518. Polarized relay 115 controls the two sets of contacts 116 and 50. Polarized relay 1002 controls three sets of contacts 116, 49 and 114. Contacts 49 are located between these relays. Contacts 116 are also located between these relays and its open or closed position depends upon which one of these relays is energized. Stated otherwise, the armature of contacts 116 is responsive to the magnetic forces produced by the relays 115 and 1002 when they are respectively energized. Polarized relay 115 also opens the armature of contacts 50 when it is energized. Similarly, polarized relays 1002 and 112 both control the positions of the armature of contacts 114. Similarly, polarized relays 112 and 102 both control the position of the armature of contacts 110. Similarly, polarized relays 102 and 1518 both control the position of the armature of contacts 60. The springs on the armatures of contacts 50, 49, 48 and 9 serve to return these armatures to their closed positions when the energizing current is removed from the relays which selectively control them. The first and last polarized relays 115 and 1518 of the sequence out relays are in series in a manner similar to the windings of the first and last polarized sequence-in relays 94 and 96.

Each of the sequence setting relays 325, 1001, 88 and 52 has two pairs of contacts one of which has a spring on the armature thereof tending to close this one pair of contacts and oppose the energizing force of its respective relay. When relay 52 is de-energized, contacts 56 will be closed while contacts 63 will be opened. Similarly, when relay 88 is de-energized, contacts 57 will be closed and contacts 92 opened. When relay 1001 is de-energized, contacts 58 will be closed and contacts 1003 opened. When relay 325 is de-energized, contacts 59 will be closed and contacts 326 opened.

Contacts 63 of relay 52 close before contacts 56 open relay 52 is energized. Contacts 92 of relay 88 close before contacts 57 open when relay 88 is energized. Contacts 1003 of relay 1001 close before contacts 58 open when 1001 is energized. Contacts 326 of relay 325 close before contacts 59 open when relay 120 is energized. The reason for this is to permit the locking-up circuit for these relays to close before the operating path for the same relay is opened.

Before proceeding with the description of the operation of the Retainer, let it be assumed that the point of departure address is Broadway, Manhattan—91 Street Manhattan and the point of arrival address is Broadway Brooklyn—919 (where 919 is the street number. It should be noted that the addresses may include the names of two intersecting streets, in addition to symbols indicating the region and other symbols indicating the type of thorofare. The period symbol is employed to separate the point of departure address from the point of arrival address.

In the neutral position of the Retainer and keyboard, in which this circuit is ready to receive the terminal addresses, all relays on the Retainer are unenergized and the contacts are in the positions shown in Fig. 2. Only one polarized relay in the sequence-in relay will be operated and therefore one set of contacts will be closed in the group of polarized sequence-in relays, while all other contacts of the sequence-in relays will be open. Let it be assumed that contacts 8 of the polarized sequence-in relays and contacts 60 of the sequence-out relays are now closed.

The operator first types up the point of departure address as received by her over the telephone from an inquiring subscriber. The first letter key depressed on the keyboard is key B. The actuation of this key B closes a circuit over a path from the positive terminal of D. C. source 1, lead 2, lead 3, lead 4, closed contacts 5 of relay 36, lead 6, lead 14, contact points 15 of key B, lead 16, lead 17, lead 18, one winding of each of relays 19, 20, 21, 22, 23, 24, in series and one winding of each of the remaining relays (not shown) of relay bank 1 (all of which are connected in series by lead 18), thru closed contacts 8 of the sequence-in relays, the winding of polarized sequence-in relay 25, lead 26, closed contacts 7 of relay 36, lead 27, to the negative terminal of D. C. source 1, thus energizing and operating polarized relay 25 and the relays in bank 1.

The operation of the relays 19, 20, 21, 22, 23, 24, closed all their respective contacts 29, 30, 31, 32, 33 and 34. Similarly, the operation of the other relays, not shown, of this same bank 1 causes the closure of the correspondingly positioned contacts.

The operation of these relays completes a path from the positive terminal of source 1, over lead 2, lead 35, the winding of relay 36, lead 37, lead 45, thru closed contacts 38 of key B, lead 39, through another winding of relay 23, the closed contacts 33, lead 40, lead 41, lead 42, the winding of relay 43, lead 44, lead 411, lead 27, to the negative terminal of D. C. source 1, thus operating relays 36 and 43.

The operation of sequence-in relay 25, causes it to close contacts 45 and open its own operating circuit at contacts 8. The closure of contacts 45 closes a potential circuit for the later operation of the relays in bank 2.

The operation of relay 36, causes it to open contacts 7 and 5, thus opening the operating circuit for all of the relays of bank 1. The opening of contacts 7 at this time while key B is still depressed prevents the operation of the relays in bank 2 and avoids the storage of the same symbol or indicia on two banks with one depression of the key. The opening of the operating circuit of the relays of bank 1 causes all of these relays to fall back except relay 23 which is kept energized by the flow of current in the circuit through the other (last-mentioned) winding of relay 23.

Relay 36 is a fast operating relay compared to relay 43. Relay 43 closes its contacts 46 after all of the relays in bank 1, except relay 23, have released.

The closure of contacts 46, due to the operation of relay 43, completes a circuit over a path from the positive terminal of source 1, lead 47, closed contacts 9 of the sequence-out relays, lead 51, the winding of relay 52, lead 53, closed contacts 54 of relay 23, still another winding of relay 23, lead 55, bottom closed contacts 56 of relay 52, lead 61, closed contacts 46 of relay 43, lead 62, closed contacts of correction key K1, to the negative terminal of source 1.

At this time only relays 23, 36, 43 and 52 are operated. The operation of relay 52 closes its own locking-up circuit over a path including the bottom winding of relay 23, its closed contacts 63 and lead 64, and winding of relay 450, and opens its contacts 56 over which it was originally operated. This locking circuit causes relay 450 to operate, as a result of which a negative potential is placed on lead 256 extending to the Transfer circuit.

When the operator removes her finger from key B, it will return to normal and open contact points 38 and 15. The opening of points 38 opens the operating circuit for relays 36 and 43. Relay 36 is de-energized and falls back, permitting contacts 5 and 7 to close. Relay 23 remains closed over a path which includes its bottom winding, its lower closed contacts and the winding of relay 52, also closed contacts 63 of relay 52 and contacts 9 of the sequence-out relays. The de-energization of relay 43 causes it to fall back and open contacts 46. The opening of contact points 15 of key B opens the original operating path for the relays in bank 1 via lead 18.

Relay 52, when energized, closed contacts 63, maintaining its own locking-up circuit over a path which includes lead 55, contacts 63, lead 64, winding of relay 450, lead 62, closed contacts of the correction or cut-off key K1, to the negative terminal of source 1. Thus the release of relay 43 and the opening of contacts 46 does not cause the release of relay 52.

The Retainer is again in a neutral position except for operation of relay 23 in bank 1 and the sequence setting relay 52. In this new position, however, contacts 45 of the sequence-in relays are closed for the storing of another letter or symbol in the next bank of relays, in this case bank 2. Relay 23 of bank 1, in locking-up, serves to store the letter B.

When the operator depresses key R on her keyboard, a circuit will be closed over a path extending from the positive terminal of source 1, lead 2, lead 3, closed contacts 5 of relay 36, lead 6, lead 65, closed points 66 of key R, lead 16, lead 17, lead 67, through one winding of each of relays 68, 69, 70, 71, 72, 73 and the other relays, not shown, of bank 2, in series, closed contacts 45 of the sequence-in relays, winding of polarized relay 74, lead 26, closed contacts 7 of relay 36, lead 27, to the negative terminal of source 1, this operating the relays in bank 2 and the sequence-in relay 74, the relays of bank 2, in operating, close their respective contacts 75, 76, 77, 78, 79, 80, etc.

A circuit is now closed over a path from the positive terminal of source 1, lead 2, lead 35, the winding of relay 36, lead 37, lead 81, through closed points 82 of key R, lead 83, lead 84, a winding of relay 73 of bank 2, closed contacts 80 of relay 73, lead 85, lead 41, lead 42, the winding of relay 43, lead 44, lead 411, lead 27, to negative terminal of source 1, thus operating relays 36 and 43.

The operation of polarized sequence-in relay 74, causes it to open its own operating circuit at contacts 45 and to close contacts 86.

The operation of relay 36 caused it to open its contacts 7 and 5, which opens the operating circuit for all of the relays of bank 2 which fall back, except for relay 73 which locks-up over its middle winding and its own contacts 80. The opening of contacts 7 also opens the operating circuit for the sequence-in relays.

Relay 43, in operating, closes contacts 46, as a result of which a circuit is closed over a path extending from the positive terminal of source 1, lead 47, closed contacts 48 of the out relays, lead 87, the winding of relay 88, lead 89, closed contacts 90 of relay 73, winding of relay 73, lead 91, closed contacts 57 of relay 88, lead 61, closed contacts 46 of relay 43, lead 62, key K1, to negative terminal of source 1, thus operating relay 88.

Relay 88, in operating, closes contacts 92 and locks itself up over a circuit which includes lead 91, contacts 92, lead 64, relay 450, lead 62, contacts of correction key K1, to negative terminal of source 1. Relays 73 and 88, 43 and 36 are now operated. Relay 23 in bank 1 and relay 52 are also operated.

Key "R" is now released. The opening of points 82, opens the circuit through relays 36 and 43 as a result of which relays 36 and 43 are de-energized and fall back, closing contacts 5 and 7, and opening contacts 46. Relay 73 will remain operated over a path which includes its bottom winding, lower closed contacts and the winding of relay 88.

It will thus be seen that for the operation of each key on the keyboard the same relays 36 and 43 operate, but a different sequence-in relay is caused to operate and a different sequence setting relay is caused to operate, in addition to a specific relay in a new bank in sequence.

The Retainer is now in a condition where it is storing or retaining two symbols (B and R) represented by the operation of relays 23 and 73 in relay banks 1 and 2, and, due to the closed contacts 86 on the sequence-in relays, is ready to receive the third letter which would be "O." The closure of the key representing the letter "O" will in similar manner cause all of the relays of bank 3 to close simultaneously and operate sequence-in relay 1000, thus causing contacts 86 to open and contacts 93 to close. All relays in bank 3 will fall back except relay 1005 which locks-up over its own contacts and through the winding of sequence setting relay 1001. The letter "O" is thus stored in the Retainer by the locking-up of relay 1005.

The storing of other letters or symbols on the Retainer follows substantially the same procedure outlined above. As mentioned above, whenever a new key on the keyboard is depressed, a new relay in the sequence-in group will be operated and a new relay in the next bank of relays will be operated, as well as a new relay in the sequence setting group of relays.

When the last sequence-in relay is operated, shown as the top relay 94 in the Retainer, it will operate over a circuit which includes the winding of the first sequence-in relay 96, thus closing contacts 8 again, and setting up a condition for a new cycle of operations to commence.

The top sequence-in relay 94, the uppermost bank (bank N) of relays, and the top sequence setting-out relays are connected to the other relays in the Retainer by dash lines. These dash lines indicate that there may be included as many relays and banks as are necessary to set up the greatest number of combinations of letters and symbols for the points of departure and arrival addresses.

Bank N, however, is the last bank of relays and is so arranged that it is followed by the bottom bank 1, when a symbol or character is typed up on the keyboard which succeeds that symbol or character which caused the relays of bank N to operate. It will thus be seen that the banks of relays are arranged to operate sequentially in a ring circuit, so to speak. In practice, bank N may be bank 65 or 72 if the total number of banks is 65 or 72 respectively.

In this set-up the lead from contacts 93 of the sequence-in relays goes through winding of relay 94, through lead 95, through winding of relay 96, lead 97, to lead 26.

The closure of a circuit through lead 329, as was done with leads 18 and 67, extends over a path which includes contacts 93, the winding of relay 94, lead 95, the winding of relay 96, lead 97 to lead 26, and causes the operation of relays 94 and 96, as a result of which the operating circuit for relays 94 and 96 are opened at contacts 93. Since the operation of relay 96 closed contacts 8, it will be seen that the sequence-in relay system is now conditioned for enabling the operation of the relays in bank 1 sequence-in relay 25.

Thus, at all times, one set of contacts of the sequence-in relays is always closed to enable the banks to operate sequentially in accordance with the sequential operation of the keys on the keyboard.

Included in the Retainer is a correction key K1. If a typing error has occurred, the depression of the correction key K1 opens the locking circuits of the sequence setting relays 325, 1001, 88, 52, and others which may be used but now shown by opening contacts 5550, as a result of which these sequence setting relays will release. The release of these sequence setting relays opens the locking circuits of the operated relays in the horizontal banks of the Retainer, thus causing the operated relays in the different horizontal banks to fall back. As a result of this, the Retainer is completely neutralized and now ready to receive the correct retyped information.

Also included in the Retainer is an "off" key K whose action is described in detail hereinafter, but whose purpose is to completely neutralize the entire system of the invention isofar as any one particular operator is concerned, after the desired travel information has been displayed on the Information Board of a particular operator.

*Transfer circuit*

The Transfer circuit is shown in Figure 3 and includes three operators' positions each of which has an individual set-key. The set-keys for the three operators enable multi-operation of a single common Address Board and a single common Route Board by any one of three operators. The Transfer circuit includes a group of polarized sequence-in relays 401, 402, 400 and 298 and 271 which operate in a manner similar to the sequence-in relays of the Retainer. Considering the first and last relays 401 and 402 of the sequence-in group as a single relay (because their windings are in series), there are as many sequence-in relays as there are operators. This also applies to the withholding relays. In a normally empty or neutral condition, one pair of sequence-in contacts will be closed. In this instance, let it be assumed that contacts 259 are closed.

Operator #1 depresses her set-key which is identified as OP'1. This action closes contact points 254 and 255, as a result of which a circuit is closed over a path from the negative terminal of D. C. source 1 in the Retainer through the closed contacts of key K1, closed contacts of operated relay 450, line 256, winding of relay 257 in the Transfer circuit, closed points 255, to the positive terminal of D. C. source 1, thus causing relay 257 to operate. Contacts 254 and 255 of the set-key are also armatures of relay 257, and hence when relay 257 operates it locks up and holds these contacts 254 and 255 in closed position.

A circuit will now be completed over a path from the positive terminal of source 1, through lead 261, closed contacts 254, lead 262, lead 264, through right hand winding and normally closed contacts 251 of relay 265, lead 266, lead 267, through upper winding of relay 268, through dry rectifier 269, lead 270, contacts 259, winding of sequence-in relay 271, lead 272, to the negative terminal of source 1, thus operating relays 265, 268 and 271.

When relay 265 operates, it closes contacts 273 and opens contacts 251. When relay 268 operates, it closes contacts 274 and 275. When polarized relay 271 operates, it opens its own operating circuit at contacts 259 and closes the contacts 276 for setting up the operating path of the following sequence-in relay 298.

The closure of contacts 273 of relay 265 and contacts 275 of relay 268 completes a circuit from the positive terminal of source 1, lead 261, closed points of 254 of the set key, lead 262, closed contacts 273, left winding of relay 265, lead 277, through closed contacts 275 and lower winding of relay 268, lead 278, winding of relay 279, lead 280, lead 281, and lead 282 to the negative terminal of source 1, thus causing relay 268 to lock-up on its contacts and relay 265 to lock up on its contacts 273 and relay 279 to operate. Sequence-in relay 271 operates subsequent to relays 265 and 268 operate in order to insure the completion of the locking-up paths for these last two relays before relay 271 operates. Contacts 273 of relay 265 close before contacts 251 open. Contacts 251 of relay 265 are caused to open before sequence-in relay 298 can be caused to operate through contacts 276.

The operation of relay 268 causes a circuit to be closed over a path extending from the positive terminal lead of source 1, through lead 283, lead 284, normally closed contacts 285 of relay 403, lead 286, closed contacts 274 of relay 268, through lead 287 extending to the Retainer of operator #1, through lead 98, one winding of relay 99, lead 100 through lead 101, winding of sequence-out relay 102, closed contacts 60, lead 103, closed contacts 106 of operated relay 23 in bank 1, through lead 109, to the Address Board, thus operating relay 99 in the Information Board-Route Board control mechanism and also sequence-out relay 102. The closed circuit through closed contacts 106 of relay 23 to the Address Board establishes the letter B on the Address Board. This circuit through sequence-out relay 102 energizes this relay and causes it to open its contacts 60 and 9 and close contacts 110. The opening of contacts 9 opens the locking circuits for relay 23 of bank 1 and relay 52, both of which now release.

Let us now consider the condition where operator #2 desires to use Address Board while operator #1 is already in possession, and that operator #2 will have finished inserting her address information upon her individual Retainer before she depresses her individual set-key OP'2.

As described above, contacts 276 at the sequence-in relays will be closed. The operation of set-key OP'2 will operate relay 288 over a circuit extending to the individual Retainer for operator #2 in a manner similar to that already described for the operation of relay 257 when operator #1 depressed her set-key OP'1.

A circuit is now closed from positive terminal source 1, through lead 261, lead 289, closed points 290 of set-key OP'2, lead 291, lead 292, through one winding of relay 299, contacts 252, lead 293, lead 294, winding of relay 295, through rectifier 296, lead 297, through closed contacts 276, winding of sequence-in relay 298, lead 272, lead 282 back to negative terminal of source 1, thus operating relays 299, 295 and 298. Relay 299, in operating, closes its contacts 300 and opened its contacts 252, and locks-up over its contacts 300.

Relays 299 and 295 lock up on their own contacts over a circuit which extends from the positive terminal of source 1, through 261, lead 289, closed points 290, lead 291, closed contacts 300, another winding of relay 299, lead 305, closed contacts 302 of relay 295, winding of relay 295, lead 306, lead 307, winding of relay 308, lead 309, lead 281 and lead 282, to the negative terminal of source 1, thus also operating relay 308. Relay 308, in operating, opens contacts 333 and prevents a closed circuit from being completed for operator #3 over a path from D. C. source 1, lead 283, through the contacts of relay 308, closed contacts of relay 410 to lead 287 and the particular Retainer board for operator #3. Relay 410 will operate when operator #3 closes her set-key OP'1, assuming that the last operator caused relay 308 to operate and also assuming that operator #3 is the next operator to depress her set-key.

Unlike the situation for operator #1, however, operator #2 at this time cannot complete a circuit from the Transfer mechanism to her Retainer in order to transfer the material from her particular Retainer to the common Address Board. The reason for this will now be given. When Operator #1 completed a closed circuit from the Transfer mechanism to her particular Retainer, relay 279 had been caused to operate and open its contacts 310, thus keeping open and preventing the completion of a circuit from the positive terminal of source 1, over lead 283, lead 311, contacts 310 (now open), lead 312, closed contacts 303 of operated relay 295, and lead 287' to the Retainer of operator #2.

Returning now to the description of the system where a circuit had been closed from the Transfer mechanism, through the Retainer of operator #1 to the Address Board for establishing the letter B, it will be remembered that sequence-out relay 102 of Figure 2a had been operated and had opened its own operating circuit at contacts 60 and had closed contacts 110. The closure of contacts 110 completes a path from the Transfer circuit over line 287, lead 98, winding of relay 99, lead 100, lead 111, winding of relay 112, closed contacts 110, lead 113, closed contacts 104 of operated relay 73 in bank 2, lead 105 to the Address Board to establish letter R on the Address Board. The operation of relay 112 opens its own operating circuit at contacts 110 and opens contacts 48 and closes contacts 114. The opening of contacts 48 opens the locking circuit for relay 73 of bank 2 and relay 88 both of which now release. The closure of contacts 114 by the operation of relay 112 completes a path for the next letter in sequence stored in relay bank 3 to be established on the Address Board, after which the locked-up relay in bank 3 releases and the same process is repeated for the next symbol to be established on the Address Board. It is in this manner that the entire subject matter stored in the Retainer passes out of it into the Address Board in the desired sequence.

When as described above, a path had been closed from the Transfer mechanism through the Retainer for operator #1 to the Address Board to operate sequence-out relay 102 in the Retainer, the operation of this relay 102 opens its contacts 9. The opening of contacts 9 opens the locking-up circuit for relay 23 in bank 1 and also for sequence setting relay 52 both of which release. The relays of bank 2 and the associated sequence-out relay mechanism for this bank are now restored to normal.

When the next sequence-out circuit had been closed from the Transfer circuit to the Retainer of operator #1 for the succeeding symbol, relay 112 had operated and opened its locking circuit at contacts 110 and had also opened contacts 48 and closed contacts 114. Sequence setting relay 88 and relay 73 in bank 2 were caused to release. The relays of bank 2 and the associated sequence-out relay mechanism for this bank are now restored to normal.

In similar manner, the other banks of relays in the Retainer and their respective associated setting-out mechanisms are restored to normal as the symbols are established sequentially in the Address Board.

The top sequence setting-out relay mechanism in the Retainer is arranged to affect the next in sequence which would be the first one on the bottom. As in the cases of sequence setting-out relays 112 and 102, when relay 115 is energized it opens its own locking circuit at contacts 116. As with relays 112 and 102, it closes its following sequence-out circuit which is at the bottom. This is accomplished by means of leads 117 and 118 which connect the windings of relays 115 and 1518 in series. Since relay 1518 is energized at the same time as relay 115, its operation will close contacts 60 and condition the Retainer for the next sequence-out circuit. Like relays 112 and 102, relay 115, in operating, opens the circuit at contacts 58, de-energizing relay 325 and deenergizing whichever relay in bank N had been previously locked-up. Relay 325, in releasing, closes contacts 59 and allows contacts 326 to open. The top bank of relays and the associated sequence out mechanism is now restored to normal.

It should be noted that the circuit from the transfer circuit to the Retainer of operator #1 is closed through lead 256 when operator #1 depresses her set-key OP'1. Lead 256 is closed in the Retainer through closed contacts of operated relay 450 whose operating path includes leads 62 and 64. The operating path for relay 450, via lead 64, extends to contacts on all of the sequence setting relays 52, 86, 1001 and 325. Hence, as long as there is any symbol still stored in the Retainer by the operation of any one relay in any horizontal bank, current will flow in lead 64 and relay 450 will remain operated. When however, the last bank of relays and its associated setting out mechanisms have been restored to normal, the circuit through lead 64 will be opened and relay 450 will release, thus opening the circuit to the Transfer mechanism. The opening of the circuit in lead 256 will cause relay 257 in the Transfer Board to release, in turn, opening points 255 and 254 which form part of the set-key OP'1. The opening of set-key OP'1 interrupts the locking-up path for relays 265 and 268 which now fall back. Relay 279 in the Transfer circuit also releases when relay 268 releases. As a result of this, the relay mechanism for operator #1 in the Transfer circuit is restored to normal.

The release of relay 279 causes contacts 310 to close, thus enabling a closed circuit to be completed for operator #2 from the Transfer circuit to the Retainer for operator #2 over a path from the positive terminal of source 1, lead 283, lead 311, contacts 310, lead 312, closed contacts 303 of relay 295, and line 287', through the Retainer of operator #2, and thence to the Address Board. The Retainer for operator #2 can then pass along its stored symbols to the Address Board. The Address Board empties itself automatically after it receives all of the symbols from any one Retainer.

It should be noted that there are four banks of relays A, B, C and D in the Transfer board. The first operator to set her key will seize and operate a relay in a bank. It was assumed above that operator #1 operated relay 268 in bank A, which means that the previously operated relay had been in bank D. If, however, the last relay operated in any one bank had been in bank A, then the operation of the set-key OP'1 would operate a relay in bank B, etc. The position of the contacts in the sequence-in group of relays 402, 401, 400, 271 and 298 controls and determines the particular bank to be seized by the next operator when she depresses her key.

The purpose of the rectifiers in the Transfer circuit is to prevent undesired back flow of energy into other circuits of the system.

*Address Board*

Figure 4A:
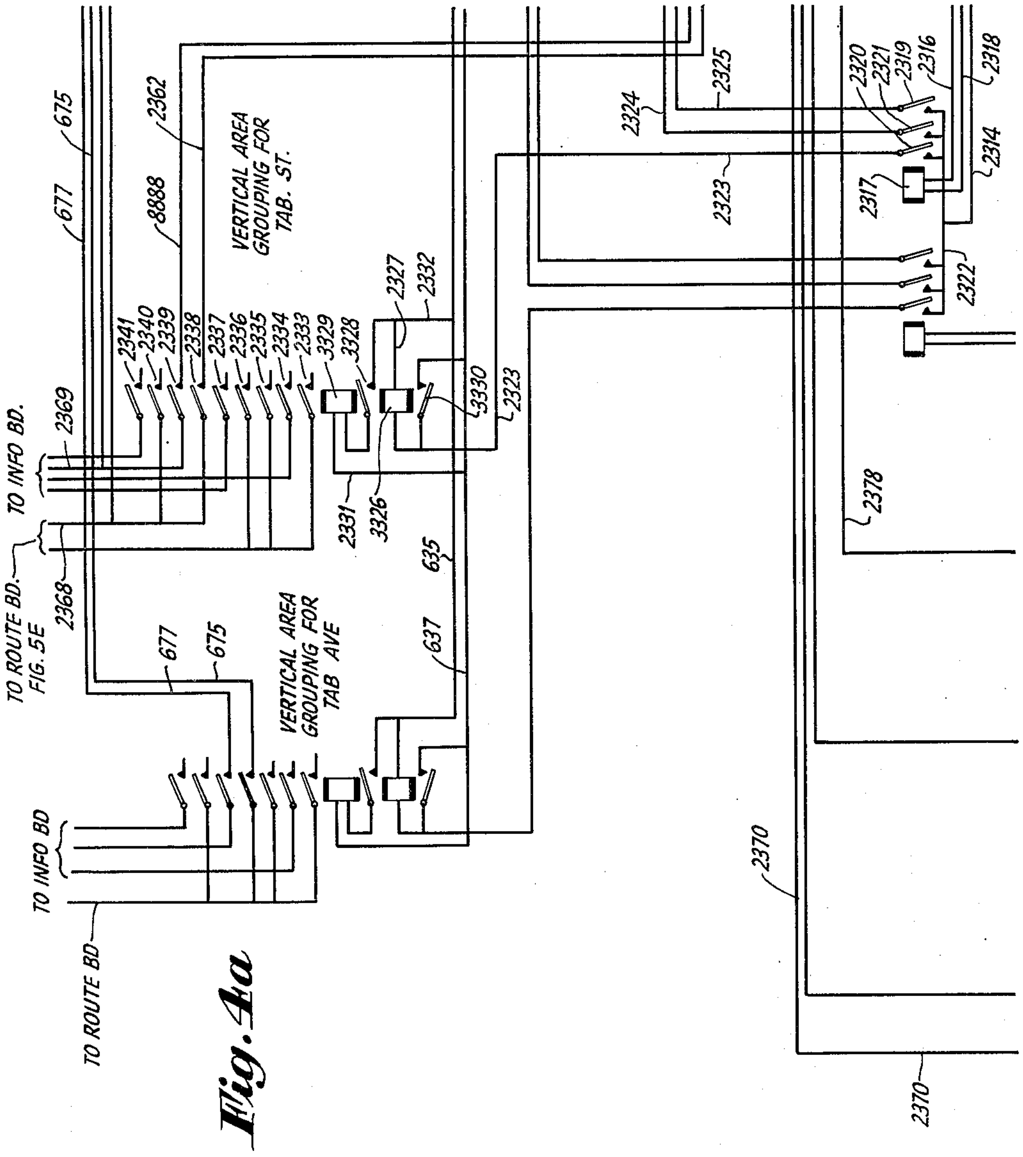
Figure 4B:
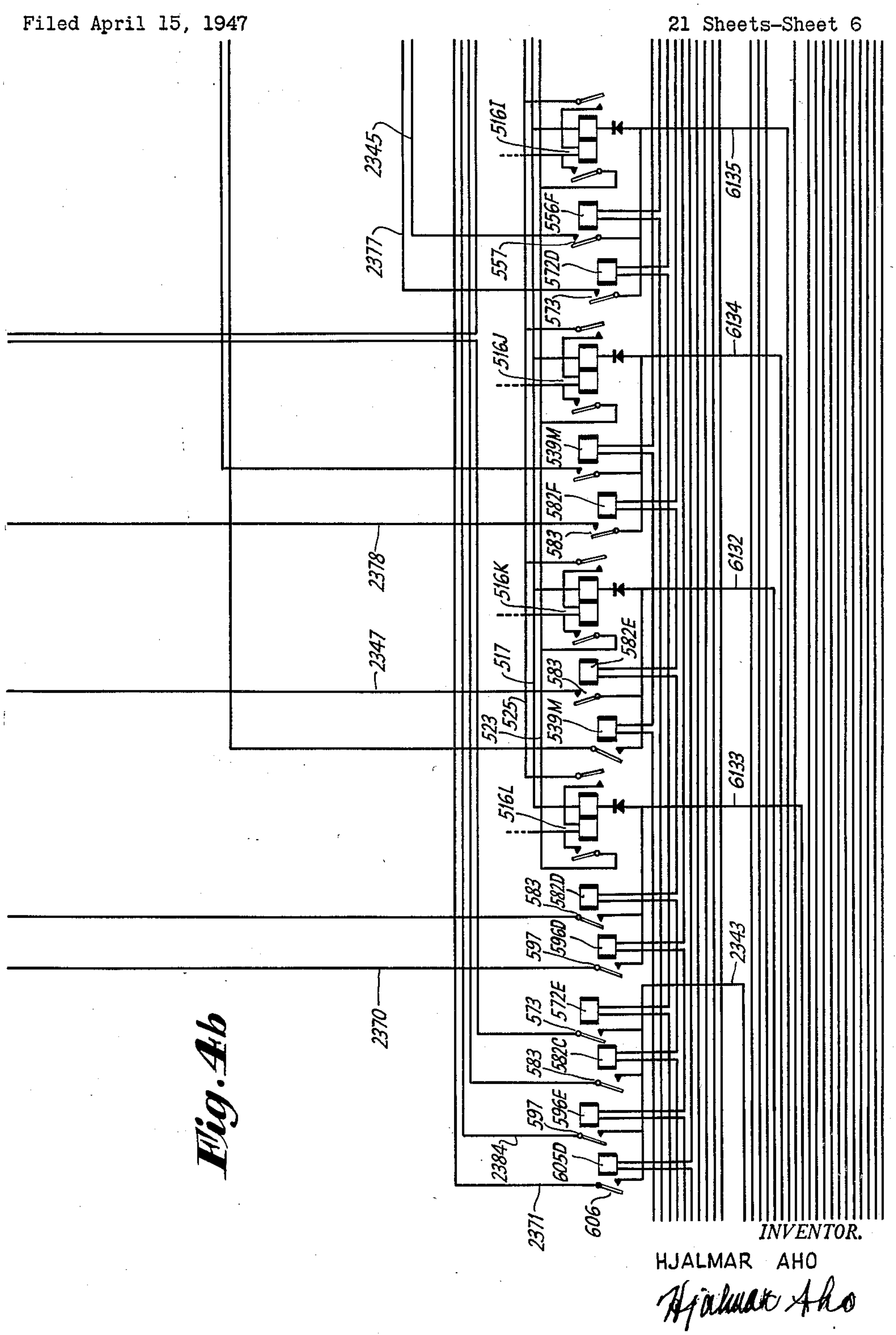
Figure 4C:
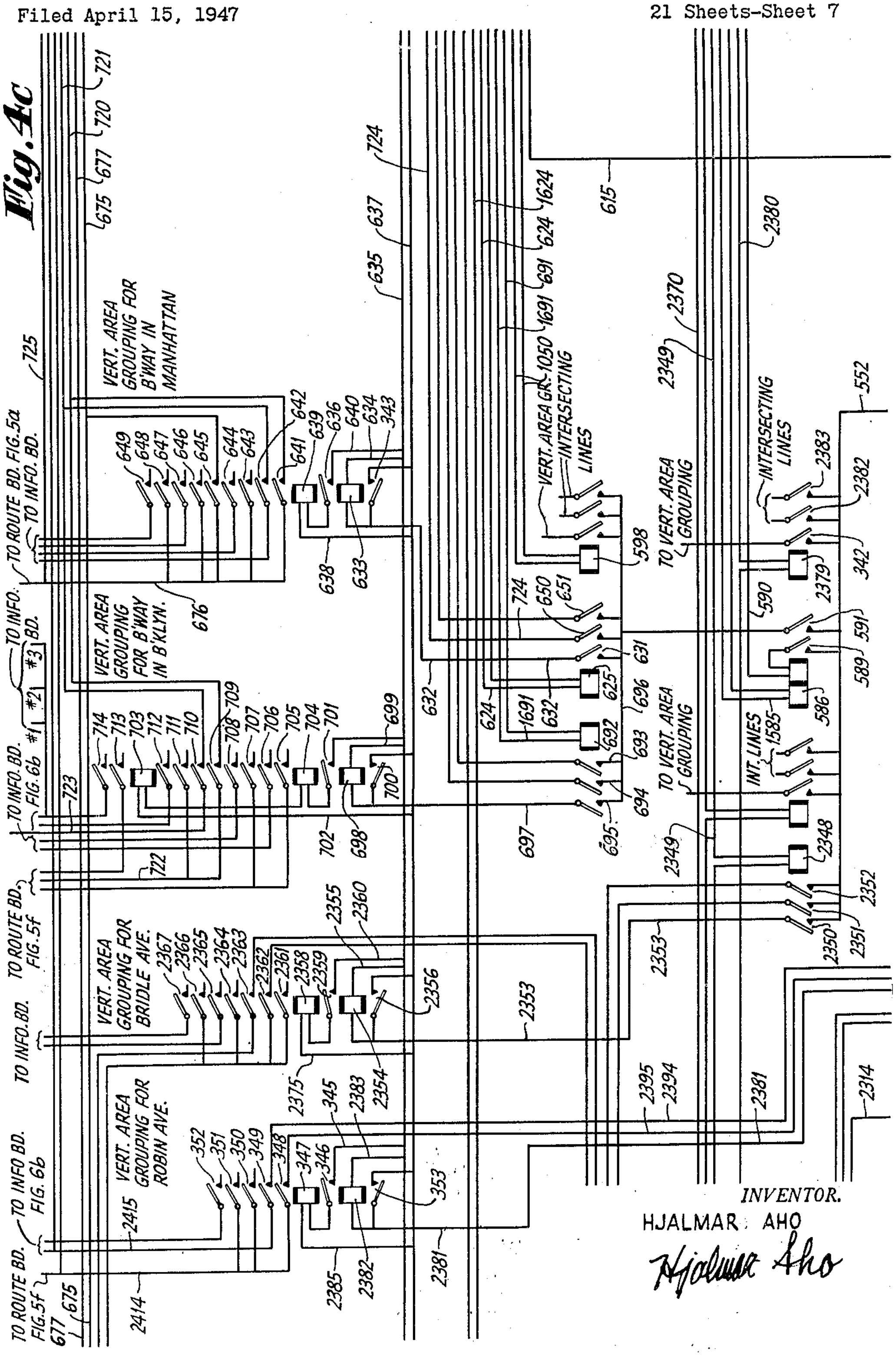
Figure 4D:
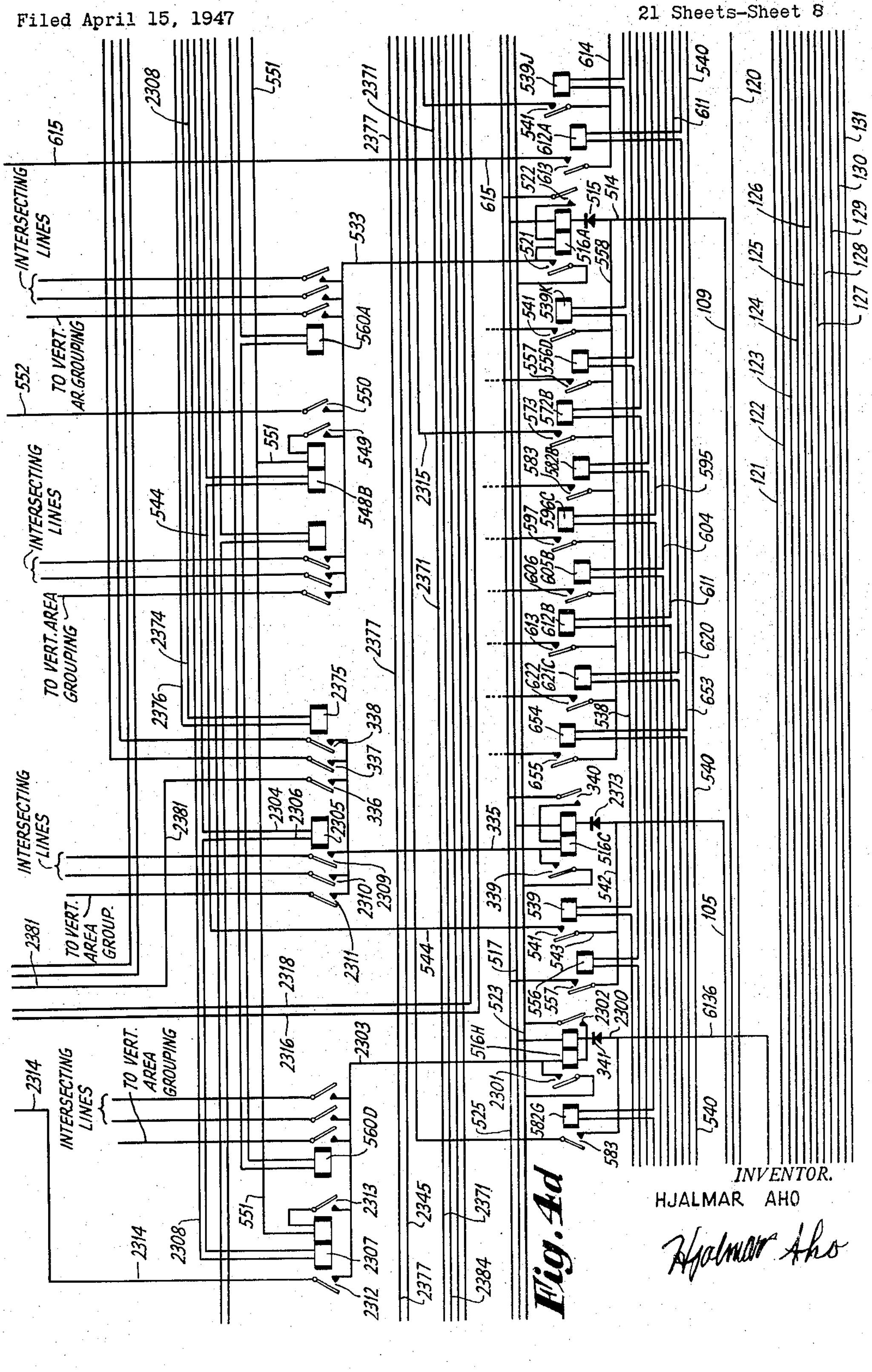
Figure 4E:
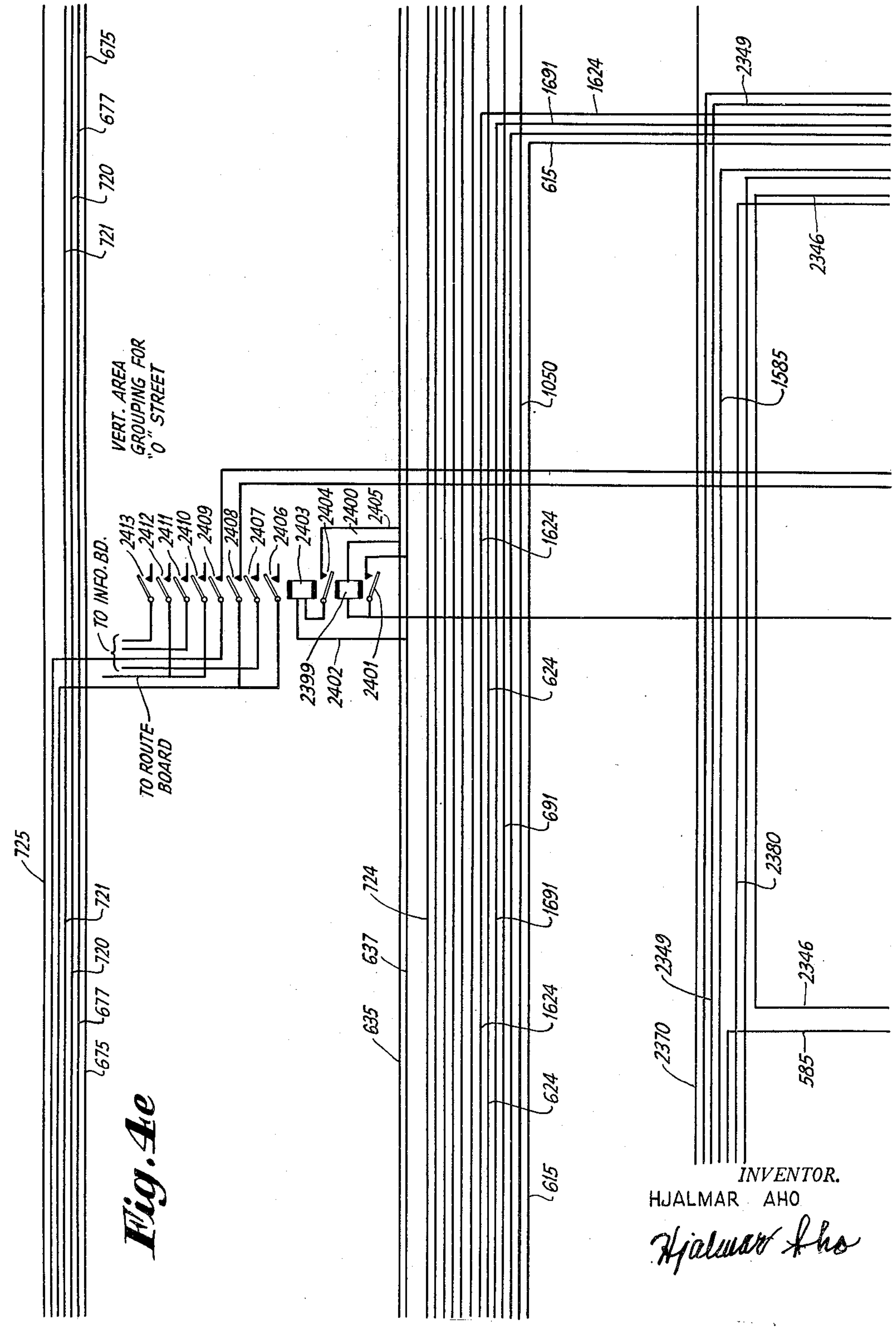
Figure 4F:
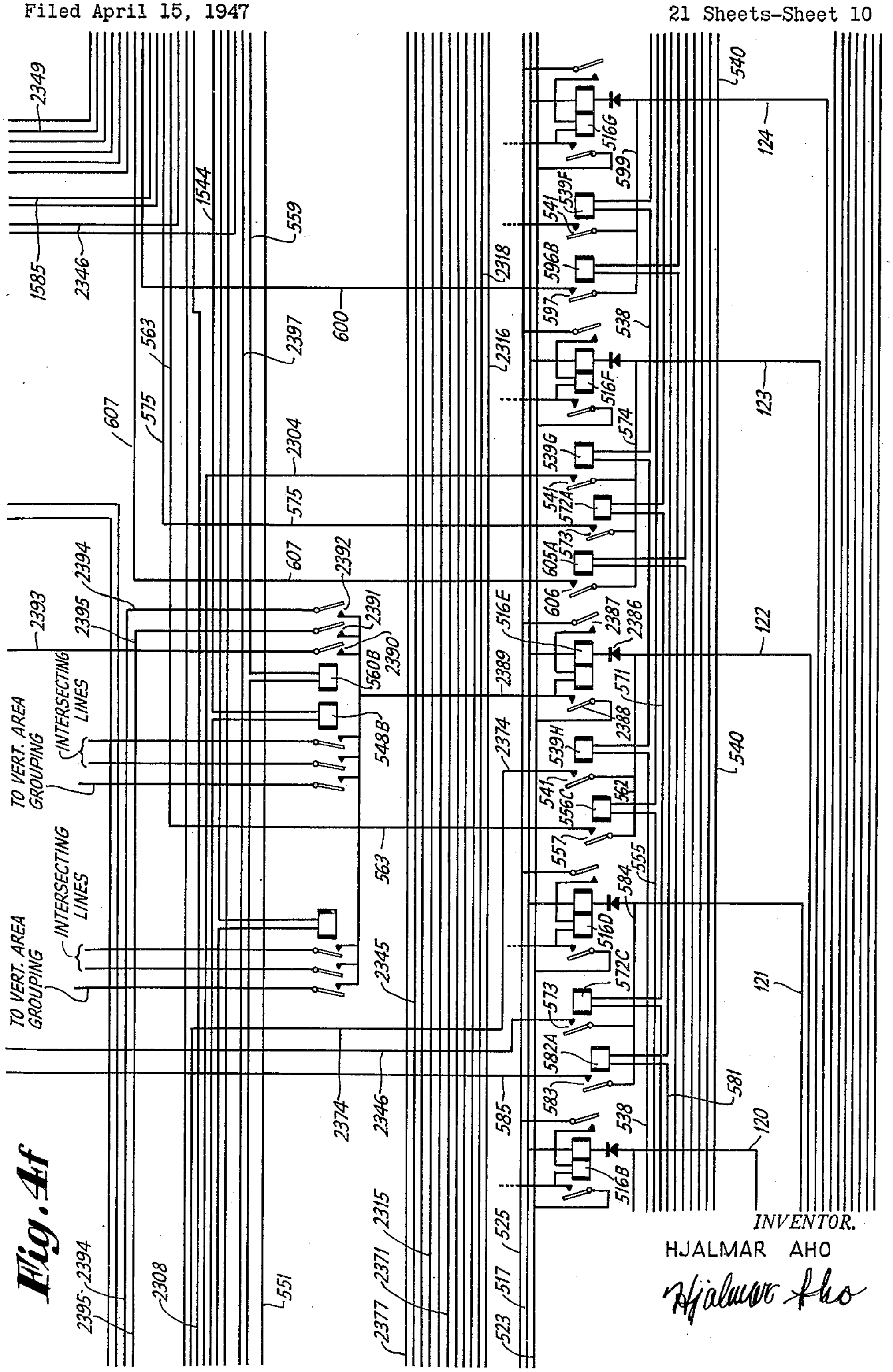
Figure 4G:
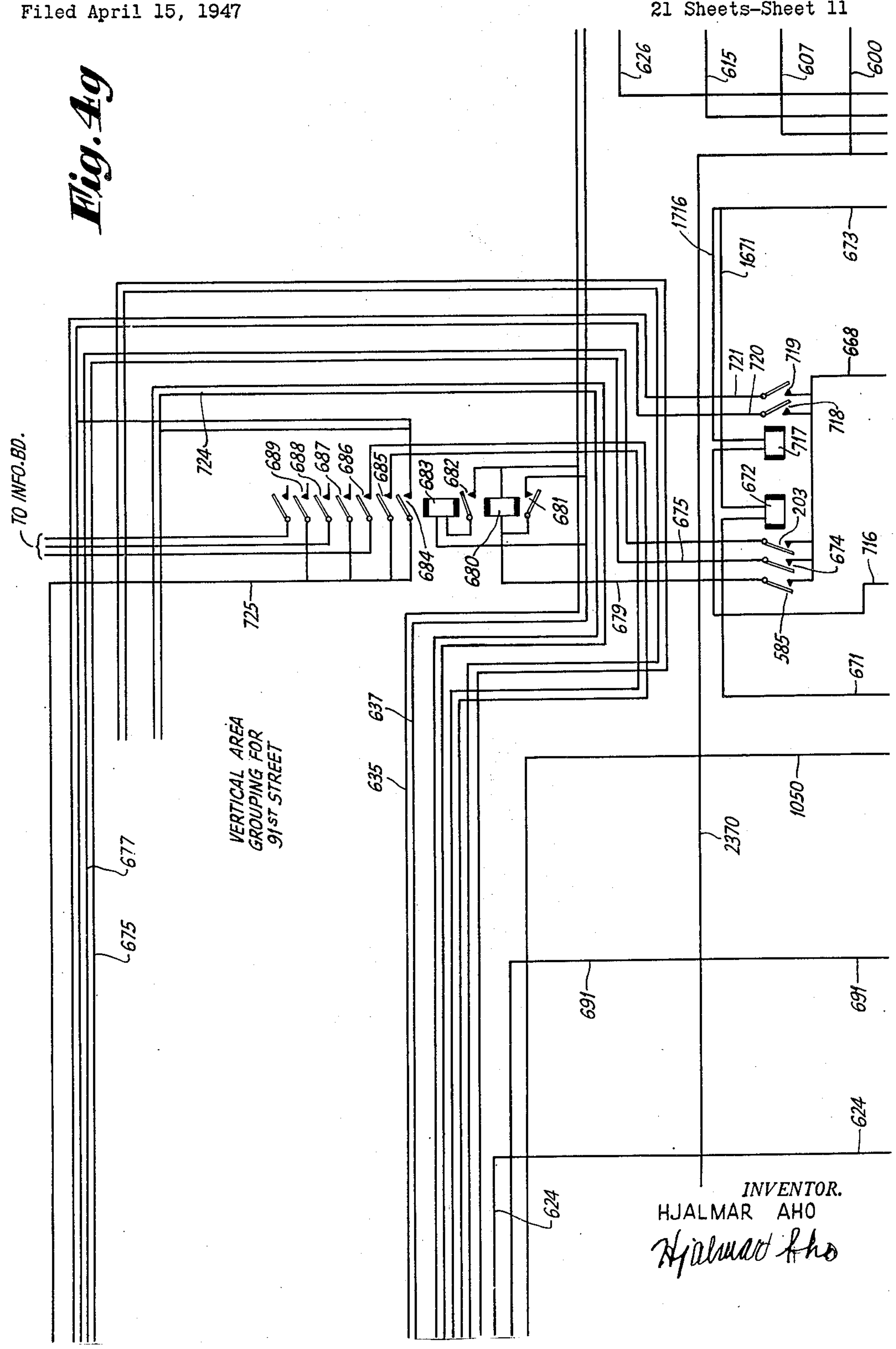
Figure 4H:
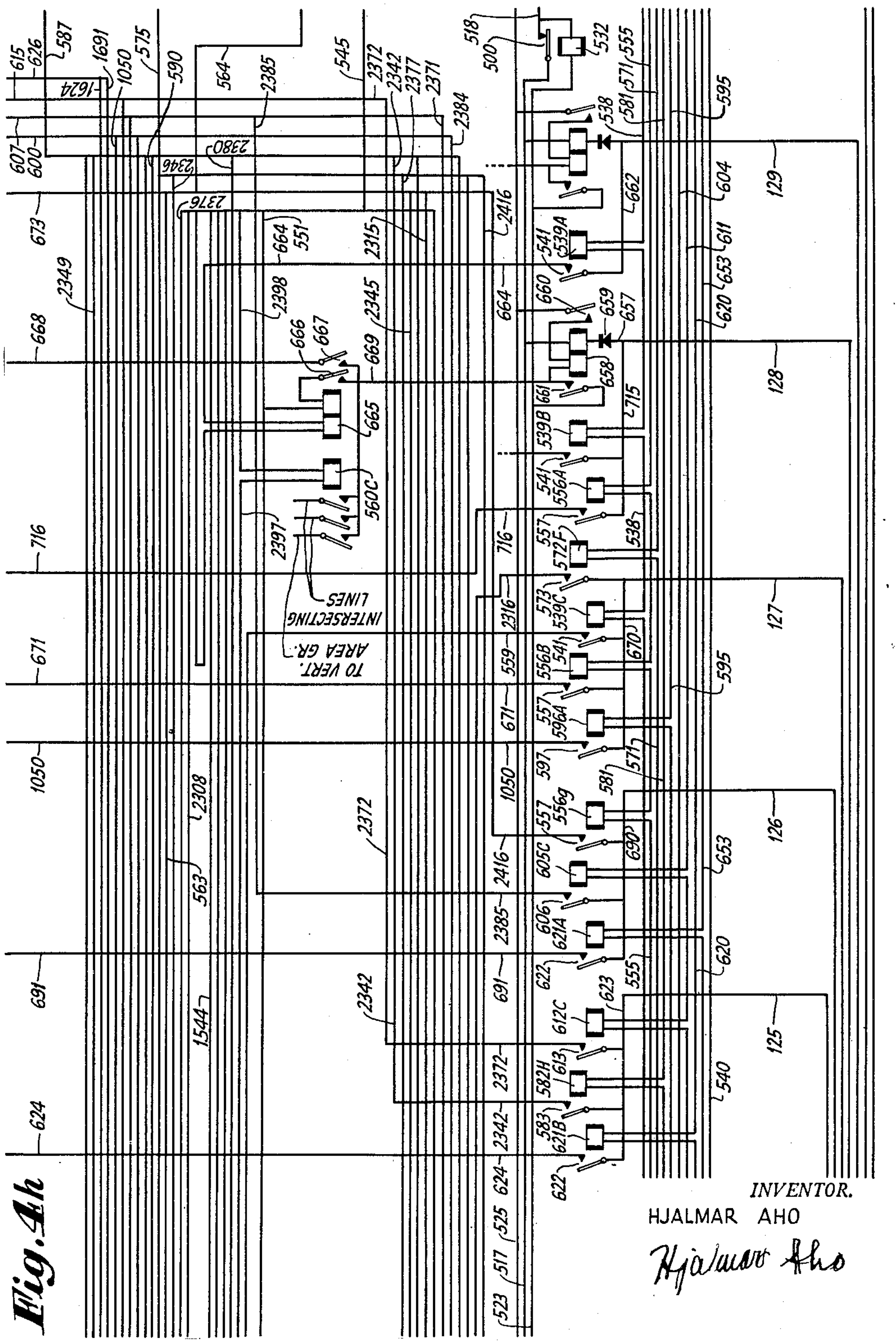
Figure 4K:
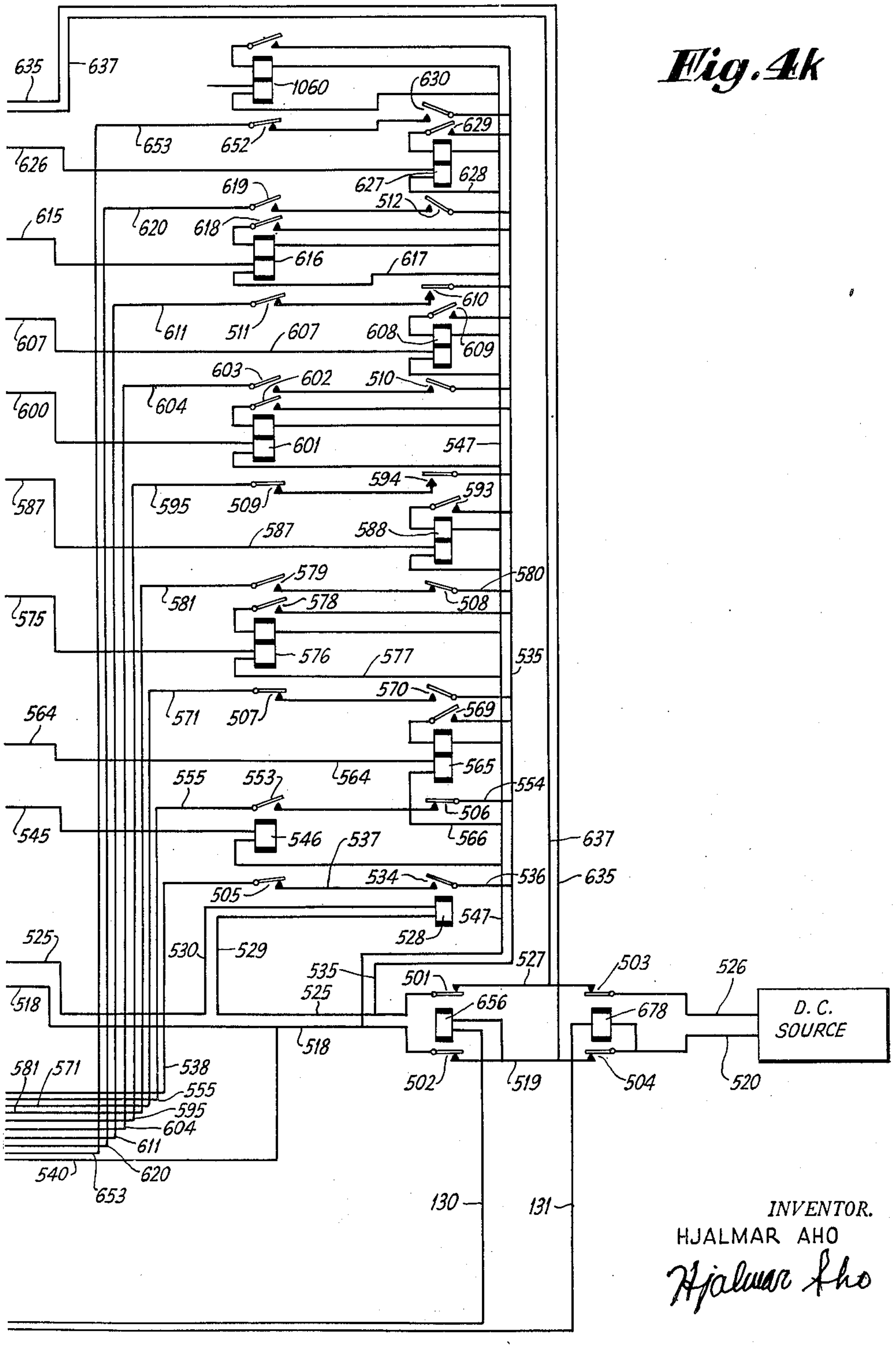
Figure 5A:
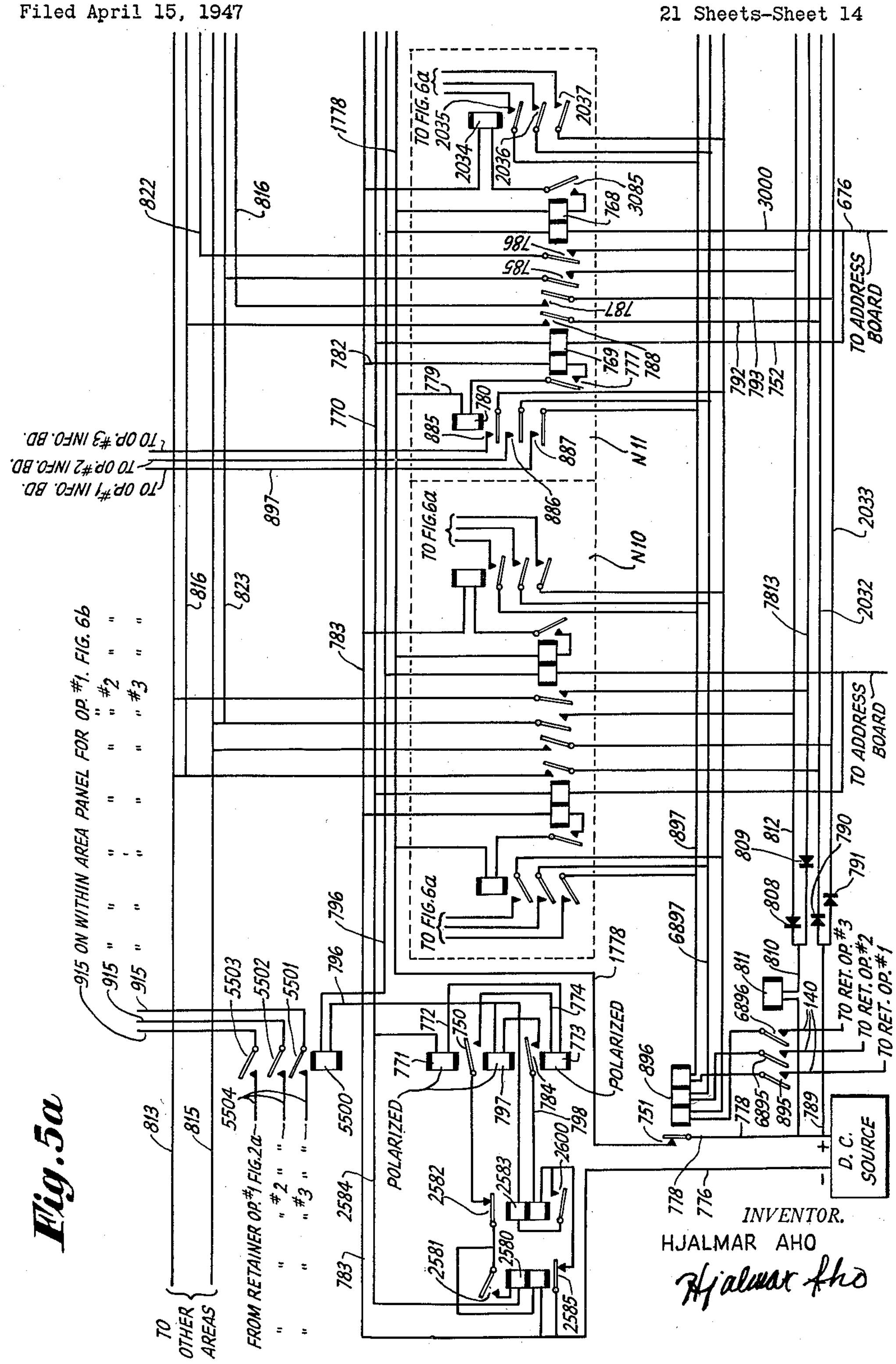
Figure 5B:
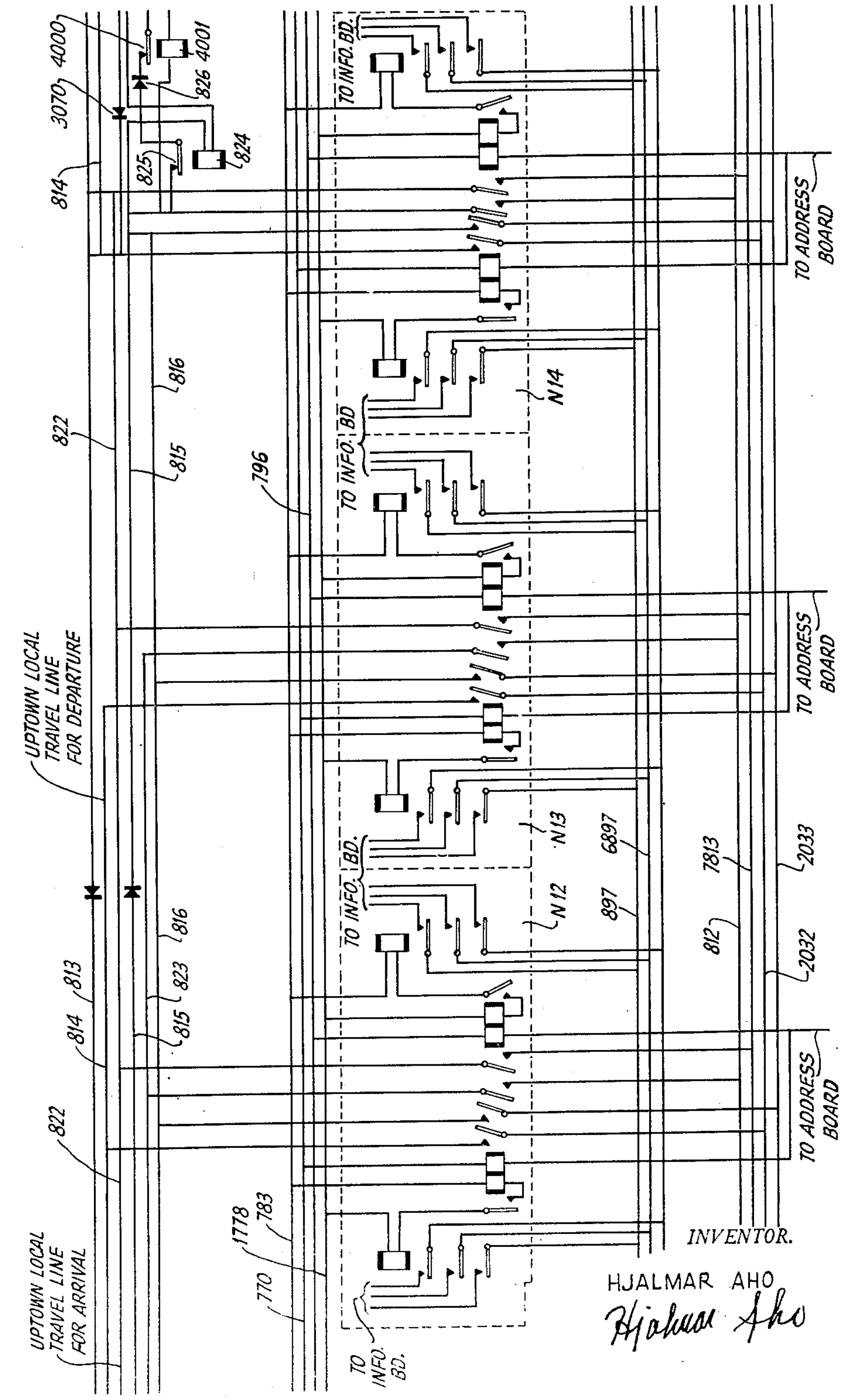
Figure 5C:
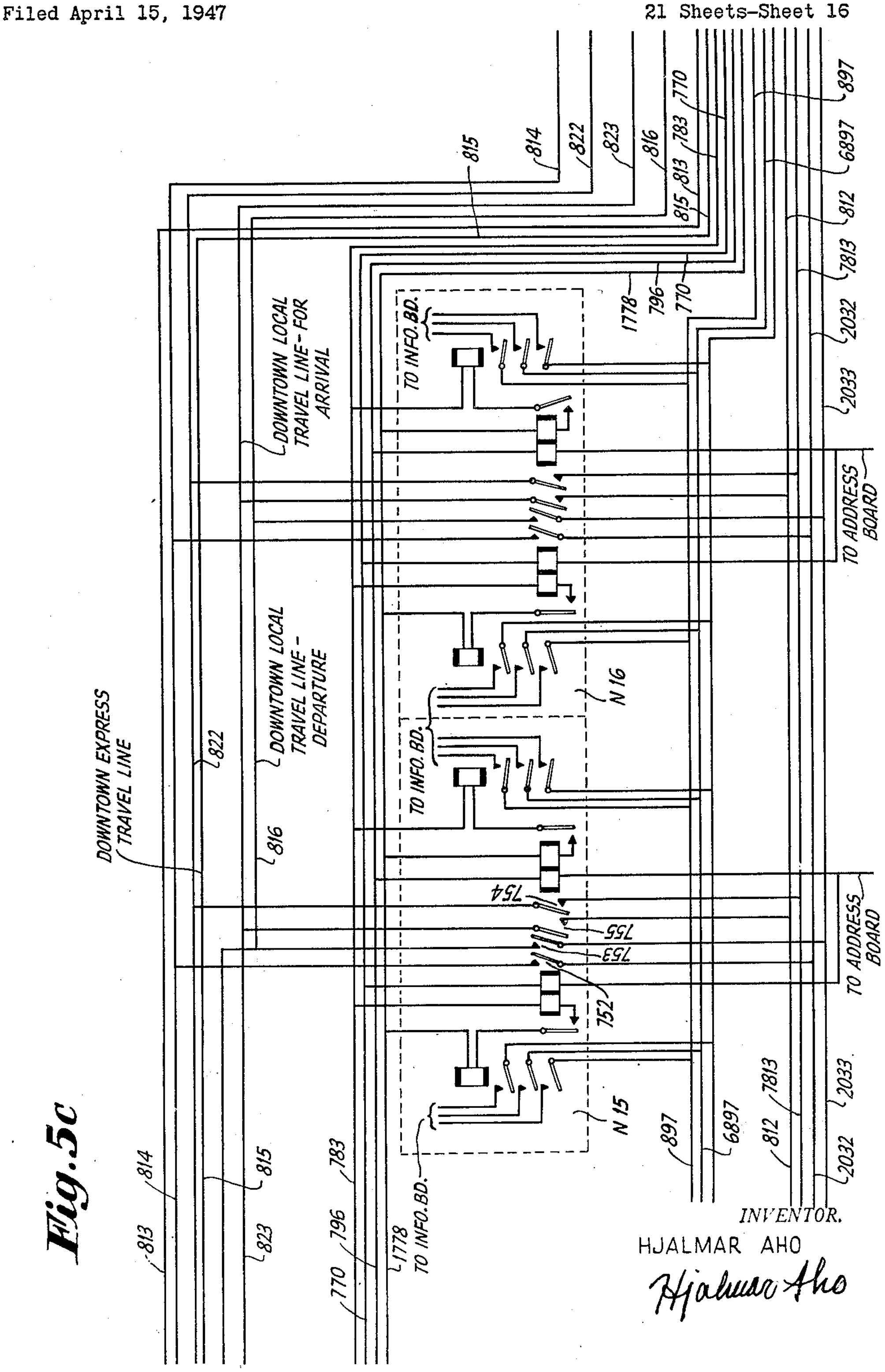
Figure 5D:
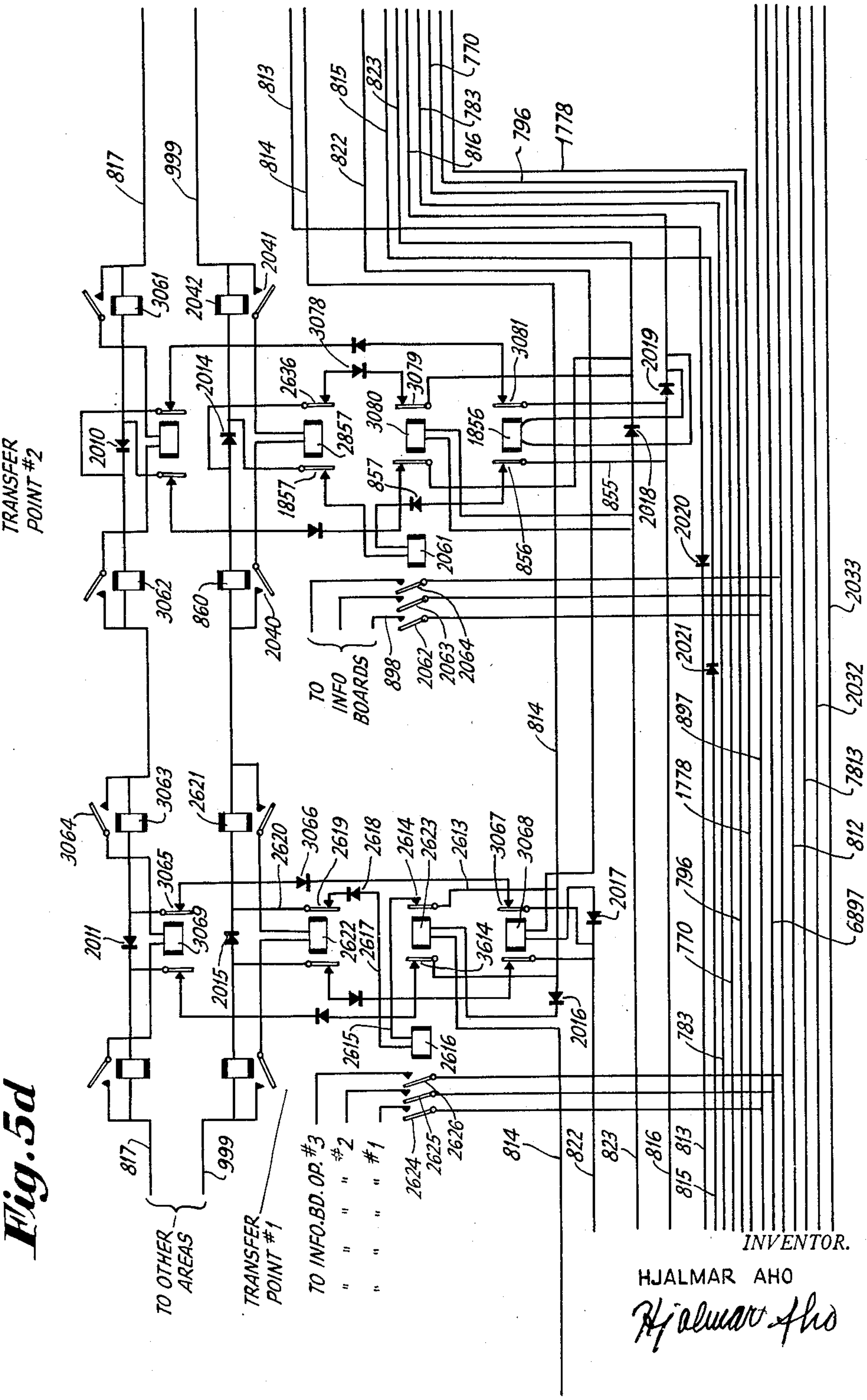
Figure 5E:
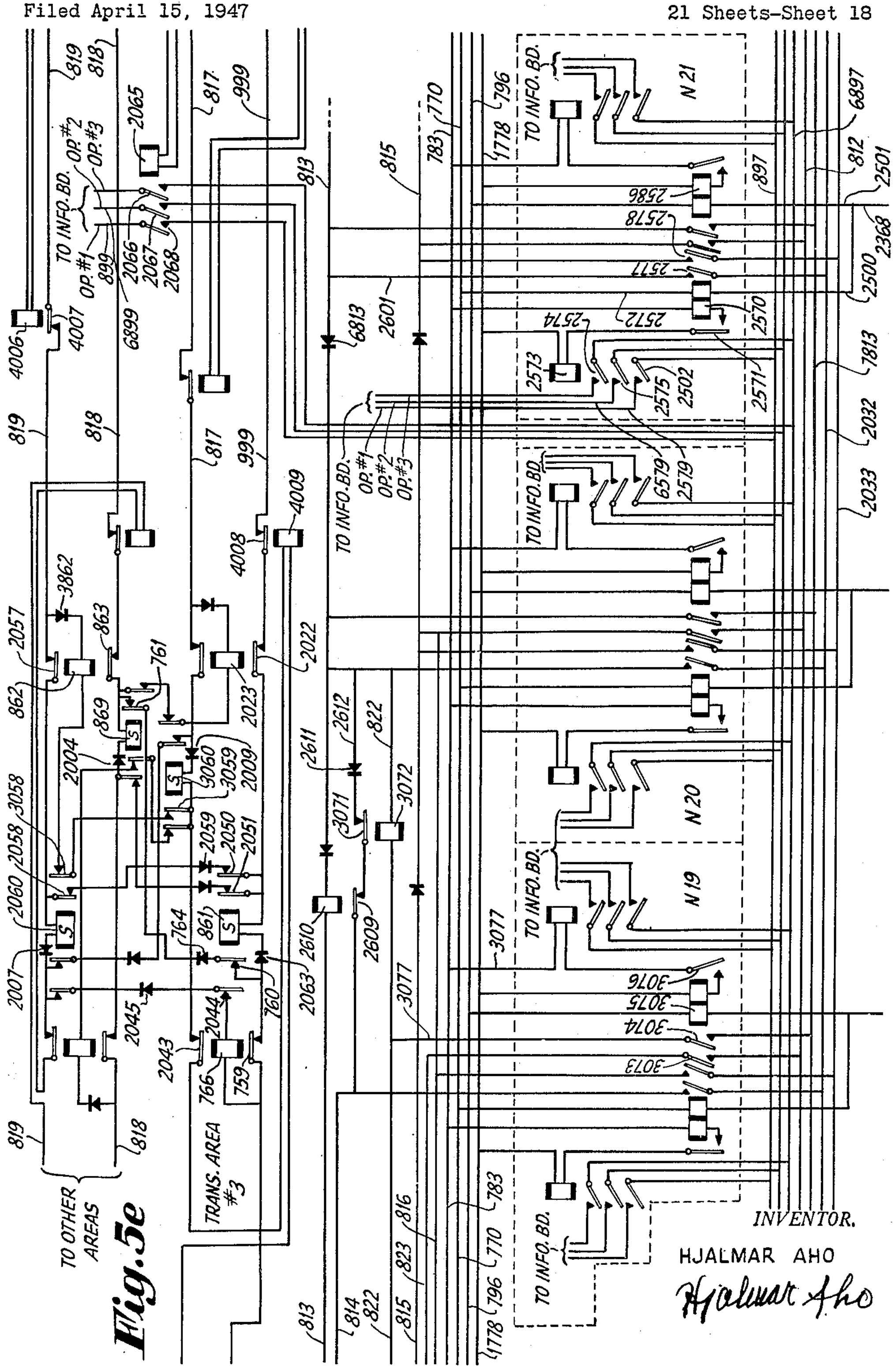
Figure 5F:
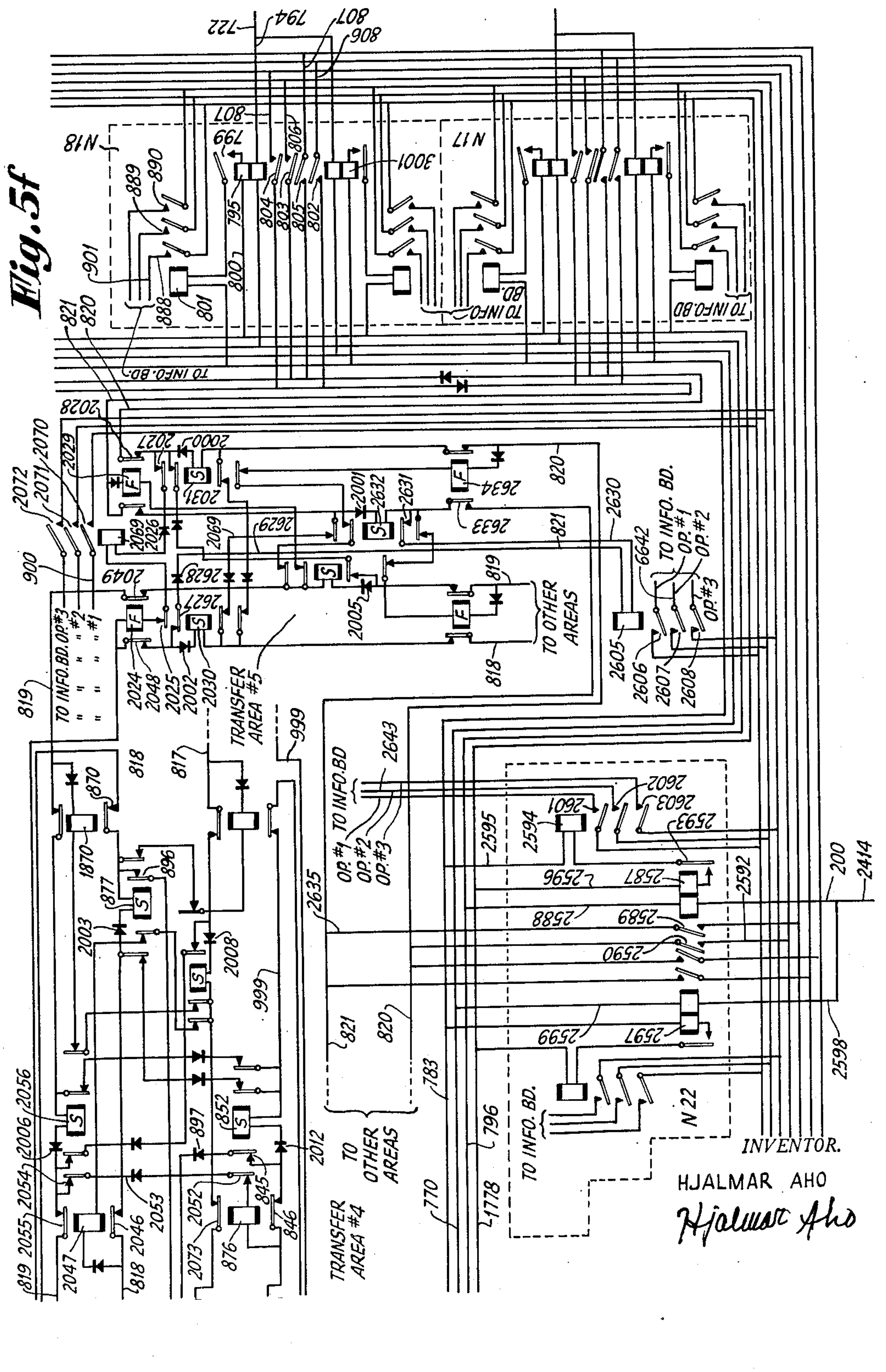

The Address Board is shown in Figs. 4*a* and 4*b*. In the normal or neutral position of the Address Board, all relays therein are unenergized. It will be recalled that as a result of the depression of set-key OP'1, a circuit was completed from the positive terminal of source 1, over lead 283, lead 284, through contacts 285 of relay 403, lead 286, closed contacts 274 of relay 268, lead 287 to Retainer, lead 98 in Retainer, relay 99, lead 100, lead 101, winding of relay 102, contacts 60, lead 103, closed contacts 106 of operated relay 23 in bank 1, through line 109 to the Address Board.

The circuit for the first letter of the originating address (the letter B in the foregoing assumed case of Broadway) is closed through line 109 with a positive potential thereon from the Retainer being supplied to the Address Board, thence to lead 514 in the Address Board, through rectifier 515, winding of relay 516A, lead 517, through closed contacts 500 of relay 532, lead 518, closed contacts 502 of relay 656, lead 519, through closed contacts 504 of relay 678, lead 520, to the negative terminal of source 1, thus operating relay 516A.

Relay 516A, in operating, closes its own locking circuit by closing contacts 521 and 522 and locks up over leads 525 and 523. Lead 523 extends to the negative terminal of source 1 through the winding of relay 532. Lead 525 extends to the positive terminal of source 1 over a path through the winding of relay 528 and contacts 501 of relays 656 and contacts 503 of relay 678. The operation of relay 516A closes a circuit from positive terminal of source 1, through contacts 503, lead 527, contacts 501, lead 526, lead 529, winding of relay 528, lead 530, lead 525, lead 531, now closed contacts 522 of relay 516A, winding of relay 516A, now closed contacts 521, lead 523, winding of relay 532, lead 518, contacts 502 of relay 656, lead 519, contacts 504 of relay 678, to lead 520 and negative terminal of source 1, thus operating relays 532 and 528.

Relay 532, in operating, opens contacts 500, thus opening the original operating circuit for relay 516A. This prevents any new impulse or symbol coming along any line from any Retainer from energizing any other relay like 516A, such as 516B, 516C, etc. because the operating paths of all these 516A, B, C, etc. relays are connected to a common lead 517 which has now been opened at contacts 500 of relay 532.

Relay 516A in closing contacts 522, closed a potential circuit through the locking winding of relay 516A, to lead 533.

Relay 528, in operating, closes contacts 534. This closes a circuit for receiving the next impulse from the Retainer as the second letter of the originating address, over a path from the lead 526 (positive terminal), through contacts 503 of relay 678, lead 527, contacts 501 of relay 656, lead 535, lead 536, closed contacts 534 of relay 528, lead 537, break contacts 505 of relay 546, lead 538, through windings of relays 539A, 539B, etc. in series, lead 539, through lead 540, lead 518, contacts 502 of relay 656, lead 519, contacts 504 of relay 678, to lead 520 (negative terminal), thus operating all relays 539A, B, C, etc.

Relays 539A, B, C, etc., in operating, close their respective contacts 541 for the next letter in the sequence (the second letter of the originating address). This second letter "R" is a positive impulse arriving over lead 105 from the Retainer, and completes a circuit in the Address Board, over a path extending through lead 542, lead 543, closed contacts 541 of relay 539L, lead 544, windings of relays 548A and B, lead 1544, lead 545, winding of relay 546, lead 547, contacts 502 of relay 656, lead 519, contacts 504 of relay 678, to lead 520 and negative terminal of source 1, thus operating relays 548A and B and relay 546. Leads 544 and 1544 have in series therewith as many series-connected relays 548A, 548B, 548C, etc. as are needed to be established as second letters by all of the thorofare titles (in this instance the letter "R").

Relay 548A, in operating, closes its make contacts 549 and 550, as a result of which a circuit is closed over a path extending from the positive terminal lead 526, contacts 503 of relay 678, lead 527, contacts 501 of relay 656, lead 525, lead 529, winding of relay 528, lead 530, lead 525, lead 531, closed make contacts 522 of relay 516A, winding of relay 516A, lead 533, closed contacts 549 of relay 548A, winding of relay 548A, lead 551, lead 545, winding of relay 546, lead 547, contacts 502 of relay 656, lead 519, contacts 504 of relay 678, to negative terminal lead 520, thus causing relay 548A to lock-up over its own contacts and thus operating relay 546.

Relay 548B does not lock up but falls back when the circuit through its winding is opened in a manner described hereinafter.

The closure of contacts 550 of relay 548A, closes a potential circuit through these contacts, lead 552.

Relay 546, in operating, opens contacts 505, thus opening the locking circuit as for relays 539A, B, C, etc., which now release and open their respective contacts 541. Relay 548A locks up before relay 546 opens its contacts 505.

Relay 546, in operating, closes contacts 553, closing a circuit over a path from the positive lead 526, through contacts 503 of relay 678, lead 527, contacts 501 of relay 656, lead 535, lead 554, contacts 506 of relay 565, contacts 553 of relay 546, lead 555, and series-connected relays 556A, B, C, etc., lead 540, lead 518, contacts 502 of relay 656, lead 519, contacts 504 of relay 678, to negative terminal lead 520, thus operating relays 556A, B, C, etc.

Relays 556A, B, C, etc., in operating, close their contact points 557.

The circuit is now closed from lead 122 extending to the Retainer and representing "O," over a path including lead 562, contacts 557 of operated relay 556C, lead 563, lead 564, winding of relay 565, lead 566, lead 547, through contacts 502 of relay 656, lead 519, contacts 504 of relay 678, to negative lead 520, thus operating relay 565.

Relay 565, in operating, opens contacts 506, thus opening the operating circuit for relays 556A, B, C, etc. which fall down. Relay 565, in operating, closes contacts 569 and locks up over these contacts, and also closes contacts 570.

This closes the circuit from positive lead 526, contacts 503 of relay 678, lead 527, contacts 501 of relay 656, lead 535, contacts 570 of relay 565, contacts 507 of relay 576, lead 571, through series-connected relays 572A, B, C, etc., lead 540, lead 518, contacts 502 of relay 656, lead 519, contacts 504 of relay 678, to negative lead 520, thus operating relays 572A, B, C, etc.

Relays 572A, B, C, etc., in operating, close their respective contacts 573. This closes a circuit from line 123 from the Retainer, and representing the letter "A," over a path which includes lead 574, closed make contacts 573 of relay 572A, lead 575, winding of relay 576, lead 577, lead 547, contacts 502 of relay 656, lead 519, contacts 504 of relay 678, to negative lead 520, thus operating relay 576. Relay 576, in operating, locks itself up through its own contacts 578, and opens contacts 507, opening operating circuit for relays 572A, B, C, etc., which fall back. Relay 576 closes contacts 579 and closes the circuit for the next letter D.

The operation of relay 576 closes a circuit from positive lead 526, through contacts 503 of relay 678, lead 527, contacts 501 of relay 656, lead 535, lead 580, break contacts 508 of relay 588, contacts 579 of relay 576, lead 581, windings of series-connected relays 582A, B, etc., lead 540, lead 518, contacts 502 of relay 656, lead 519, contacts 504 of relay 678 to negative lead 520, thus operating relays 582A, B, etc., which close their respective contacts 583.

A circuit is now closed from line 121 from the Retainer, representing "D," over a path which includes lead 584, closed make contacts 583 of relay 582A, lead 585, winding of relay 586, lead 1585, lead 587, winding of relay 588, lead 547, contacts 502 of relay 656, lead 519, contacts 504 of relay 678, to negative lead 520, thus operating relays 588 and 586.

Relay 586, in operating, closes its own locking circuit at contacts 589, closing the circuit from lead 525, through contacts 522 of relay 516A, through relay 516A, through lead 524, lead 533, closed contacts 550 of relay 548A, lead 552, closed contacts 589 of relay 586, one winding of relay 586, lead 590, lead 587, winding of relay 588, lead 547 back to negative lead 520 via contacts on relays 656 and 678. Relay 586, in operating, also closes contacts 591 for a potential closed circuit through lead 592.

Energized relay 588 opens contacts 508, opening the operating circuit for relays 582A, B, etc. which fall back.

Energized relay 588 closes its own locking circuit at contacts 593.

Relay 588, in operating, closes its contacts 594, closing a circuit which extends from the positive lead 526, upper contacts of relays 678 and 656, lead 535, closed contacts 594 of relay 588, contacts 509 of relay 601, lead 595, through the windings of series-connected relays 596A, B and C, lead 540, lead 518, contacts 502 of relay 656, lead 519, contacts 504, to negative terminal lead 520, thus energizing relays 596A, B and C which operate to set up a circuit for the next stored symbol from the Retainer.

Relays 596A, B and C, in operating, close their respective contacts 597.

The setting of the locking circuit for relay 586, representing the letter "D" of the name "Broad," with the letters BR—D specifically established by means of relays 516A, 548A and 586, now leaves us with a situation where we must differentiate between Broad St., and Broadway, Manhattan and Broadway, Brooklyn.

It should be noted at this time that the 516A relay was set and locked up for the first letter B, while the 548A relay was set and locked up for the second letter R, while the 586 relay was set and locked up for the fifth letter D. The third and fourth letters O and A did not set and lock up any relays outside of the sequence relays 565 and 576.

If the next impulse from the Retainer comes through line 127, which line represents ST. (the street symbol), we should have Broad St. established by operating relay 598 over a circuit which includes the closed contacts 597 of relay 596A, lead 1050, winding of relay 598, and back to negative terminal lead 520. Lead 127 represents only the street symbol. Each lead from the Retainer to the Address Board represents a different symbol.

The next impulse, however, comes through line 124, representing the letter "W." Accordingly, a circuit is completed from line 124, through lead 599, contacts 597 of relay 596B, lead 600, winding of relay 601, lead 547, contacts 502 of relay 656, lead 519, contacts 504 of relay 678, to negative lead 520, thus operating relay 601. Relay 601, in operating, closes its own locking circuit at contacts 602 and opens contacts 509 thus releasing relays 596A, B, C, etc. Since the symbol ST. has not been received by the Address Board at this time, the address Broad St. cannot be indicated on the Information Board.

Relay 601 in operating closes contacts 603. This closes a circuit from the positive lead 526, through contacts 510 of relay 608, through contacts 603 of relay 601, through lead 604, the windings of relays 605A, B and C in series, lead 540, lead 518, contacts 502, lead 519, contacts 504 to negative lead 520, thus operating relays 605A, B and C. Relays 605A, B and C, in operating, close their respective contacts 606.

Relay 605A, in operating, closes a circuit from line 123 from the Retainer, representing letter "A," over lead 574, closed contacts 606 of relay 605A, lead 607, winding of relay 608, lead 547, contacts 502 of relay 656, lead 519, contacts 504 of relay 678, to negative lead 520, thus operating relay 608.

Relay 608, in operating, closes its own locking circuit at its own contacts 609, and opens contacts 510, thus opening the operating circuit for relays 605A, B and C which fall back. Relay 608, in operating, also closes contacts 610 which completes a circuit from positive lead 526 through contacts 503 and 501, lead 535, contacts 610, contacts 511 of relay 616, lead 611, windings of series relays 612A, B and C, lead 540, lead 518, contacts 502, lead 519, lead 504, to negative lead 520, thus operating relays 612A, B, C, etc.

Relays 612A, B and C, in operating, close their respective contacts 613, thus closing a circuit for the next impulse coming from line 120, representing letter "Y" in the Retainer, over lead 614, contacts 613 of relay 612A, lead 615, winding of sequence relay 616, lead 617, lead 547, lead 518, contacts 502, lead 519, contacts 504 to negative lead 520, thus operating relay 616.

Relay 616, in operating, closes its own locking circuit at contacts 618 and opens contacts 511, opening the operating circuit for relays 612A, B, C, etc. which now fall back.

It may be noticed that the impulse arriving over line 120, representing letter "Y," did not establish the letter upon the Address Board but only served to establish the sequence for the next impulse from the Retainer. This is because the letter "Y" is unnecessary in identifying Broadway itself.

Thus Broadway has the same first two and the fifth distinguishing letters BR—D as Broad St. If the address Broad St. had been desired there would have been required the use of the letter line 127, representing St., in the sixth sequence, which, however, was not used in this instance where the address is Broadway. Broadway will be distinguished as to its location in Manhattan or Brooklyn, in the ninth sequence, which is the next to be established.

Relay 616, in operating, also closes contacts 619, completing a circuit to operate relays 621A, B and C over a path from positive lead 526, contacts 503 and 501, lead 535, contacts 512 of relay 627, contacts 619 of relay 616, lead 620, windings of relays 621A, B and C in series, lead 540, lead 518, contacts 502, lead 519, contacts 504, to negative lead 520, thus operating relays 621A, B and C.

Relay 621B, in operating, closes a circuit from lead 125 to the Retainer over a path through contacts 622 of relay 621B, lead 624, winding of relay 625, lead 1624, lead 626, winding of relay 627, lead 628, lead 547, contacts 502 of relay 656, lead 519, contacts 504 of relay 678 to negative lead 520, thus operating relay 627 and relay 625. Lead 125 from the Retainer represents the Manhattan symbol designation.

Sequence relay 627, in operating, closes its own locking circuit at its own contacts 629, closes contacts 630 and opens contacts 512.

Relay 625, in operating, closes contacts 631, as a result of which a circuit is closed to operate relay 633 in a Vertical Area Group over a path from positive lead 526, through contacts 503 of relay 678, lead 527, contacts 501 of relay 656, lead 529, winding of relay 528, lead 530, lead 525, contacts 522 of relay 516A, winding of relay 516A, lead 524, lead 533, contacts 550 of relay 548A, lead 552, contacts 591 of relay 586, lead 592, contacts 631 of relay 625, lead 632, winding of relay 633, lead 634, lead 635, lead 519, contacts 504, to negative lead 520.

Energizing of relay 633, in operating, closes its own locking circuit at contacts 343 and also closes contacts 636. The locking circuit for relay 633 is locked up over a path from positive lead 526, contacts 503 of relay 678, lead 637, closed contacts 343 of relay 633, winding of relay 633, lead 634, lead 635, lead 519, contacts 504 of relay 678, to negative lead 520. The closure of contacts 636 of relay 633, closes a circuit from lead 637, through lead 638, winding of relay 639, contacts 636 of operated relay 633, lead 640, lead 635 to lead 519, contacts 504 of relay 678 to negative lead 520, thus operating relay 639 in the same Vertical Area Group.

Relay 639, in operating, closes the bank of contacts 641, 642, 643, 644, 645, 646, 647, 648, 649.

Relay 625, in operating, also closes contacts 650 and 651, but no complete closed circuit is effected through these contacts at this time.

The opening of contacts 512 due to the operation of relay 627 opened the operating circuit for relays 621A, B and C and released these relays. Relays 621A, B and C, in falling back, opened the operating path for relay 625, thus de-energizing relay 625, and opening contacts 631, 650 and 651.

The closing of contacts 630 of sequence relay 627, completes a circuit to operate relay 654 over a path from positive lead 526, lead 535, contacts 630, contacts 652 of relay 1060, lead 653, winding of relay 654, lead 540, contacts 502, lead 519, contacts 504, to negative lead 520. Relay 654, in operating, closes contacts 655.

The next closed circuit from the Retainer is through line 130 which represents the dash symbol or impulse which separate the two parts of a Point of Departure or a Point of Arrival address; in this case, separating Broadway, Manhattan from 91 St.

The circuit from the Retainer is now closed through line 130, winding of relay 655, lead 519, contacts 504 of relay 678 to negative lead 520, thus operating relay 656. Relay 656, in operating, opens contacts 501 and 502 of relay 656, and opens the circuit from the D. C. source 1 extending to leads 525 and 518.

As a result of this, relay 528 is de-energized and opens its make contacts 534. Relay 532 is de-energized and closes its break contacts 500, thus closing lead 517 through these closed contacts. Relay 516A is de-energized because its locking circuit is opened by the opening of contacts 501 and 502 of relay 656. When relay 516A falls back, it opens its own contacts 522 and 521. Lead 533 is opened by the release of relay 516A. Relay 548A is de-energized by the release of relay 516A. When relay 548A falls back, it opens its own contacts 549 and 550. Lead 552 is opened by the release of relay 548A. Relay 586 is de-energized by the opening of contacts 550 of relay 548A. When relay 586 falls back, it opens its own contacts 589 and 591. Lead 592 is opened by the release of relay 586. The circuit through leads 535 and 547 are opened by the operation of relay 656, thus opening the locking circuit path for and causing sequence relays 546, 565, 576, 588, 601, 608, 616 and 627 to de-energize and fall back. Break contacts 505, 506, 507, 508, 509, 510, 511, 512 of these respective relays are again closed. Make contacts 553, 569, 570, 578, 579, 593, 594, 602, 603, 609, 610, 618, 619, 629, and 630 of these relays open when these relays fall back. The Address Board is now at its original normal or neutral position, except for the retained setting of that Vertical Area Group in which relays 633 and 639 are operated and cause the closure of their respective make contacts 641, 642, 643, 644, 645, 646, 647, 648, 649, 636, 343.

At this time it should be noted that the system of the Address Board is so designed that there is a Vertical Area Group comprising a set of relays and associated contacts for each thorofare.

The second part of the point of departure address is 91 St. which is sent next from the same Retainer. The opening of line 130 on the Retainer (representing the end of the dash impulse) de-energizes relay 656, and causes it to fall back and close its break contacts 501 and 502.

The next closed circuit in sequence from the Retainer is over line 128, representing the number "9." A circuit is now closed from line 128, through lead 657, through rectifier 659, winding of relay 658, lead 517, break contacts 500 of relay 532, lead 518, break contacts 502 of relay 656, lead 519, break contacts 504 of relay 678, to negative lead 520, thus operating relay 658. Relay 658, in operating, closes make contacts 660 and 661 and completes a circuit to operate relays 658, 528 and 532 over a path from positive lead 526, break contacts 503 of relay 678, lead 527, break contacts 501 of relay 656, lead 525, winding of relay 528, leads 530 and 525, make contacts 660 of relay 658, winding of relay 658, make contacts 661 of relay 658, lead 523, winding of relay 532, lead 518, break contacts 502 of relay 656, lead 519, break contacts 504 of relay 678, to negative lead 520.

Relay 532, in operating, opens contacts 500, and thus opens the original operating circuit for relay 658.

General sequence relay 528, in operating, closes make contacts 534, and completes a circuit from the positive lead 526, through contacts 503 of relay 678, lead 527, break contacts 501 of relay 656, lead 535, lead 536, make contacts 534 of relay 528, lead 537, break contacts 505 of relay 546, lead 538, through the windings of series-connected relays 539A to L inclusive, lead 540, break contacts 502 of relay 656, lead 519, break contacts 504 of relay 678 to negative lead 520, thus operating relays 539A to L.

Energizing of relays 539A to L, in operating, close their respective contacts 541, as a result of which a circuit is closed from the Retainer for the next line 129 in sequence, representing number "1," over a path from line 129, over lead 662, through closed contacts 541 of relay 539A, lead 664, winding of relay 665, lead 1664, lead 545, winding of general sequence relay 546, lead 547, contacts 502 of relay 656, lead 519, break contacts 504 of relay 678, to negative lead 520, thus operating relays 665 and 546.

Relay 665, in operating, closes its contacts 666 and 667, as a result of which a potential circuit at contacts 667 is closed through lead 668, but this potential circuit is not completed at this time. Closed makes contacts 666 of relay 665, however, close a circuit from the positive lead 526, through break contacts 503 of relay 678, lead 527, break contacts 501 of relay 656, lead 525, lead 529, winding of relay 528, lead 530, contacts 660 of relay 658, winding of relay 658, lead 669, make contacts 666 of relay 665, through relay 665, lead 551, lead 545, through winding of relay 546, lead 547, break contacts 502 of relay 656, lead 519, break contacts 504 of relay 678, to negative lead 520, operating relay 546. Relay 665 locks up over its own contacts 666. The Address is now established as 91 on the Address Board.

Relay 546, in operating, opens its break contacts 505, thus opening circuit which operated relays 539A to L, and releasing relays 539A to L. General sequence relay 546, in operating, also closes its make contacts 553, thus closing circuit from lead 535 on which positive potential appears, through lead 554, break contacts 506 of relay 565, make contacts 553 of relay 546, lead 555, the windings of series-connected relays 556A to E, lead 540, lead 518, break contacts 502 of relay 656, lead 519, break contacts 504 of relays 678, to negative lead 520, thus operating relays 556A to E.

Relays 556A to E, in operating, close their respective contacts 557, and close a circuit from the Retainer from line 127, representing the symbol St., through lead 670, through closed make contacts 557 of relay 556B, lead 671, winding of relay 672, lead 1671, lead 673, lead 564, winding of general sequence relay 565, lead 566, lead 547, break contacts 502 of relay 656, lead 519, through break contacts 504 of relay 578 to negative lead 520, thus operating relays 565 and 672.

Relay 672, in operating, closes its make contacts 673, 674, 675 and completes a circuit from the positive lead 526, through break contacts 503 of relay 678, lead 527, break contacts 501 of relay 656, lead 525, winding of relay 528, lead 525, make contacts 660 of relay 658, winding of relay 658, lead 669, make contacts 667 of relay 665, lead 668, through make contacts 674 of relay 672, lead 675, through closed make contacts 645 of the Vertical Area Group relay 639, lead 676, through to Route Board where it finds a closed circuit on Route Board establishing the area of the point of departure.

Closed make contacts 673 of relay 672, find no closed circuit through lead 677 on this particular vertical area group. This is because the intersection of 91 St. and Broadway is the center of its area so no precise directions are necessary. Where 91 St. intersects a thorofare which is not the center of an area, this lead will follow through as to precise direction purposes. In New York city, 91 St. and Broadway is the center of an area extending from 89 St. to 93 St. because there is at this location a subway entrance or a selected designated point of embarkation for a public conveyance. A better understanding of this will appear later.

The closing of make contacts 585 of relay 672, closes a circuit through lead 679, through the winding of relay 680, to lead 635. On lead 635 appears a negative potential from negative lead 520 through the break contacts 504 of relays 678, as a result of which the aforementioned potential circuit is completed to operate relay 680.

Relay 680, in operating, closes its make contacts 681 and locks itself up over a circuit from lead 635, through the winding of relay 680, contacts 681, to lead 637 which extends to the positive lead 526 via contacts 503 of relay 678. The closure of contacts 682 of relay 680 completes an obvious circuit to operate Vertical Area Grouping relay 683.

Relay 683, in operating, closes Vertical Area Grouping, makes contacts 684, 685, 686, 687, 688, 689 for 91 Street.

However, the operation of relay 683 serves no purpose since it immediately becomes de-energized. It should be observed that the operation of any Vertical Area Grouping relay representing the second part of an address serves no useful purpose. It is only the Vertical Area Grouping relay representing the first part of an address which is useful inasmuch as it closes a path to the Route Board for its specific intersecting street, in this case 91 St., via lead 675, contacts 645 of relay 639 to lead 676.

The next impulse or symbol from the Retainer is the period symbol or impulse, which separates the point of departure from the point of arrival, and this impulse arrives over line 131. A circuit is closed from line 131, through the winding of relay 678 to the negative lead 520, thus operating relay 678. Relay 678, in operating, opens its break contacts 503 and 504 which removes the negative and positive potentials from all of the relays on the Address Board, thus neutralizing the whole Address Board.

At this time it should be observed that if 91 St. were the first part of the originating address, and Broadway the second part or intersecting thorofare, then the same information would be passed onto the Route Board over the same lead 676 but in this case the only Vertical Area Grouping relay which would serve a useful purpose is relay 683 and its associated contacts.

At the termination of the period symbol, line 131 extending to the Retainer becomes inactive; that is, no positive potential appears on this line in the Retainer. Relay 678 will, therefore, release and close contacts 504 and 503.

The Address Board is now ready to receive the next address which is the point of arrival. This address has been assumed as Broadway, Brooklyn—919. In printing a particular numbered address, the thorofare title is printed first and the number last. The number then always serves as an intersecting line and does not require a specially operated Vertical Area Grouping relay.

The establishment of the thorofare "Broadway" of the point of arrival address on the Address Board now is a repetition of the operational steps previously described in establishing the thorofare "Broadway" of the point of departure address on the Address Board. This is to be followed by setting up or establishing "Brooklyn" on the Address Board.

The impulse representing letter Y in Broadway arrives over line 120 from the Retainer and causes general sequence relay 616 to operate which, in turn, causes relays 621A, B and C to operate in the manner previously described. The operation of relays 621A, B and C close their respective contacts 622, as a result of which a circuit is closed from the next line in sequence, namely, 126, representing the symbol "Brooklyn," over a path from the Retainer, through lead 690, make contacts 622 of relay 621A, lead 691, through the winding of relay 692, lead 1691, lead 626, winding of general sequence relay 627, lead 628, lead 547, break contacts 502 of relay 656, lead 519, break contacts 504 of relay 678, to negative lead 520, thus operating relays 692 and 627.

The operation of general sequence relay 627 opens the operating path for the previously operated series-connected relays which now fall back.

Relay 692, in operating, closes it make contacts 693, 694 and 695, and causes a circuit to be completed to operate relay 698 over a path which is traced from lead 592, lead 696, closed contacts 695 of relay 692, lead 697, winding of relay 698, lead 699, lead 635, to negative lead 520. Relay 698 locks up over its own contacts 700.

Energized relay 698 represents the Vertical Area Grouping relay for "Broadway" in Brooklyn. Relay 698, in operating, also closes its contacts 701, completes a circuit from lead 637, which is connected to positive lead 526, through lead 702, through the windings of relays 703 and 704 in series, through contacts 701 of relay 698, to lead 635 which is connected to negative lead 520, thus operating relays 703 and 704. Relay 704, in operating, closes contacts 705, 706, 707, 708, 709, 710, 711 and 712, while relay 703, in operating, closes contacts 713 and 714. It will thus be observed that multiple relays may be used in a Vertical Area Grouping system where, if necessary, in order to take care of more contacts than a single relay can advantageously handle.

The next closed line in sequence from the Retainer is line 130, representing the dash which separates Broadway, Brooklyn from the numbered address 919. A circuit is completed from line 130 through the winding of relay 656, through lead 519, through break contacts 504 of relay 678, to the negative lead 520, thus operating relay 656.

Relay 656, in operating, opens break contacts 501 and 502, thus opening the holding paths for all relays except 698, 703 and 704 which are the Vertical Area Grouping relays for Broadway, Brooklyn. All these other relays now release.

The Address Board except for the operated Vertical Area Grouping relays is thus neutralized.

In establishing the address number 919 for Broadway, Brooklyn, the same operational steps are followed in establishing the first two numerals 91 on the Address Board as were previously described for establishing the same two numerals for 91 St. in the point of departure address, on the Address Board.

As previously described in connection with the point of departure address, the setting up of impulses representing 91 caused the operation of relays 556 A to E.

The operation of relays 556 A to E closed their respective contacts 557, and closed through to the Address Board from the Retainer the next circuit in sequence which is through line 128 representing the next numeral 9. This circuit is completed over a path from line 128, lead 715, contacts 557 of relay 556A, through lead 716, winding of relay 717, lead 1716, lead 564, winding of general sequence relay 565, lead 566, lead 547, closed contacts 502 of relay 656, lead 519, closed contacts 504 of relay 678 to negative lead 520, thus operating relays 717 and 565.

Relay 565, in operating, opens the operating circuit for the previously operated series-connected 556 A, etc. relays which now fall back.

Relay 717, in operating, closes make contacts 718, as a result of which a circuit is closed over a path from the closed contacts 667 of relay 665, through lead 668, closed contacts 718 of relay 717, lead 720, closed contacts 709 of relay 704, lead 722 to the selected area on the Route Board. Relay 717, in operating, also closes make contacts 719, closing a circuit through lead 721, contacts 710 of relay 704, and lead 723 to specific intersection indicating panel on the Information Board.

It should be noted than an address number (such as 919) does not operate a Vertical Area Group relay.

The next closed line in sequence from the Retainer to the Address Board is line 131, representing the period, and the circuit completed over this line neutralizes the complete Address Board, as before.

Let it be assumed that instead of Broadway Manhattan—91 St. being typed up on the Retainer as the point of departure in the exact order indicated, the operator had typed up 91 St.—Broadway Manhattan. In such a case, the same information as to area location on the Route Board would be passed on to the Route Board as follows: The Vertical Area Grouping for 91 St. comprises operated relay 683 which closes its contacts 684, 685, 686, 687, 688, 689. The closure of contacts 684 of relay 683 completes a path from lead 676 extending to Route Board, over lead 725, through closed contacts 64, lead 724, closed contacts 650 of operated relay 625, lead 592, closed contacts 591 of relay 586, lead 552, closed contacts 550 of relay 548A, lead 533, through the winding of relay 516A, closed contacts 522 of relay 516A, lead 531, lead 525, lead 530, winding of relay 528, lead 529, lead 525, to closed contacts 501 of relay 656, lead 527, contacts 503 of relay 678, to the positive lead 526 of D. C. source 1.

In typing up this address, the relays 683 and 680 are both operated prior to the operation of relays 516A, 548A, 586 and 625, because 91 St. appears before Broadway, Manhattan. This shows how, whether the address is established Broadway, Manhattan—91 St. or 91 St—Broadway, Manhattan, the same complete circuit to the same area on the Route Board is achieved through the one line 676, except that certain relays on the Address Board are operated in a different order.

It will be recalled that when the operator on the Transfer circuit closed her set key OP'1, a circuit was closed from 287 on the Transfer circuit, through lead 98 on the Retainer, through one winding of relay 99, on the Information Board-Route Board control mechanism, through lead 100, through a particular sequence-out relay on the Retainer, through the closed contacts of a selected relay in a horizontal bank of relays in the Retainer and then to the Address Board, thus operating relay 99. Relay 99 in operating, closes its own locking circuit at its contacts 330, over a circuit which is traced from positive lead 2, through lead 3, lead 136, lead 135, through the other (lower) winding of relay 99, closed contacts 330, lead 134, the contacts 133 of normally closed Off-key K, lead 27, to the negative terminal of source 1. Relay 99, in locking up, closes all of its contacts 330, 921, 137 and 138. The closure of contacts 137 and 138 closes potential circuit from source 1, through lead 2, lead 3, lead 136, lead 139, closed contacts 138 of relay 99, and through lead 140 onto the Route Board.

As mentioned above, a circuit from the Address Board was closed through lead 676 representing the point of departure Broadway Manhattan—91 St., to the Route Board.

In designing the Address Board, there are provided as many series relays 516A, B, etc. as there are (a) alphabetical letters which may be used as the first letter in a name thorofare and (b) numbers which may be used for the first number in a numbered thorofare. Thus there are 26 plus 10 or 36 relays 516 A, B, etc. to take care of all letters of the alphabet and all numbers 0 to 9.

The series relays 539 A, B, etc. take care of the second letter in a name thorofare and the second number in a numbered thorofare, and also indicate the street or avenue or type of thorofare. Thus there may be 26 plus 10 plus 5 or about 41 such relays 539 A, B, etc. Twenty-six of these 539 relays take care of the alphabet. Ten of these 539 relays take care of the numbers 0 to 9. One 539 relay will designate a street, another an avenue, a third a road, a fourth a lane, etc. In practice, however, since each letter in the alphabet and each number and the street designation may be repeated more than once as a second symbol, there should be as many more relays as there are possibilities of the second symbol being established in two or more thorofare titles or numbers in the second sequence.

For the third letter of the originating address, if needed, and for the third number of the numbered thorofare, there are provided the 556 A, B, C series of relays. In practice, the number of relays in each series will become smaller and smaller as the number of letters in an address being typed up progressively moves on. Thus, it is only necessary to have as many relays in each series as are necessary to distinguish different streets from one another. In the case of the 556 series relays, there may be as many as forty-one such relays to take care of the 26 letters of the alphabet, plus the 10 numbers (0 to 9), plus the thorofare type symbols. Here again, in practice, there should be provided additional relays to take care of repetitions of the third symbol.

For the fourth letter of the originating address, there are provided the series of 572 relays, and there may be as many as forty-one such relays, although only a few have been shown. As above, additional relays should be provided in practice to take care of repetitions of the fourth symbol.

For the fifth letter of the originating address, there are provided the series of 582 relays, and there may be as many as thirty such relays to take care of the alphabet and the thorofare designations, such as St., Ave., Rd., Lane, Drive, etc.

The series of 596 relays take care of the sixth letter of the originating address or the following thorofare designation, such as St. There may be as many as thirty such 596 relays.

For the seventh letter of the originating address, there are provided the series of 605 relays. There may be as many as thirty such 605 relays to take care of the alphabet and the thorofare designations.

As above mentioned for the second to the fourth letters, there should be included in the system additional relays for the fifth to the seventh letters, etc. to take care of repetitions of these letters or symbols in the same sequence.

There may be as many 621 relays in series as there are letters in the alphabet plus the usual thorofare designations; perhaps thirty such 621 relays.

There are about thirty 654 relays in series to take care of the alphabet plus type designations.

There are as many Vertical Area Groups as there are thorofares inasmuch as each thorofare has individual thereto a particular Vertical Area Group. It is assumed that each thorofare has many intersecting streets.

A very brief and general review of the operation of the Address Board will now be given. The sending of the dash symbol by the Retainer (the dash symbol separates the two intersecting streets of the point of departure address) results in the release of all of the sequence relays set up in the Address Board, as a result of which there remain operated in the Address Board only those relays which are in a selected Vertical Area Group and through whose contacts the specific intersection is registered.

It should be understood that when a particular symbol or letter is sent out by the Retainer to the Address Board, the sequence out relay in the Retainer switches the Retainer system from one horizontal bank of relays to another. When the symbol or letter stored in the Retainer is received on the Address Board, there is set up a specific sequence relay on the bottom and also a particular general sequence relay (related to the specific sequence relay). However, the switching in the Retainer from one bank of relays to another is not completed until the specific and associated general sequence relays are operated in the Address Board to condition the Address Board to receive the following impulse from the Retainer.

After the general sequence relays and the specific sequence relays on the Address Board are released by the receipt of the dash symbol when the first thorofare title has been completely sent out by the Retainer, and established in its Vertical Area Group on the Address Board, the intersection street or address number is then sent out by the Retainer and the impulses or symbols of this street act to again set up the same general and specific sequence relays (more or fewer depending upon the number of symbols in the intersection street or address number as compared to the number of symbols in the preceding thorofare) on the Address Board.

*Route Board*

The Route Board is normally in a neutral condition in which all relays are un-energized.

The Route Board includes several circuits which are designated as Transfer points 1, 2, 3, 4 and 5. These transfer points refer to locations where a traveler can transfer from one mode or line of transportation to another; for example, from subway to elevated or street car, or from one subway line (BMT) to another subway line (IRT) etc.

The Route Board also includes a plurality of similarly arranged but different groups of relays N10, N11, N12, N13—N22, etc. Each group of such relays is shown in a dotted line box and determines a specific area location and comprises a pair of left hand relays 769 and 780, and a pair of right hand relays 768 and 2034. The left hand relay 769 sets up the point of departure by closing a potential circuit into the travel route lines. The right hand relay 768 sets up the point of arrival by closing a potential circuit from the travel route lines. The current flows into the travel route lines over a path set up by the left hand relays (point of departure) and flows out of the travel route lines over a path set up by the right hand relays (point of arrival). The arrangement is such that the right hand relays (representative of the point of arrival) cannot operate until after the left hand relays (representative of the point of departure) have operated and set up the point of departure area on the route board.

Each travel route line has assigned to it many groups of relays N1, N2, etc. If the travel line is a subway or an elevated line or has relatively widely spaced stops, then there are as many groups of relays N1, N2, etc. as there are subway stations or stops, and each stop or station is the center of a particular area location to which a group of relays is assigned. For more closely spaced stops, for example, on a street car line which stops on every block, several stops may be represented in this system by a single stop.

Each group of relays such as N10, N11, N12, etc. includes the following: A relay 780 having make contacts 885, and 886 and 887 which, when closed, serve to close potential circuits to specific information panels on the Information Boards of each of the three operators. A relay 769 having make contacts 787, 788, which, when closed, serve to close a potential circuit to the Route Board from leads 2032 and 2033. A relay 768 having make contacts 785, 786 which, when closed, serve to close a potential circuit from the Route Board over a path extending through leads 812 and 7813, and rectifiers 808 and 809 which control the direction of current flow. A relay 2034 having make contacts 2035, 2036 and 2037 which, when closed, serve to close potential circuits to specific information panels on the individual Information Boards of the three operators.

As mentioned before, a circuit was closed from lead 676 on the Address Board extending to the Route Board and representing a point of departure address. This circuit is completed over a path from lead 676 on which a positive potential appears from the Address Board, through lead 752, one winding of relay 769, lead 770, winding of polarized relay 771, lead 772, winding of polarized relay 773, lead 774, closed contacts 750, lead 775, closed break contacts 2582 of relay 2583, bottom winding of relay 2580, to negative lead 776 of the D. C. source 1, thus operating relay 2580, polarized relays 771 and 773 and relay 769.

Relay 2580, in operating, closes its make contacts 2581 and locks up over a path extending from lead 676 from the Route Board, lead 752, winding of relay 769, lead 770, lead 2584, top winding of relay 2580, closed contacts 2581 of relay 2580, bottom winding of relay 2580 to the negative lead 776.

Relay 2580, in operating, opens its break contacts 2585 and prevents the operation of relay 768 over a path which extends from lead 676, lead 3000, the winding of relay 768, lead 796, the winding of polarized relay 797, closed contacts 784, lead 798, the winding of relay 2583, open break contacts 2585 of relay 2580 (now opened) to the negative lead 776. As a result of this open circuit, the operation of right hand relay 768 is prevented at this time, and hence the establishment of a point of arrival address is prevented at this time until all the stored information regarding the point of departure has been removed from the Retainer Board.

Relay 769 which is the point of departure relay of area N11 has thus been operated together with polarized relays 771 and 773. Relay 769, in operating, closes its own locking circuit at contacts 777 over a path from positive lead 778, closed contacts 751 of relay 896, through lead 1778, through lead 779, winding of relay 780, closed contacts 777 of relay 769, winding of relay 769, through lead 782, lead 783, and lead 776 to the negative terminal of D. C. source 1, thus operating relay 780 in series with relay 769. The operation of relay 780 closes its contacts 885, 886 and 887 for passing along to the Information Board, the necessary point of departure information. Each pair of these last contacts of relay 780 is individual to a separate information board panel. The closure of contacts 887 serve to complete a circuit to operate Information Board for operator #1 over lead 897.

Polarized relay 771, when energized, opens contacts 750, thus opening its own operating circuit and the operating circuit of relay 773 which extends to lead 676 to the Address Board.

The operation of polarized relay 773 closed contacts 784 and established a potential circuit for setting and locating the point of arrival address on the Route Board.

Operated relay 769 closed contacts 787 and 788 and established a potential circuit over a path extending from the positive lead 778, lead 789, through rectifiers 790 and 791, through leads 792 and 793, contacts 787 and 788 of relay 769, and then to the route travel lines.

When the closed circuit through lead 676 is opened at the Address Board (which occurs when the period symbol has operated relay 678 in the Address Board and opened its associated contacts), the operating circuit is then opened for relay 2580, which now falls back and opens its make contacts 2581 and closes its break contacts 2585. The Route Board mechanism is now set or ready to receive the point of arrival information from the Address Board.

When the Brooklyn address was set up at the Address Board, the Vertical Area Group relay 704 for Broadway in Brooklyn had operated and closed a path through contacts 709 of operated relay 704, to lead 722 extending to the Route Board. This circuit path continued through lead 794 on the Route Board, winding of relay 795 of area N18, lead 796, winding of relay 5500, winding of polarized relay 797, contacts 784 (these contacts were previously closed by the energization of polarized relay 773 during the setting up operation of the point of departure in area N11), lead 798, winding of relay 2583, break contacts 2585 of relay 2580, lead 776, to the negative terminal of D. C. source 1, thus operating relays 795, 5500, 797 and 2583.

The function of relay 5500 will be described later in connection with the description of the Information Board.

Relay 795 in area N18 is the point of arrival relay for this area, and in operating, locks up its own circuit at contacts 799, over a path from positive lead 778, through contacts 751 of relay 896, lead 1778, lead 800, winding of relay 795, closed contacts 799, winding of relay 801, lead 783, to the negative lead 776, thus operating relay 801. The operation of relay 801 closes its contacts 888, 889, and 890 for passing along to the Information Board, the necessary point of arrival information. Each of these contacts of relay 801 is individual to a different Information Panel or Board.

The operation of polarized relay 797 caused it to open contacts 784, which remain open, and to close contacts 750 which remain closed, until a new address is to be received on the Route Board, thereby conditioning the Route Board for the reception, at a later time, of a new point of departure address or location.

The operation of relay 2583 causes it to lock up through its closed make contacts 2600, and to open its contacts 2582, thus opening the operating circuit for relay 3001 in area N18 at this time. Relay 3001 is the point of departure relay for this area N18, and since the point of arrival information for area N18 is now being received by the Route Board at this time, the opening of the operating circuit for relay 3001 is an added precaution against the operation of undesired relays at undesired times.

The opening of the closed circuit through lead 722 at the Route Board (which occurs at the completion of the point of arrival address followed by the period symbol which releases all of the operated relays in the Address Board), opens the operating circuit for relay 2583 in the Route Board, causing it to fall back and open its make contacts 2600 and to close its break contacts 2582, thus conditioning the Route Board for setting up the next received address which will start with a point of departure.

The operation of point of arrival relay 795 in area N18 closed its contacts 803 and 804, and closed a circuit over a path which includes these contacts, leads 806 and 807, leads 812 and 813, rectifiers 808 and 809, lead 810, winding of relay 811, lead 778, closed contacts 751 of relay 896, lead 1778, lead 779, winding of relay 780, closed contacts 777 of relay 769, left winding of relay 769, lead 782, lead 1783, and lead 776 to negative terminal of D. C. source 1.

There is now completed a potential circuit over the route lines in the Route Board, through closed contacts 787 and 788 of point of departure relay 769 of area N11, and through closed contacts 803 and 804 of point of arrival relay 795 of area N18. This allows the establishment of a route through the Route Board with the current flowing only in one direction as permitted by the arrangement of the rectifiers. The direction of this current flow is from the positive terminal lead 778 through the system and back to the negative terminal lead 776. The plate electrode of the rectifiers is indicated by the arrow symbol which is also the direction of current flow.

The following identifies the travel or route lines through the Route Board as they will be used in the address assumed above, in explaining the operation of the system and taking into consideration existing subway facilities in New York city.

Route line 813—IRT express—Uptown—Broadway subway line.

Route line 814—IRT local—Uptown—Broadway subway line—from point of departure.

Route line 822—IRT local—Uptown—Broadway subway line—to point of arrival.

Route line 815 — IRT express — Downtown — Broadway subway line.

Route line 816—IRT local—Downtown—Broadway subway line—from point of departure.

Route line 823—IRT local—Downtown—Broadway subway line—to point of arrival.

Route line 999—6th Ave.—To Brooklyn—"D" train.

Route line 817—6th Ave.—From Brooklyn "D" train.

Route line 818—6th Ave.—Downtown—"F" train.
Route line 819—6th Ave.—Uptown—"F" train.
Route line 820—BMT—To Jamaica subway train.
Route line 821—BMT—From Jamaica subway train.

In the foregoing travel lines, the direction of travel flow is the same as the direction of current flow through the Route Board. Rectifiers are suitably provided to insure the proper unidirectional current flow for these lines.

It will be noticed that, as for instance with the Jamaica train, two lines 820 and 821, have been provided. In circuit with line 820 there is a rectifier 2000 at Transfer point #5. This allows the current at this transfer point to flow in one direction only. In circuit with line 821 there is a rectifier 2001 at Transfer point #5, which allows the current at this point to flow in the opposite direction only. Therefore, the current in the two lines 820 and 821 are controlled so as to simulate the opposite streams of traffic on a thorofare or other route having a two-way flow of traffic.

A similar arrangement is obtained in line 818 by means of rectifiers 2002, 2003 and 2004, in Transfer points #5, #4 and #3, respectively, and in travel line 819 by means of rectifiers 2005, 2006 and 2007 in Transfer points #5, #4 and #3, respectively.

A similar arrangement is also obtained in travel line 817 by means of rectifiers 2008, 2009, 2010 and 2011 at Transfer points #4, #3 and #2 and #1, respectively, and in travel line 999 by means of rectifiers 2012, 2013, 2014 and 2015 at Transfer points #4, #3, #2 and #1, respectively.

Similarly, unidirectional current flow is obtained in local travel lines 814, 822, 823, 816 by means of rectifiers 2016, 2017, 2018 and 2019 respectively, at Transfer points #1 and #2.

A unidirectional flow of current is obtained in express travel lines 813 and 815 by means of rectifiers 2020 and 2021, respectively.

Other rectifiers are provided along route lines, exclusive of transfer points, such as rectifiers 4005, 3070, 826, 2611 and 6813 for controlling the direction of current flow along these route lines.

A closed circuit through the Route Board for establishing the travel route is now established over a path extending from positive lead 778, lead 789, through rectifier 791, lead 793, contacts 787 of operated point of departure relay 769 of area N11, line 816 representing the local downtown departure line of Broadway, contacts 825 of relay 824, line 822, through rectifier 826, contacts 4000 of relay 4001, travel line 816, lead 855 of Transfer point #2, break contacts 856 of relay 1856, through rectifier 857, winding of relay 2061, break contacts 1857 of relay 2857, winding of relay 2042, travel line 999, break contacts 759 of relay 766, through rectifier 2013, winding of slow operating relay 861, break contacts 2022 of relay 2023, through break contacts 4008 of relay 4009, continued through line 999, break contacts 846 of relay 876, break contacts 845 of slow operating relay 852, through rectifier 897, winding of relay 2065, break contacts 896 of slow operating relay 877, break contacts 870 of relay 1870, line 818, winding of relay 4006, winding of relay 2024, break contacts 2025 of slow operating relay 2030, winding of relay 2069, rectifier 2026, break contacts 2027 of slow operating relay 2031, break contacts 2028 of fast operating relay 2029, travel line 820 (representing To Jamaica), through rectifier 4005, closed make contacts 803 of operated arrival relay 795, lead 806, through lead 812, through rectifier 808, lead 810, winding of relay 811, break contacts 751 of relay 896, lead 1778, lead 779, winding of relay 780, make contacts 777 of point of departure relay 769, winding of relay 769, lead 782, lead 783, and lead 776 to the negative terminal of D. C. source 1, thus operating relays 2061, 2042, 861, 4006, 2065, 2024, 2069, 811.

Relay 2042 operates and closes its contacts 2041, but since contacts 2040 of relay 860 are not closed at this time, no through circuit is made from travel line 999, over a possible path through make contacts 2040 of relay 860, winding of relay 2857, make contacts 2041 of relay 2042 to the other side of travel line 999.

The relays identified by the letter "F" are faster operating relays than the relays identified by the letter "S." The "F" relays are connected in series onto the lines diverting the circuit path from one route or travel line to another route or travel line. The "S" relays are connected in series onto the route lines themselves.

Relay 861, in operating, opens its break contacts 760, 2044, 2050 and 2051 and prevents a double circuit which would otherwise be closed from travel line 999, through the now opened break contacts 760 of relay 861, through rectifier 764, break contacts 761 of relay 869, break contacts 863 of relay 862, travel line 818, break contacts 2046 of relay 2047, through rectifier 2003, relay 877, break contacts 870 of relay 1870, and over a continuation of travel line 818.

The opening of break contacts 4007 at relay 4006, now operated, prevents a back-track from travel line 999 at Transfer point #4, over a possible path, through the winding of relay 876, contacts 2052 of relay 852, through rectifier 2053, break contacts 2054 of relay 2056, break contacts 2055 of relay 2047, travel line 819, now opened break contacts 4007 of relay 4006, travel line 819, break contacts 2057 of relay 862, break contacts 2058 of relay 2060, through rectifier 2059, break contacts 2050 of relay 861, break contacts 2022 of relay 2023, and travel line 999 to Transfer point #4.

The operation of relay 2024 opened its contacts 2048 and prevents a possible double circuit.

In the operation of the system, it is desired to close only one complete circuit representing the path of travel to be taken and to open all other alternative or double circuits not to be used at this time.

The operation of relay 2061 at Transfer point #2 closed its contacts 2064, 2063 and 2062 which closed potential circuits to information panels on the Information Boards of the three operators.

Relay 780 operated make contacts 885, 886 and 887 which closed potential circuits to information panels on the Information Boards of the three operators.

The operation of relay 2065 at Transfer point #4 closes its contacts 2066, 2067 and 2068 which closed potential circuits to information panels on the Information Boards of the three operators.

The operation of relay 2069 at Transfer point #5 closes its contacts 2070, 2071 and 2072 which closed potential circuits to information panels on the Information Boards of the three operators.

Relay 801 operated make contacts 888, 889, 890 which closed potential circuits to information panels on the Information Boards of the three operators.

The operation of relay 811 causes it to close its contacts 895. This relay 811 is timed so as to allow any momentary self-adjustment of the Route Board relays that may be necessary to fulfill their functions. After this timing period, the contacts 895 are closed, completing a circuit from the Route Board-Information Board control mechanism along the lead 140 from the Retainer assigned to operator #1, through closed contacts 895 of timed relay 811, winding of relay 896, lead 897, through all closed contacts such as 887 of relay 780 in area N11 to its specific information panel on the Information Board, thus operating relay 896. This lead 897 also connects through the closed contacts 2062 of relay 2061 at Transfer Point #2, and also through closed contacts 2068 of relay 2065 at Transfer point #4, and through contacts 2072 of relay 2069 at Transfer point #5, and through contacts 888 of relay 801 of area N18, all of which contacts connect with the Information Board and find closed circuits therein. The closure of lead 897 to the Information Board, through the contacts of the selected operated relays on the Route Board operates certain relays in the Information Board which lock up and cause the illumination or display (on the Information Board) of the information necessary to travel from the point of departure address to the point of arrival address. It should be noted that a particular Information Board is selected, and this Information Board is individual to the operator who typed up the addresses which initiated the steps hereinabove described.

The operation of relay 896 over the foregoing circuit over lead 140 from the Retainer, causes it to open its contacts 751, as a result of which the locking circuits for the point of departure setting relay 769 and point of arrival relay 795 is opened, thus releasing relays 769 and 795. Relay 769, in falling back, opens contacts 787, 788 and 777, while relay 795, in falling back, opens contacts 803, 804 and 799.

Since relay 769 controls the operating paths for relays 2042, 4006, 2065, 801, 5500, 2061, 861, 2068, 2024, 2069, 811 and 896, these relays also release upon the release of relay 769. Relay 2061 at Transfer point #2, in releasing, opens its contacts 2062, 2063 and 2064. Relay 861 at Transfer point #3, in releasing, closes contacts 760, 2044, 2050 and 2051. Relay 2065, in releasing, at Transfer point #4, closes contacts 2066, 2067 and 2068. Relay 2024 at Transfer point #5, in releasing, closes contacts 2049 and 2048. Relay 2069 at Transfer point #5, in releasing, closes contacts 2070 and 2071 and 2072. Relay 811, in releasing, opens contacts 895. Relay 896, in releasing, opens contacts 751.

The Route Board is now in a neutral condition with all relays therein unenergized.

*Information board*

The closure of the circuit from lead 140 extending over a path from the Info. Board-Route Board control mechanism on the Retainer and through line 897 on the Route Board completes a circuit through winding of relay 902 on the Information Board, to lead 903, back to the Retainer, then though contacts 904 of relay 912, lead 905, and lead 27 to the negative terminal of D. C. source 1, thus operating relay 902.

The operation of relay 902 in the Information Board causes it to lock up over its operated contacts 906 in series with lamp 911, thus illuminating lamp 911. This locking circuit for relay 902 is completed over a path which extends from the positive terminal of source 1 in the Retainer, lead 2, lead 3, lead 909, through normally closed off-key contacts 910 of the off-key K, lead 908, closed contacts 906 of relay 902 in Information Board, through lamp 911, upper winding of relay 902, lead 907, winding of relay 912 on the Retainer, closed contacts 137 of relay 99, lead 132, to negative lead 27, thus operating relay 912 in series with relay 902.

Relay 912, in operating, opens contacts 904 and 5505. The opening of contacts 904 opens the circuit which originally operated relay 902 in the Information Board.

Similarly, the closure of the circuit from lead 140 in the Info.-Board-Route Board control mechanism on the Retainer and through leads 898, 899, 900 and 901 on the Route Board causes circuits to be completed through the windings of relays 4010, 4011, 4012 and 4013, respectively on the Information Board to operate these relays. These operated relays lock up in series with their respective lamps 4014, 4015, 4016 and 4017 in a manner similar to the locking up of relay 902 described before. The locking circuits for these relays 902, 4010, 4011, 4012 and 4013 are electrically in parallel relation, since they are interconnected to leads 7000 and 7001.

Lamps 911, 4014, 4015, 4016 and 4017, in lighting, display the information which the operator can pass on to the calling subscriber to inform him of the travel route. For example, the operator will tell the subscriber to take the IRT subway at Broadway and 91 St., downtown local, change at 59 St. to the D train to Brooklyn on the 6th Ave. Independent line, then change at 4th St. to the F train, 6th Ave. Independent line going downtown, then change or transfer at Delancey Street to the Jamaica train on the BMT line going to Jamaica, and to disembark at the Broadway, Myrtle Ave. station.

The Information Board contains a special panel labeled "Within Area Panel" for the purpose of enabling the operator to furnish specific directions for traveling from a terminal station; for example, a station representing the station of de-embarkation, to a specific street location in the area of which the terminal station is a centering point. Let it be assumed that specific travel directions within an area are desired only at the point of arrival or de-embarkation and the inquiring caller knows how to reach the terminal station of the point of departure.

On the "Within Area Panel" are lines which represent the thorofares and their intersecting streets. At the center of this Within Area panel is a circle designated "Point" which represents the center of the area and which constitutes the exact location of the terminal station of arrival or de-embarkation. At each intersection on this panel there is a lamp which, when illuminated, indicates the precise location of the point of arrival address relative to the terminal station of arrival address relative to the terminal station of arrival indicated by "Point." Each of these lamps has a separate relay in circuit therewith for energizing it in response to the operation of certain Vertical Area Group relays in the Address Board. Only four such lamps are shown in the Within Area panel for the purpose of describing the principles of the invention, particularly for indicating the exact address 919 Broadway in Brooklyn, as assumed above.

A specific description of the operating mechanism for the Within Area panel will now be given. This operating mechanism includes relay 5500 on the Route Board, with its make contacts 5501, 5502 and 5503, the closing of which by relay 5500 closes potential circuits to the Within Area direction panel on the Information Board of each operator. There are also included such relays as relay 913 on the Within Area information panel. There are also such lights as 919 on the Within Area panel at the intersections.

When the initial operating circuit for relay 795 (point of arrival relay for area N18), in the Route Board, had been closed by the operation of the desired Vertical Area Group relays in the Address Board, a circuit had been closed through lead 796 which had caused relay 5500 on the Route Board to operate. It will be observed that relay 5500 can only operate when the point of arrival address is established on the Route Board, and at no other time. The operation of relay 5500 closes its contacts 5501, 5502 and 5503, closing potential circuits to the Within Area information panels of the operators' Information Boards.

When the circuit had been closed through contacts 709 of the Vertical Area Group relay 704 for Broadway in Brooklyn on the Address Board, establishing the point of arrival address through lead 722, a closed circuit had also been completed through contacts 710 of this same relay 704 over a path extending through lead 723 onto the Information Board, the bottom winding of relay 913 on the Within Area Information panel, lead 914, lead 915, extending to the Route Board, through closed contacts 5503 of relay 5500, lead 5504, onto the Retainer, through normally closed break contacts 5505 of relay 912, closed contacts 137 of relay 99, lead 132, and lead 27 to the negative terminal of D. C. source 1, thus operating relay 913 in the Within Area panel of the Information Board.

The operation of relay 913 in the Within Area panel closes its contacts 918, and causes it to lock up over a circuit from the positive terminal of D. C. source 1 on the Retainer, lead 2, through lead 917, extending to the Information Board, closed contacts 918 of relay 913, through lamp 919, the upper winding of relay 913, lead 920 extending to the Retainer, through closed contacts 921 of relay 99, lead 134, through normally closed contacts 133 of off-key "K," and negative lead 27, thus illuminating lamp 919 whose street intersection represents the specific address location relative to the station of arrival or de-embarkation.

The illuminated intersection at light 919 is separated from the "Point" by two spaces and an intervening thorofare. The position of the Within Area information panel on the Information Board shows that the location of the precise intersection is north of the "Point." It therefore follows that the operator can readily interpret the information on the Within Area information panel as indicating that the desired precise intersection location of the address is two blocks north of the station of de-embarkation which is Broadway and Myrtle Avenue.

If instead of this specific point of arrival address, the de-embarkation station was, for instance, 10th St. and Broadway, and the desired precise address intersection was 12th St. and Broadway which is two blocks north of 10th St., Broadway, the same lamp 919 would be illuminated and the same information would be derived with the same correctness of interpretation.

This last information derived from the "Within Area Panel" is passed on to the inquiring caller by the operator immediately after informing the caller of the mode of travel to be followed between terminal stations.

*Off-key "K" in retainer*

When the operator is finished using the displayed information on the Information Board, the off-key "K" on the Retainer is depressed. This opens the operating circuits of all of the relays on the Information Board and also opens the operating circuit for relays 99 and 912 in the Information Board-Route Board control mechanism in the retainer.

As a result of the operation of the off-key "K," the following occurs: Relay 99 of the control mechanism is de-energized and falls back, thus opening its make contacts 137, 138, 330 and 921. Relay 912 is de-energized and falls back, and closes its break contacts 904 and 5505. Relay 902 in the Information Board is de-energized and causes its make contacts 906 to open, thus opening the circuit through lamp 911 whose illumination is now extinguished. Relay 4010 is de-energized and falls back, opening the circuit through lamp 4014 whose illumination is now extinguished. Relay 4011 is de-energized and falls back, opening the circuit through lamp 4015 whose illumination is now extinguished. Relay 4012 is de-energized and falls back, opening the circuit through lamp 4016 whose illumination is now extinguished. Relay 4013 is de-energized and falls back, opening the circuit through lamp 4017 whose illumination is now extinguished. Relay 913 is de-energized and falls back, opening the circuit through lamp 919 whose illumination is now extinguished.

The Information Board is now conditioned to have new travel directions to be displayed on it.

*Summary of general operation of entire system*

The operator first types up the point of departure address on her typewriter which sets up and locks certain relays in the Retainer. Each symbol typed up will lock up a single relay in a horizontal bank of relays in the Retainer. Different symbols typed up or even the same symbol appearing more than once in an address will operate relays in different horizontal banks. The operator then types up the point of arrival address which similarly operates different relays in other different horizontal banks in the Retainer. Sequence-in relays in the Retainer function to cause the banks of relays to operate sequentially. Sequence setting relays in the Retainer serve to lock-up the particular relay operated and selected in each bank. Sequence out relays serve to permit the information stored by the operated relays in the different banks to pass out to the common Address Board under control of the common Transfer circuit.

There are as many Retainers as there are operators.

The Retainer also includes a correction key for knocking down or restoring to normal all of the relays in the Retainer alone, in the event the operator desires to retype or correct the address.

The Retainer further includes an Information Board-Route Board control mechanism which serves the following purposes: (1) conditions the common Route Board to transmit the travel route information to a selected Information Board, (2) conditions the common Address Board to transmit the specific location within a general area to the "Within Area Panel" of the Information Board.

The Route Board contains relays which are operated in response to impulses received from the Address Board. The Route Board differentiates between the point of departure address information and the point of arrival address information and sets up relays in accordance with this information. Depending upon the particular relays operated in the Route Board, there will be established the travel route to be taken from the point of departure to the point of arrival. After this travel route has been established, the Route Board transmits this travel route information to a particular Information Board which is assigned to the particular operator who had originally typed up this information on the keyboard and which was stored in her Retainer circuit.

Individual to each operator is an Information Board which furnishes information as to the mode of transportation to be taken between the terminal station of departure and the terminal station of arrival, and also furnishes information as to the precise location of the point of arrival relative to the terminal station of arrival. Lamps are used to indicate this information. Each Information Board has circuits to indicate all possible stations of embarkation and de-embarkation, as well as transfer stations which might be used in traveling anywhere in the city or town or geographical area to be serviced by the system of the invention. Each Information Board also has a "Within Area Panel" provided with lamps and intersecting street lines for definitely locating the precise address of point of arrival relative to the terminal station of arrival on the travel route.

The transfer mechanism controls the Retainers to allow only one Retainer at a time to pass on its stored information along to the common Address Board. This transfer mechanism includes set-keys which are individual to the different operators. After the operator has set up the point of departure and point of arrival addresses on her Retainer, she will depress or operate her set-key on the Transfer mechanism which, in turn, permits her Retainer to empty its information into the common Address Board, provided this Address Board is not at this time receiving information from another Retainer. The Transfer mechanism assigns the common Address Board to the different Retainers in accordance with the order in which the different set-keys are operated. The common Address Board, in turn, will not receive the information from any one Retainer until it (the Address Board) has had passed through it all the information previously received from a prior operating Retainer.

The Address Board receives the information from a Retainer, and, in response to this information, operates certain relays which are individual to certain thorofares. Since each address typed up in the Retainer (whether the point of departure or the point of arrival) includes a thorofare and its intersecting street or address number of the thorofare, there will be two relay mechanisms operated in the Address Board for each address, one relay mechanism corresponding to the thorofare and the other relay mechanism corresponding to the intersecting street or address number. Depending upon the particular two relay mechanisms operated in the Address Board there will be set up a circuit condition which automatically establishes a particular address on the common Route Board in accordance with the general area containing this address. The Address Board also establishes the specific address location of the point of arrival in relation to the terminal station of arrival or de-embarkation.

After the receipt of the period symbol by the Address Board, it will automatically restore itself to normal and immediately be conditioned to receive address information stored in any one other Retainer.

After the Route Board has set up the proper circuits on the Information Board of a particular operator, it will restore itself to normal, and immediately be conditioned to receive specific information from the Address Board.

Thus, the operation of the off-key by the particular operator whose Information Board is being illuminated will merely restore to normal her Info. Board-Route Board control mechanism and her own Information Board.

*Setting up another address*

In describing the invention, it has been assumed that the first query for travel directions from a calling subscriber involved the point of departure address Broadway, Manhattan—91 Street, Manhattan, and the point of arrival address Broadway Brooklyn—919, where 919 is the street number.

Let it now be assumed that the next calling subscriber requests travel directions from Tab St., Manhattan and Bridle Ave. in Manhattan (the point of departure), to Robin Ave., Brooklyn and "O" St., in Brooklyn (the point of arrival), assuming these specific addresses merely for purposes of further explaining the principles of the invention, and that this specific query follows the foregoing query for travel directions from operator #1.

The first operational step in using the system of the invention is the storage of this address information on a Retainer by the particular operator receiving the request for travel information from a calling subscriber. Let it be assumed that operator #2 has received this second query and that she has typed up these addresses on her keyboard. The address information is then stored on her Retainer. The operation of the set-key of operator #2 on the Transfer circuit follows the storage of the address onto the Retainer. The Retainer is now ready to have its stored material tranferred onto the common Address Board.

When relay 678 on the Address Board had been energized by means of the closed circuit from the Retainer of operator #1, due to the receipt of a period impulse at the end of the point of arrival address, over a path through lead 131 and through the winding of relay 678, to the negative lead 520, it opened contacts 503 and 504, as a result of which the entire Address Board was neutralized. The Retainer of operator #1 was also neutralized by the release of relay 450, and caused the release of relays 257, 265, 268 and 279 in the Transfer circuit, thus conditioning the Transfer circuit to close a circuit extending from lead 287' in the Transfer circuit, through the sequence out relays of the Retainer for operator #2, through the respective closed contacts of locked-up relays in the horizontal banks of the Retainer for operator #2, to the Address Board.

The first symbol "T" of Tab St. Manhattan is transferred from the Retainer of operator #2 to the Address Board by the closed circuit through lead 6136, lead 2300, through rectifier 341, the winding of relay 516H, lead 517, closed break contacts 500 of relay 532, lead 518, break contacts 502 of relay 656, lead 519, break contacts 504 of relay 678, to negative lead 520, thus operating relay 516H.

Relay 516H, in operating, closes its locking circuit by closing its make contacts 2301 and 2302. This closes a circuit extending over a path from the positive lead 526, break contacts 503 of relay 678, lead 527, break contacts 501 of relay 656, lead 529, winding of general sequence relay 528, lead 530, lead 525, closed make contacts 2302 of relay 516H, winding of relay 516H, closed make contacts 2301 of relay 516H, lead 523, winding of relay 532, lead 518, break contacts 502 of relay 656, lead 519, break contacts 504 of relay 678 to negative lead 520, thus operating relays 528 and 532.

Relay 532, in operating, opens its contacts 500. This prevents any other relay 516A, B, C, etc. from operating, by opening at contacts 500 the possible through circuit.

Relay 528, in operating, closes its contacts 534 as a result of which a circuit is closed from the positive lead 526, through break contacts 503 of relay 678, lead 527, break contacts 501 of relay 656, lead 535, lead 536, closed contacts 534 of relay 528, lead 537, break contacts 505 of relay 546, lead 538, the windings of series-connected relays 539 A, B, C, etc., lead 540, lead 518, break contacts 502 of relay 656, lead 519, break contacts 504 of relay 678, to negative lead 520, thus operating relays 539 A, B, C, etc.

Relay 516H closes a potential circuit thru lead 2303 and establishes the letter T as the initial letter in the Address Board.

Relays 539 A, B, C, etc., in operating, close their respective make contacts 541. The closure of these contacts 541 completes a circuit from the Retainer for the next symbol A, over a path which includes lead 123 representing this particular symbol, lead 574, closed make contacts 541 of relay 539G, lead 2304, the winding of relay 2305, lead 2306, the winding or relay 2307, lead 2308, lead 545, the winding of general sequence relay 546, lead 547, break contacts 502 of relay 656, lead 519, break contacts 504 of relay 678, to negative lead 520, operating relays 2305, 2307 and 546. Relay 2305, in operating, closes its respective contacts 2309, 2310 and 2311.

Relay 2307, in operating, closes contacts 2312 and 2313 locking its circuit through its contacts 2313, over a path from positive lead 526, break contacts 503 of relay 678, lead 527, break contacts 501 of relay 656, lead 529, winding of relay 528, lead 530, lead 525, closed make contacts 2302 of relay 516H, winding of relay 516H, lead 2303, closed make contacts 2313 of relay 2307, winding of relay 2307, lead 551, lead 545, thru winding of relay 546, lead 547, break contacts 502 of relay 656, lead 519, break contacts 504 of relay 678, to negative lead, thus operating relay 546.

A potential closed circuit is close through make contacts 2312 of relay 2307 and through lead 2314. Relay 546, in operating, opens its break contacts 505. This opens lead 538 making it series-connected relays 539 A, B, C, etc., fall back and open their respective contacts 541. Relay 2305 falls back due to the opening of contacts 541, thus opening its contacts 2309, 2310 and 2311.

Symbols T and A are established on the Address Board to identify Tab by means of locked-up relay 516H and relay 2307.

Relay 546, in operating, also closes its make contacts 553, closing a circuit extending from positive lead 526, break contacts 503 of relay 678, lead 527, break contacts 501 of relay 656, lead 535, lead 554, break contacts 506 of relay 565, closed make contacts 553 of relay 546, lead 555, the winding of series-connected relays 556 A, B, C, etc., lead 540, lead 518, break contacts 502 of relay 656, lead 519, break contacts 504 of relay 678, to negative lead 520, thus operating relays 556 A, B, C, etc., and causing these operated relays to close their respective make contacts 557.

The closed contacts 557 of relay 556D closes a circuit for the next symbol "B," from the Retainer over a path from lead 109 representing this particular symbol, through lead 558, closed make contacts 557 of relay 556D, lead 2315, lead 564, winding of general sequence relay 565, lead 566, lead 547, break contacts 502 of relay 656, lead 519, break contacts 504 of relay 678, to negative lead 520, thus operating relay 565.

Relay 565 locks-up at its closed contacts 569 over a path from positive lead 526, break contacts 503 of relay 678, lead 527, break contacts 501 of relay 656, lead 535, closed contacts 569 of relay 565, winding of relay 565, lead 547, break contacts 502 of relay 656, lead 519, break contacts 504 of relay 678, to negative lead 520.

Relay 565, in operating, opens break contacts 506, opening the circuit through lead 555, causing its series-connected relays 556 A, B, C, D, etc., to fall back and open their respective contacts 557. It may be noticed at this time that the symbol "B" is not set specifically on the Address Board at this time, in order to identify the thorofare title "Tab," because the letters TA are sufficient to distinguish Tab from any other thorofare, for example, from T street.

Relay 565, in operating, closes its make contacts 570, closing a circuit from the negative lead 526, break contacts 503 of relay 678, lead 527, break contacts 501 of relay 656, lead 535, closed contacts 570 of relay 565, closed break contacts 507 of relay 576, through lead 571, the windings of series-connected relays 572 A, B, C, etc., lead 540, lead 518, break contacts 502 of relay 656, lead 519, break contacts 502 of relay 656, lead 519, break contacts 504 of relay 678, to negative lead 520, thus operating the relays 572 A, B, C, etc., and closing their respective contacts 573.

The operation of the 572 A, B, C, etc. relays closes a circuit for the next symbol Street from the Retainer over a path which includes lead 127 representing this symbol, lead 670, closed contacts 573 of operated relay 572F, lead 2316, winding of relay 2317, lead 2318, lead 575, winding of relay 576, lead 577, lead 547, break contacts 502 of relay 656, lead 519, break contacts 504 of relay 678, to negative lead 520, operating relays 2317 and 576.

Relay 2317, in operating, closes its contacts 2319, 2320 and 2321. This completes the previously mentioned potentially closed circuit involving lead 2314, over a path, through lead 2322, closed contacts 2320 of relay 2317, lead 2323, winding of relay 2326, lead 2327, lead 635, lead 519, break contacts 504 of relay 678, to negative lead 520, thus operating the Vertical Group relay 2326.

Relay 2326, in operating, locks-up at its own make contacts 2330 over a path from positive lead 526, break contacts 503 of relay 678, lead 637, closed make contacts 2330 of relay 2326, winding of relay 2326, lead 2327, lead 635, break contacts 504 of relay 678, to negative lead 520.

Relay 2326, in operating, also closes its make contacts 2328. This closes a circuit from the positive lead 526, break contacts 503 of relay 678, lead 637, lead 2331, winding of relay 2329, closed make contacts 2328 of relay 2326, lead 2332, lead 635, break contacts 504 of relay 678, lead 520 to the negative terminal, thus operating Vertical Group relay 2329.

The operation of relay 2329 closes its make contacts 2333, 2334, 2335, 2336, 2337, 2338, 2339, 2340, 2341 of the Vertical Area Grouping for Tab Street, Manhattan.

The closing of contacts 2319 and 2321 of relay 2317 does not result in a closed circuit through respective leads 2324 and 2325.

The operation of general sequence relay 576 opens its break contacts 507, opening the circuit through lead 571 and causing the series-connected relays 572A, B, C, etc., to fall back and open their respective make contacts 573. Relay 576, in operating, locks-up at its make contacts 578, completing a circuit from the positive lead 526, break contacts 503 of relay 678, lead 527, break contacts 501 of relay 656, lead 535, its closed contacts 578 of relay 576, winding of relay 576, lead 547, break contacts 502 of relay 656, lead 519, break contacts 504 of relay 678, to negative lead 520.

The operation of relay 576 also closes its make contacts 579, closing a circuit from the positive lead 526, the break contacts 503 of relay 678, lead 527, break contacts 501 of relay 656, lead 535, lead 580, break contacts 508 of relay 588, closed contacts 579 of relay 576, lead 581, the windings of series-connected relays 582A, B, C, etc., lead 540, lead 518, break contacts 502 of relay 656, lead 519, break contacts 504 of relay 678, to negative lead 520, thus operating relays 582A, B, C, etc. and causing them to close their respective contacts 583.

The operation of relay 582H closes its contacts 583, and completes a circuit for the next impulse from the Retainer over a path which includes line 125 representing the symbol Manhattan, lead 623, closed contacts 583 of relay 582H, lead 2342, lead 587, winding of relay 588, lead 547, break contacts 502 of relay 656, lead 519, break contacts 504 of relay 678, to negative lead 520, thus operating general sequence relay 588.

Relay 588, in operating, opened its break contacts 508, opening the circuit through lead 581, thus causing relays 582A, B, C, etc., to fall back and opening the respective contacts 583. Relay 588, in operating, locks-up at its own contacts 593, over a circuit from the positive lead 526, closed break contacts 503 of relay 678, break contacts 501 of relay 678, lead 535, closed contacts 593, the winding of relay 588, lead 547, break contacts 502 of relay 656, lead 519, break contacts 504 of relay 678, to negative lead 520.

Relay 588, in operating, closes its make contacts 594, closing a circuit extending from positive lead 526, break contacts 503 of relay 678, lead 527, break contacts 501 of relay 656, lead 535, closed contacts 594 of relay 588, contacts 509 of relay 601, lead 595, the windings of series-connected relays 596A, B, C, etc., lead 540, lead 518, break contacts 502 of relay 656, lead 519, break contacts 504 of relay 678, to negative lead 520, thus operating series relays 596A, B, C, etc., and causing them to close their respective contacts 597.

The last symbol, "Manhattan," received from the Retainer along lead 125 was unnecessary because its preceding symbol, Street, served to finally locate the specific thorofare Tab Street, Manhattan, under the assumption that there is no other similar Tab Street designation in the city being serviced, and the symbol Street set up the desired Vertical Area Group relays in the Address Board.

The Manhattan symbol, however, had been stored in the Retainer so it was necessary to remove this, even though it served no pertinent purpose. This has now been accomplished.

The next impulse is received from the Retainer along lead 130 and represents the dash line separating Tab Street, Manhattan from Bridle Ave., Manhattan. The circuit is closed from lead 130 from the Retainer, over a path which includes the winding of relay 656, lead 519, break contacts 504 of relay 678, to the negative lead 520, thus operating relay 656.

Relay 656, in operating, opens its contacts 501 and 502, which now open the closed locking circuits for all relays throughout the Address Board, the Vertical Area Group relays 2326 and 2329 for Tab St., Manhattan. Relays 596A, B, C, etc., fall back and their respective make contacts 597 open. Relay 2307 falls back and opens its make contacts 2312 and 2313. Relay 2317 falls back and opens its contacts 2319, 2320 and 2321. Relay 532 falls back and closes its break contacts 500. General sequence relay 528 falls back and opens its make contacts 534. General sequence relay 546 falls back and opens its make contacts 553 and closes its break contacts 505. General sequence relay 565 falls back closing its break contacts 506, and opening its make contacts 569 and 570. General sequence relay 576 falls back, closing its break contacts 507 and opening its make contacts 578 and 579. General sequence relay 588 falls back and closes its break contacts 508 and opens its make contacts 593 and 594. Relay 516H also falls back opening its contacts 2301 and 2302.

The Address Board is now neutral excepting for the locked-up relays representing the Vertical Area Group for Tab St., Manhattan.

The next, or intersecting thorofare of Tab St. to be established on the Address Board is Bridle Ave. Manhattan.

The circuit for lead 130 (representing the dash symbol) is opened at the Retainer, resulting in the release of relay 656 in the Address Board and the closure of its break contacts 501 and 502.

The next impulse from the Retainer comes through lead 109, representing the symbol "B," and completes a path through lead 514, rectifier 515, winding of relay 516A, lead 517, break contacts 500 of relay 532, lead 518, break contacts 502 of relay 656, lead 519, break contacts 504 of relay 678, to negative lead 520, thus operating relay 516A.

Operated relay 516A locks-up at its make contacts 522 and 521, and closes a circuit from the positive lead 526, break contacts 503 of relay 678, lead 527, break contacts 501 of relay 656, lead 529, winding of general sequence relay 528, lead 530, lead 525, lead 531, closed make contacts 522 of relay 516A, winding of relay 516A, lead 524, closed contacts 521 of relay 516A, lead 523, winding of relay 532, lead 518, break contacts 502 of relay 656, lead 519, break contacts 504 of relay 678, to negative lead 520, thus operating relays 528 and 532.

Relay 532, in operating, opens its break contacts 500, thus preventing any other relay 516B, C, etc., from being operated by opening the necessary operating circuit at these contacts.

The operation of relay 516A, closes a potential circuit over a path through lead 533, from lead 524, winding of relay 516A, contacts 522 of relay 516A and lead 525.

Relay 528, in operating, closed its make contacts 534, closing a circuit from the positive lead 526, over a path which includes the break contacts 503 of relay 678, lead 527, break contacts 501 of relay 656, lead 535, lead 536, closed make contacts 534 of relay 528, lead 537, break contacts 505 of relay 546, lead 538, the windings of series-connected relays 539A, B, C, etc., lead 540, lead 518, break contacts 502 of relay 656, lead 519, break contacts 504 of relay 678, to negative lead 520, thus operating the series relays 539A, B, C, etc., and causing them to close their respective contacts 541.

The operation of relay 539L closes its respective contacts 541, and closes a circuit for the next following impulse from the Retainer arriving through lead 105, representing the symbol "R," over a path through lead 542, the closed contacts 541 of relay 539L, lead 544, the windings of series-connected relays 548A and 548B, lead 1544, lead 545, winding of relay 546, through lead 547, break contacts 502 of relay 656, lead 519, break contacts 504 of relay 678, to negative lead 520, thus operating relays 548A and 548B and general sequence relay 546.

The operation of relay 548A closes its make contacts 549 and 550 causing it to lock-up over a circuit at its contacts 549 and closing a path from the previously mentioned potential lead 533, through closed make contacts 549 of relay 548A, through the winding of relay 548A, lead 551, lead 545, winding of relay 546, lead 547, break contacts 502 of relay 656, lead 519, breaks contacts 504 of relay 678, to negative lead 520.

Relay 548A, in operating, also closes its make contacts 550, closing a potential circuit through lead 552.

Relay 546, in operating, opens its break contacts 505, opening the circuit through lead 538, causing the series-connected relay 539A, B, C, etc., to release and open their respective contacts 541. The opening of contacts 541 on relay 539L opens the operating circuit for relay 548B, causing it to fall back.

Relay 546, in opening, closes its make contacts 553, completing a circuit from the positive lead 526, break contacts 503 of relay 678, lead 527, break contacts 501 of relay 656, lead 535, lead 554, break contacts 506 of relay 565, make contacts 553 of relay 546, lead 555, the windings of series-connected relays 556A, B, C, etc., lead 540, lead 518, break contacts 502 of relay 656, lead 519, break contacts 504 of relay 678, to negative lead 520, thus operating relays 556A, B, C, etc., and causing them to close their respective contacts 557.

The operation of relay 556F closes its contacts 557, and closes a circuit for the next impulse from the Retainer along line 6135 representing the letter "I," over a path which includes the closed contacts 557 of relay 556F, lead 2345, lead 564, winding of relay 565, lead 566, lead 547, break contacts 502 of relay 656, lead 519, break contacts 504 of relay 678, to negative lead 520, thus operating general sequence relay 565.

The operation of relay 565 opens its break contacts 506, opening the circuit through lead 555 and causing the series-connected relays 556A, B, C, etc., to fall back and open their respective contacts 557.

Relay 565, in operating, also locks up by closing its make contacts 569, over a circuit from positive lead 526, break contacts 503 of relay 678, lead 527, break contacts 501 of relay 656, lead 535, closed contacts 569 of relay 565, the winding of relay 565, lead 547, break contacts 502 of relay 656, lead 519, break contacts 504 of relay 678, to negative lead 520.

Relay 565, in operating, closes its make contacts 570, closing a circuit from the positive lead 526, and which includes the break contacts 503 of relay 678, lead 527, break contacts 501 of relay 656, lead 535, closed contacts 570 of relay 565, break contacts 507 of relay 576, through lead 571, the winding of series-connected relays 572A, B, C, etc., lead 540, lead 518, break contacts 502 of relay 656, lead 519, break contacts 504 of relay 678, to negative lead 520, thus operating series relays 572A, B, C, etc., and closing their respective contacts 573.

The operation of relay 572C closes its contacts 573, and closes the circuit for the next impulse from the Retainer through lead 121, representing the letter "D," over a path which includes lead 584, closed contacts 573 of relay 572C, lead 2346, lead 575, winding of relay 576, lead 577, lead 547, break contacts 502 of relay 656, lead 519, break contacts 504 of relay 678, to negative lead 520, thus operating general sequence relay 576.

Relay 576, in operating, opens its break contacts 507, opening the circuit through lead 571, and causing the series-connected relays 572A, B, C, etc., to fall back and open their respective contacts 573. Relay 576, in operating, also closes its own locking circuit at its contacts 578, over a path from the positive lead 526, break contacts 503 of relay 678, lead 527, break contacts 501 of relay 656, lead 535, closed make contacts 578, winding of relay 576, lead 547, break contacts 502 of relay 656, lead 519, break contacts 504 of relay 678, to negative lead 520.

Relay 576, in operating, closes its make contacts 579, and completes a circuit which can be traced from positive lead 526, break contacts 503 of relay 678, lead 527, break contacts 501 of relay 656, lead 535, lead 580, closed make contacts 508 of relay 588, break contacts 579 of relay 576, lead 581, the windings of series-connected relays 582A, B, C, etc., lead 540, lead 518, break contacts 502 of relay 656, lead 519, break contacts 504 of relay 678, to negative lead 520, thus operating series relays 582A, B, C, etc., and causing them to close their respective contacts 583.

The operation of relay 582E closes its contacts 583 and closes a circuit for the next impulse from the Retainer (representing letter "L"), through lead 6132, closed make contacts 583 of relay 582E, lead 2347, winding of relay 2348, lead 2349, lead 587, winding of relay 588, lead 547, break contacts 502 of relay 656, lead 519, break contacts 504 of relay 678, to negative lead 520, thus operating relay 2348 and general sequence relay 588.

Relay 2348, in operating, closes its make contacts 2350, 2351 and 2352. The closing of contacts 2350 completes circuit from the previously established potential circuit of lead 552, over a path which includes closed contacts 2350 of relay 2348, lead 2353, winding of relay 2354, lead 2355, lead 635, lead 519, break contacts 504 of relay 678, to negative lead 520, thus operating relay 2354.

Relay 2354, in operating, closes its own locking circuit at its contacts 2356 over a path traceable from the positive lead 526, break contacts 503 of relay 678, lead 527, lead 637, closed make contacts 2356 of relay 2354, winding of relay 2354, lead 2355, lead 635, lead 519, break contacts 504 of relay 678, to negative lead 520. Relay 2354, in operating, also closed contacts 2359, closing a circuit from the positive lead 526, through break contacts 503 of relay 678, lead 527, lead 637, lead 2357, winding of relay 2358, closed make contacts 2359 of relay 2354, lead 2360, lead 635, lead 519, break contacts 504 of relay 678, to negative lead 520, operating relay 2358.

Relay 2358, in operating, closes its make contacts 2361, 2362, 2363, 2364, 2365, 2366, 2367, thus setting the Vertical Area Grouping for Bridle Ave.

The operation of relay 2348 caused it to close its make contacts 2351, as mentioned before, and closes a circuit traceable from lead 552, through closed contacts 2351, lead 2362, closed make contacts 2338 of relay 2329 of Vertical Area Grouping for Tab St., through lead 2368 to the specific area on the Route Board.

The closing of contacts 2352 by the operation of relay 2348 closes the circuit traceable from line 552, through closed contacts 2352, lead 8888, closed make contacts 2339 of relay 2329 in the Vertical Area Grouping for Tab St., through lead 2369 to the Within Area panel on the Information Board, but does not complete a circuit in this panel.

General sequence relay 588, in operating, closed its own locking circuit at its make contacts 593 over a path traceable from positive lead 526, break contacts 503 of relay 678, lead 527, break contacts 501 of relay 656, lead 535, closed contacts 593, winding of relay 588, lead 547, break contacts 502 of relay 656, lead 519, break contacts 504 of relay 678, to the negative lead 520. Relay 588, in operating, opened its break contacts 508 and opened the circuit through lead 581, thus causing the series-connected relays 582A, B, C, etc. to fall back and open their respective contacts 583.

Relay 588, in operating, also closed its make contacts 594, closing a circuit extending from positive lead 526, break contacts 503 of relay 678, lead 527, break contacts 501 of relay 656, lead 535, make contacts 594 of relay 588, break contacts 509 of relay 601, lead 595, the windings of series-connected relays 596A, B, C, etc., lead 540, lead 518, break contacts 502 of relay 656, lead 519, break contacts 504 of relay 678, to negative lead 520, thus operating relays 596A, B, C, etc. and causing these last relays to close their respective contacts 597.

The closing of contacts 597 of relay 596D closes a circuit from the Retainer for the next impulse (representing the letter "E") along lead 6133, closed contacts 597 of relay 596D, lead 2370, lead 600, winding of general sequence relay 601, lead 547, break contacts 502 of relay 656, lead 519, break contacts 504 of relay 678, to negative lead 520, thus operating relay 601.

Relay 601, in operating, opens its break contacts 509, opening the circuit for lead 595, thus causing the series-connected relays to 596A, B, C, etc. to fall back and their respective contacts 597 to open. Relay 601, in operating, closed its own locking circuit at its make contacts 602 over a path which can be traced from positive lead 526, break contacts 503 of relay 678, lead 527, break contacts 501 of relay 656, lead 535, closed contacts 602 of relay 601, the winding of relay 601, lead 547, break contacts 502 of relay 656, lead 519, break contacts 504 of relay 678, to the negative lead 520.

Relay 601, in operating, also closed its make contacts 603, closing a circuit from the positive lead 526, break contacts 503, of relay 678, lead 527, break contacts 501 of relay 656, lead 535, closed contacts 510 of relay 608, closed contacts 603 of relay 601, lead 604, the windings of series-connected relays 605A, B, C, etc., lead 540, lead 518, break contacts 502 of relay 656, lead 519, break contacts 504 of relay 678, to negative lead 520, thus operating relays 605A, B, C, etc., and causing them to close their respective contacts 606.

The operation of relay 605D closes its contacts 606, and completes a circuit for the next impulse from the Retainer along lead 2343 representing the symbol for Avenue, over a path through closed contacts 606 of relay 605D, lead 2371, lead 607, the winding of general sequence relay 608, lead 547, lead 518, break contacts 502 of relay 656, lead 519, break contacts 504 of relay 678, to the negative lead 520, thus operating relay 608.

Relay 608, in operating, closes its own locking circuit at its contacts 609, over a path from the positive lead 526, break contacts 503 of relay 678, lead 527, break contacts 501 of relay 656, lead 535, closed contacts 609 of relay 608, the winding of relay 608, lead 547, lead 518, closed contacts 502 of relay 656, lead 519, break contacts 504 of relay 678, to the negative lead 520. The operation of relay 608 opened its contacts 510 and caused the release of the series-connected relays 605A, B, C, etc.

Relay 608, in operating, also closes its contacts 610, and closes a circuit extending from positive lead 526, break contacts 503 of relay 678, lead 527, break contacts 501 of relay 656, lead 535, closed contacts 610 of relay 608, break contacts 511 of relay 616, lead 611, the windings of series-connected relays 612 A, B, C, etc., lead 540, lead 518, break contacts 502 of relay 656, lead 519, break contacts 504 of relay 678, to the negative lead 520, thus operating relays 612 A, B, C, etc., and causing them to close their respective contacts 613.

The operation of relay 612C closes a circuit for the next impulse from the Retainer through line 125 representing the symbol for Manhattan, over a path which includes lead 623, closed contacts 613 of relay 612C, lead 2372, lead 615, winding of general sequence relay 616, lead 617, lead 547, break contacts 502 of relay 656, lead 519, break contacts 504 of relay 678, to the negative lead 520, thus operating relay 616.

The operation of relay 616 opens its contacts 511, opening the circuit through lead 611, and causing the series-connected relays 612A, B, C, etc., to fall back and open their respective contacts 613. Relay 616 locks up over its own contacts 618.

The operation of relay 616 also closed its make contacts 619, closing a circuit extending from the positive lead 526, break contacts 503 of relay 678, lead 527, break contacts 501 of relay 656, lead 535, break contacts 512 of relay 627, closed contacts 619 of relay 616, lead 620, the windings of series-connected relays 621A, B, C, etc., lead 540, lead 518, break contacts 502 of relay 656, lead 519, break contacts 504 of relay 678, to the negative lead 520, thus operating relays 621A, B, C, etc., and causing them to close their respective contacts 622.

The next impulse from the Retainer is through lead 131 representing the period symbol, and completes a circuit through relay 678, to the negative lead 520, thus operating relay 678.

Relay 678, in operating, opens its break contacts 503 and 504. This opens the operating circuit for all relays on the Address Board which now release. Relay 532 falls back opening its break contacts 500. Relay 516A falls back opening its make contacts 521 and 522. Relay 548A falls back opening its contacts 549, 550. Relay 2348 falls back opening its contacts 2350, 2351, 2352. Relay 528 falls back opening its make contacts 534. Relay 546 falls back opening its contacts 553 and closing its contacts 505. Relay 565 falls back opening its make contacts 569 and 570 and closing its break contacts 506. Relay 576 falls back opening its make contacts 578 and 579 and closing its break contacts 507. Relay 588 falls back opening its make contacts 593 and 594, and closing its break contacts 508. Relay 601 falls back opening its contacts 602 and 603, and closing contacts 509. Relay 608 falls back opening its make contacts 609 and 610, and closing its contacts 510. Relay 616 falls back opening its make contacts 618 and 619 and closing its break contacts 511. In falling back, relay 616 opens the operating circuit for relays 612A, B and C which also fall back. Relay 2354 falls back opening its make contacts 2359 and 2356. Relay 2358 falls back and opens its make contacts 2361, 2362, 2363, 2364, 2365, 2366 and 2367. Relay 2326 falls back opening its make contacts 2328 and 2330. Relay 2329 falls back opening its make contacts 2333, 2334, 2335, 2336, 2337, 2338, 2339, 2340, 2341. Prior to the release of all these relays, the information set up on the Address Board was passed onto the Route Board.

The opening of lead 131 at the Retainer makes relay 678 fall back, closing its contacts 503 and 504 and completely neutralizing the Address Board for the establishment of the point of arrival address.

The next Address to be established on the Address Board is the point of arrival, Robin Ave., Brooklyn—"O" St., Brooklyn.

Accordingly, the first impulse from the Retainer is through lead 105, representing the symbol "R," over a path through lead 542, through rectifier 2373, the windings of relay 516C, lead 517, break contacts 500 of relay 532, lead 518, break contacts 502 of relay 656, lead 519, break contacts 504 of relay 678, to the negative lead 520, thus operating relay 516C.

Relay 516C, in operating, closes its make contacts 340 and 339 and locks up over its own contacts over a circuit traceable from the positive lead 526, break contacts 503 of relay 678, lead 527, break contacts 501 of relay 656, lead 529, the winding of relay 528, lead 530, lead 525, closed make contacts 340 and winding of relay 516C, closed contacts 339 of relay 516C, lead 523, winding of relay 532, lead 518, break contacts 502 of relay 656, lead 519, break contacts 504 of relay 678, to the negative lead 520, thus operating relays 532 and 528.

Relay 532, in operating, opens its break contacts 500, preventing any other relay 516A, B, D, etc., from being operated by opening the possible operating circuit at contacts 500.

The operation of relay 516C closes a potential circuit through lead 335.

Relay 528, in operating, closes its make contacts 534 and completes a circuit from the positive lead 526, break contacts 503 of relay 678, lead 527, break contacts 501 of relay 656, lead 535, lead 536, closed contacts 534 of relay 528, break contacts 505 of relay 546, lead 538, the windings of series-connected relays 539 A, B, C, etc., lead 540, lead 518, closed contacts 502 of relay 656, lead 519, break contacts 504 of relay 678, to the negative lead 520, thus operating the series-connected relays 539A, B, C, etc. and causing them to close their respective contacts 541.

The operation of relay 539H closes its contacts 541, and completes a circuit for the next impulse from the Retainer arriving over lead 122, representing the symbol "O," over a circuit extending through lead 562, closed contacts 541 of relay 539H, lead 2374, the winding of relay 2375, lead 2376, lead 545, winding of relay 546, lead 547, break contacts 502 of relay 656, lead 519, break contacts 504 of relay 678, to the negative lead 520, thus operating relays 2375 and 546.

Relay 2375, in operating, closes its contacts 336, and completes a circuit from the previously established potential circuit at lead 335 over a path through the closed make contacts 336 of relay 2375, lead 2381, the winding of relay 2382, lead 2383, lead 635, lead 519, break contacts 504 of relay 678, to the negative lead 520, thus operating relay 2382.

Relay 2382 locks up over its own make contacts 353, over a path from the positive lead 526, break contacts 503 of relay 678, lead 527, lead 637, closed make contacts 353 of relay 2382, the winding of relay 2382, lead 2383, lead 635, lead 519, break contacts 504 of relay 678, to the negative lead 520.

Relay 2382, in operating, closes a circuit to operate relay 347 over a path from the positive lead 526, break contacts 503 or relay 678, lead 527, lead 637, lead 2385, the winding of relay 347, closed make contacts 346 of relay 2382, lead 345, lead 635, lead 519, break contacts 504 of relay 678, to the negative lead 520.

Relay 347, in operating, closes its make contacts 348, 349, 350, 351 and 352 of the Vertical Area Grouping for Robin Ave.

The remaining symbols of Robin Ave., Brooklyn are unnecessary to differentiate this particular thorofare from others. The removal of these stored symbols from the Retainer is now desired and is achieved as follows: Relay 546, in operating, opens its break contacts 505, opening the circuit through lead 538, thus causing the series-connected relays 539A, B, C, etc., to fall back and open their respective contacts 541. Relay 546, in operating, also closes its make contacts 553, closing a circuit from positive lead 526, through the break contacts 503 of relay 678, lead 527, the break contacts 501 of relay 656, lead 535, break contacts 506 of relay 565, break contacts 553 of relay 546, lead 555, windings of series-connected relays 556A, B, C, etc., lead 540, lead 518, break contacts 502 of relay 656, lead 519, break contacts 504 of relay 678, to the negative lead 520, thus operating relays 556A, B, C, etc. and causing them to close their respective contacts 557.

The operation of relay 556D closes a path for the next impulse from the Retainer along lead 109, representing the symbol "B," through lead 514, closed contacts 557 of relay 556D, lead 2315, lead 564, winding of relay 565, lead 547, closed contacts 502 of relay 656, lead 519, closed contacts 504 of relay 678 to negative lead 520, thus operating relay 565.

The operation of relay 565 opens its contacts 506, opening the circuit through lead 555, thus causing the series relays 556A, B, C, etc., to fall back and open their respective contacts 557.

The operation of relay 565 causes it to lock up over a path through its make contacts 569. In operating, this relay also closes its contacts 570, closing a circuit from the positive lead 526, through break contacts 503 of relay 678, lead 527, break contacts 501 of relay 656, lead 535, closed contacts 570 of relay 565, break contacts 507 of relay 576, lead 571, the windings of series-connected relays 572A, B, C, etc., lead 540, lead 518, the break contacts 502 of relay 656, lead 519, closed contacts 504 of relay 678, to the negative lead 520, thus operating relays 572A, B, C, etc., and closing their respective contacts 573.

Relay 572D, in operating, closed its contacts 573, completing a circuit for the next impulse from the Retainer, through lead 6135, representing the symbol "I," through closed make contacts 573 of relay 572D, lead 2377, lead 575, the winding of relay 576, lead 577, lead 547, break contacts 502 of relay 656, lead 519, break contacts 504 of relay 678, to the negative lead 520, thus operating relay 576.

Relay 576, in operating, locks up on its own make contacts 578, over a path from the positive lead 526, through break contacts 503 of relay 678, lead 527, break contacts 501 of relay 656, lead 535, closed contacts 578 of relay 576, the winding of relay 576, lead 547, break contacts 502 of relay 656, lead 519, break contacts 504 of relay 678, to the negative lead 520. The operation of relay 576 opens its contacts 507, opening the circuit through lead 571, and opening the operating circuit for series relays 572A, B, C, etc., causing them to fall back and open their respective contacts 573.

The operation of relay 576 closes a circuit from the positive lead 526, through break contacts 503 of relay 678, lead 527, break contacts 501 of relay 656, lead 535, lead 580, break contacts 508 of relay 588, closed contacts 579 of relay 576, lead 581, the windings of series-connected relays 582A, B, C, etc., lead 540, lead 518, break contacts 502 of relay 656, lead 519, break contacts 504 of relay 678, to the negative lead 520, thus operating series relays 582A, B, C, etc. and causing them to close their respective contacts 583.

Relay 582F, in operating, closes its contacts 583, and completes a circuit for the next impulse from the Retainer through lead 6134, representing the symbol "N," through closed contacts 583 of relay 582F, lead 2378, winding of relay 2379, lead 2380, lead 587, the winding of relay 588, lead 547, break contacts 502 of relay 656, lead 519, break contact 504 of relay 678, to the negative lead 520, thus operating relays 2379 and 588.

Operated relay 2379 closes its contacts 342, 2382 and 2383, but since no closed circuit is completed from lead 552, through contacts 342, 2382 and 2383 to its Vertical Area Group relays, nothing occurs at this time.

Operated relay 588 locks up over a circuit from the positive lead 526, break contacts 503 of relay 678, lead 527, break contacts 501 of relay 656, lead 535, closed contacts 593 of relay 588, winding of relay 588, lead 547, break contacts 502 of relay 656, lead 519, break contacts 504 of relay 678, to the negative lead 520. Relay 588, in operating, opens its break contacts 508, opening the circuit through lead 581 and causing the series-connected relays 582A, B, C, etc., to release and open their respective contacts 583.

Operated relay 588 closes its contacts 594, closing a circuit from the positive lead 526, through break contacts 503 of relay 678, lead 527, break contacts 501 of relay 656, lead 535, closed contacts 594 of relay 588, break contacts 509 of relay 601, lead 595, the series-connected relays 596A, B, C, etc., lead 540, break contacts 502 of relay 656, lead 519, break contacts 504 of relay 678, to the negative lead 520, thus operating series relays 596A, B, C, etc. and causing them to close their respective contacts 597.

It should be observed from the preceding operations that since relay 2379 is not necessary to differentiate the thorofare Robin Ave., Brooklyn from other thorofares, there is no usable circuit resulting at this time from its operation except to condition the Address Board for receiving the next symbol in the sequence.

Relay 596E, in operating, closes its contacts 597 and completes a circuit for the next impulse from the Retainer, through lead 2343 representing the symbol for Avenue, over a path through closed make contacts 597 of relay 596E, lead 2384, lead 600, the winding of relay 601, lead 547, break contacts 502 of relay 656, lead 519, break contacts 504 of relay 678, to the negative lead 520, thus operating relay 601.

Relay 601, in operating, locks up on its make contacts 602, over a circuit from the positive lead 526, through break contacts 503 of relay 678, lead 527, break contacts 501 of relay 656, lead 535, closed contacts 602 and winding of relay 601, lead 547, break contacts 502 of relay 656, lead 519, contacts 504 of relay 678, to the negative lead 520. Operated relay 601 opens its contacts 509, and opens the operating circuit through lead 595 for the series-connected relays 596A, B, C, etc., which fall back and open their respective contacts 597.

Relay 601, in operating, also closes its contacts 603, closing a circuit from the positive lead 526, break contacts 503 of relay 678, lead 527, break contacts 501 of relay 656, lead 535, break contacts 510 of relay 608, closed contacts 603 of relay 601, lead 604, the windings of series-connected relays 605A, B, C, etc., lead 540, lead 518, break contacts 502 of relay 656, lead 519, break contacts 504 of relay 678, to the negative lead 520, thus operating relays 605A, B, C, etc. and causing them to close their respective contacts 606.

Relay 605C, in operating, closes its contacts 606, completes the circuit for the next impulse from the Retainer, through lead 126 representing the symbol for Brooklyn, through lead 690, closed contacts 606 of relay 605C, lead 2385, lead 607, the winding of relay 608, lead 547, break contacts 502 of relay 656, lead 519, break contacts 504 of relay 678, to the negative lead 520, thus operating relay 608.

Relay 608, in operating, locks up on its make contacts 609 over a circuit from positive lead 526, break contacts 503 of relay 678, lead 527, break contacts 501 of relay 656, lead 535, closed contacts 609 and winding of relay 608, lead 547, break contacts 502 of relay 656, lead 519, break contacts 504 of relay 678, to the negative lead 520. When relay 608 operates, it opens its break contacts 510, opening the operating circuit through lead 604 for the series-connected relays 605A, B, C, etc., causing them to fall back and open their respective contacts 606.

The operation of relay 608 closes its make contacts 610, completing a circuit from positive lead 526, through break contacts 503 of relay 678, lead 527, break contacts 501 of relay 656, lead 535, closed contacts 610 of relay 608, break contacts 511 of relay 616, lead 611, the windings of series-connected relays 612A, B, C, etc., lead 540, break contacts 502 of relay 656, lead 519, contacts 504 of relay 678, to the negative lead 520, thus operating the relays 612A, B, C, etc., and closing their respective contacts 613.

The next impulse from the Retainer is through line 130 representing the dash symbol over a path through relay 656, to the negative lead 520, thus operating relay 656.

The operation of relay 656 opens its contacts 502 and 501, opening the operating circuits for all of the relays upon the Address Board except for the operated Vertical Area Grouping relays establishing Robin Ave., Brooklyn.

Relay 516C falls back opening its make contacts 340 and 339. Relay 2375 falls back opening its make contacts 338, 337, 336. Relay 532 falls back closing its break contacts 500. Relay 528 falls back opening its make contacts 534. Relay 546 falls back closing its break contacts 505 and opening its make contacts 553. Relay 565 falls back opening its make contacts 569, 570 and closing its break contacts 506. Relay 576 falls back opening its make contacts 578, 579 and closing its break contacts 507. Relay 588 falls back opening its make contacts 593, 594 and closing its break contacts 508. Relay 601 falls back opening its make contacts 602, 603 and closing its break contacts 509. Relay 608 falls back opening its make contacts 610, 609 and closing its break contacts 510. Relays 612A, B, C, etc., fall back opening their respective make contacts 613. The circuit through lead 130 is opened at the Retainer, causing the relay 656 to fall back and close its break contacts 591 and 502.

The Address Board is now neutral except for the operated and locked-up Vertical Area Grouping relays establishing Robin Ave., Brooklyn.

The second or intersecting thorofare of the point of arrival address, "O" Street, Brooklyn, is the next to be established on the Address Board.

The next impulse from the Retainer is through lead 122, representing the symbol "O," and this impulse passes through lead 562, through rectifier 2386, the winding of relay 516E, lead 517, break contacts 500 of relay 532, lead 518, break contacts 502 of relay 656, lead 519, contacts 504 of relay 678, to the negative lead 520, and operates relay 516E.

Relay 516E, in operating, locks up on its own closed contacts 2387 and 2388, over a circuit from the positive lead 526, through break contacts 503 of relay 678, lead 527, break contacts 501 of relay 656, lead 529, winding of relay 528, lead 530, lead 525, closed contacts 2387 of relay 516E, winding of relay 516E, closed contacts 2388, lead 523, winding of relay 532, lead 518, break contacts 502 of relay 656, lead 519, break contacts 504 of relay 678, to the negative lead 520, thus operating relays 528 and 532.

The operation of relay 516E closed a potential circuit through lead 2389.

The operation of relay 532 opens its contacts 500 preventing any relay 516A, B, C, etc., other than 516E from being operated because of the opened operating circuit at contacts 500.

When relay 528 operated, it closed its make contacts 534, completing a circuit traceable from the positive lead 526, break contacts 503 of relay 678, lead 527, break contacts 501 of relay 656, lead 535, lead 536, closed contacts 534 of relay 528, break contacts 505 of relay 546, lead 538, the windings of series-connected relays 539A, B, C, etc., lead 540, lead 518, break contacts 502 of relay 656, lead 519, break contacts 504 of relay 678, to the negative lead 520, thus operating relays 539A, B, C, etc., and causing them to close their respective contacts 541.

Relay 539C, in operating, closes its contacts 541 and closes a circuit for the next impulse from the Retainer, through lead 127, representing the symbol for Street, over a path through lead 670, closed contacts 541 of relay 539C, lead 559, winding of relay 560B, winding of relay 560A, winding of relay 560D, lead 2397, winding of relay 560C, lead 2398, lead 545, winding of relay 546, lead 547, break contacts 502 of relay 656, lead 519, break contacts 504 of relay 678, to the negative lead 520, thus operating relays 560A, B, C, and D and also 546.

The operation of relays 560A, C, D, do not complete any circuits which can be used at this time.

The operation of relay 560B closes contacts 2390, 2391 and 2392. The closing of contacts 2390 of relay 560B closes a circuit from the previously established potential circuit from lead 2389, over a path which includes the closed contacts 2390 of relay 560B, lead 2393, winding of relay 2399, lead 2400, lead 635, break contacts 504 of relay 678, to the negative lead 520, thus operating relay 2399.

Relay 2399, in operating, locks up over a circuit from the positive lead 526, break contacts 503 of relay 678, lead 527, lead 637, closed contacts 2401 of relay 2399, winding of relay 2399, lead 2400, lead 635, break contacts 504 of relay 678, to the negative lead 520.

The operation of relay 2399 completes a circuit to operate relay 2403 over a path from the positive lead 526, break contacts 503 of relay 678, lead 527, lead 637, lead 2402, winding of relay 2403, closed contacts 2404 of relay 2399, lead 2405, lead 635, break contacts 504 of relay 678, to the negative lead 520, thus operating relay 2403.

Relay 2403, in operating, closes its make contacts 2406, 2407, 2408, 2409, 2410, 2411, 2412 and 2413 and establishes the Vertical Area Grouping for "O" Street, Brooklyn.

The operation of relay 560B causes its contacts 2391 to close, and closes a circuit from the previously closed potential circuit through lead 2389, closed contacts 2391 of relay 560B, lead 2395, closed contacts 348 of relay 347, lead 2414 to a specific area on the Route Board.

The operation of relay 560B also closes its contacts 2392, and closes a circuit from the previously closed potential circuit through lead 2389, closed contacts 2392 of relay 560B, lead 2394, closed contacts 2390 of relay 2386, lead 2415 to the precise Within Area panel on the Information Board of operator #2.

The operation of relay 546 opens its break contacts 505, opening the operating circuit through lead 538 for the series-connected relays 539A, B, C, etc., causing them to fall back and open their respective contacts 541. The release of relay 539C and the opening of its contacts 541 opens the operating circuit for relays 560A, C, D, causing them to fall back and open their respective contacts.

The operation of relay 546 closes its make contacts 553, and completes a circuit from positive lead 526, through break contacts 503 of relay 678, lead 527, break contacts 501 of relay 656, lead 535, lead 554, break contacts 506 of relay 565, closed make contacts 553 of relay 546, lead 555, the windings of series-connected relays 56A, B, C, etc., lead 540, lead 518, break contacts 502 of relay 656, lead 519, break contacts 504 of relay 678, to the negative lead 520, thus operating relays 556A, B, C, etc., and causing them to close their respective contacts 557.

The operation of relays 556G closes a circuit for the next impulse from the Retainer, through lead 126 representing the symbol Brooklyn, through lead 690, closed contacts 557 of relay 556G, lead 2416, lead 564, winding of relay 565, lead 566, lead 547, break contacts 502 of relay 656, lead 519, break contacts 504 of relay 678, to the negative lead 520, thus operating relay 565.

Relay 565, in operating, locks up over a circuit from positive lead 526, through break contacts 503 of relay 678, lead 527, break contacts 501 of relay 656, lead 535, closed contacts 569 of relay 565, winding of relay 565, lead 547, break contacts 502 of relay 656, lead 519, break contacts 504 of relay 678, to the negative lead 520. Relay 565, in operating, opens its break contacts 506, opening the operating circuit through lead 555, for the series-connected relays 556A, B, C, etc., which fall back and open their respective contacts 557.

When relay 565 operates, it closes its make contacts 570, completing a circuit from the positive lead 526, through break contacts 503 of relay 678, lead 527, break contacts 501 of relay 656, lead 535, closed contacts 570 of relay 565, break contacts 507 of relay 576, lead 571, the series-connected relays 572A, B, C, etc., lead 540, lead 518, break contacts 502 of relay 656, lead 519, break contacts 504 of relay 678, to the negative lead 520, thus operating relays 572A, B, C, etc., and causing them to close their respective contacts 573.

The next impulse from the Retainer is through lead 131, representing the symbol "Period," and this impulse passes through the winding of relay 678 to the negative lead 520, thus operating relay 678.

The operation of relay 678 opens it break contacts 504 and 503, opening the operating circuits for all of the relays on the Address Board which fall back. Relay 560B falls back, opening its make contacts 2390, 2391 and 2392. Relay 532 falls back, closing its break contacts 500. Relay 2399 falls back, opening its make contacts 2404 and 2401. Relay 2403 falls back, opening its make contacts 2406, 2407, 2408, 2409, 2410, 2411, 2412, 2413. Relay 2362 falls back, opening its make contacts 346, 353. Relay 347 falls back, opening its make contacts 348, 349, 350, 351 and 352. Relay 528 falls back, opening its make contacts 534. Relay 543 falls back, opening its make contacts 553 and closing its break contacts 505. Relay 565 falls back, opening its make contacts 569 and 570 and closing its break contacts 506. Relays 572A, B, C, etc., fall back opening their respective make contacts 573.

The operating circuit for relay 678 is opened at the Retainer causing it to fall back and close its break contacts 503 and 504, conditioning the Address Board for the reinsertion of other addresses.

As mentioned previously, a circuit had been closed through closed make contacts 2338 of relay 2329 of the Vertical Area Group for Tab Street, Manhattan, over a path from lead 2362, closed contacts 2338, lead 2368, lead 2500 on the Route Board, winding of point of departure relay 2570 of area N21, lead 2572, lead 2770, winding of polarized relay 771, lead 772, winding of polarized relay 773, lead 774, closed break contacts 750, lead 775, closed break contacts 2582 of relay 2583, winding of relay 2580 to the negative lead 776, thus operating relays 2570, 771, 773 and 2570.

The operation of relay 2570 closes its make contacts 2577, 2571 and 2578, and locks itself up over its contacts 2571.

The operation of polarized relay 771 opened its break contacts 750, thus opening its own operating circuit.

The operation of polarized relay 773 closes its make contacts 784 for establishing the circuit for the point of arrival.

The operation of relay 2580, causes it to lock up over a path from lead 2368 from the Route Board, lead 2500, winding of relay 2570, lead 770, lead 2584, winding of relay 2580, closed contacts 2581 of relay 2580, winding of relay 2580, to the negative lead 776.

The operation of relay 2580 opens its break contacts 2585 preventing the operation of point of arrival relay 2586 of area N21 over an otherwise possible path from closed lead 2368, through lead 2501, winding of relay 2586, lead 796, winding of relay 5500, winding of polarized relay 797, its contacts 784, lead 798, winding of relay 2583, now open break contacts 2585 of relay 2580, to the negative lead 776. This prevents the operation of relay 2586 in area N21, and thus prevents the establishment of a point of arrival at this time.

When, as had been previously stated, an impulse over lead 131 representing the period symbol from the Retainer had operated its relay 678 in the Address Board, which in turn opened its contacts 503 and 504, and thus opened the operating circuit for relay 2329 in the Vertical Area Grouping for Tab Street and caused relay 2329 to fall back and open its closed contacts 2338, the circuit through lead 2368 was opened and opened the operating circuit for relay 2580 on the Route Board, causing relay 2580 to fall back and open its contacts 2581 and close its contacts 2585.

This allows the point of arrival address to be next established.

The operation of relay 2570 causes it to lock up over a circuit from positive lead 778, break contacts 751 of relay 896, lead 1778, winding of relay 2573, closed make contacts 2571 of relay 2570, winding of relay 2570, lead 783, to the negative lead 776, thus operating relay 2573 in area N21.

The operation of relay 2573 closes its make contacts 2592, 2574 and 2575, in turn closing potential circuits to the Information Boards of the operators.

When a circuit had been closed through closed make contacts 348 of relay 347 of the Vertical Area Grouping for Robin Ave., a circuit had been closed from lead 2395 on the Address Board, through closed contacts 348, lead 2414 to the Route Board, lead 200, winding of point of arrival relay 2587 of area N22, lead 2588, lead 796, winding of relay 5500, lead 796, winding of polarized relay 797, contacts 784, the winding of relay 2583, break contacts 2585 of relay 2580, to the negative lead 776, thus operating relays 2587, 5500, 797 and 2583. The operation of relay 5500 assures the energization of the within area panel circuit of the Information Board only when the point of arrival address has been established on the Route Board.

The operation of relay 2583 causes it to open its contacts 2582 and prevents at this time the operation of point of departure relay 2597 in area N22 by preventing a circuit which is still closed in the Route Board from being completed through lead 2414, lead 2598, the winding of relay 2597, lead 2599, lead 770, winding of polarized relay 771, lead 772, winding of polarized relay 773, lead 774, contacts 750, lead 775, now opened break contacts 2582 of relay 2583 (at this time retained open by relay 2583), winding of relay 2580, to the negative lead 776.

When, as had been previously shown, lead 131 from the Retainer representing the period symbol, had transmitted an impulse which had operated its relay 678, in turn, opening its contacts 503, 504 and opening the operating circuit for relay 347 of the Vertical Area Grouping for Robin Ave., Brooklyn, this relay 347 had fallen back and opened its make contacts 348, thus opening the circuit through lead 2414 to the Route Board, which opened the operating circuit for relay 2583 on the Route Board which now falls back, allowing its break contacts 2582 to close and opening its locking circuit contacts 2600.

The operation of polarized relay 797 opened its operating circuit at its break contacts 784 and closed its make contacts 750, thus conditioning the Route Board to receive another point of departure address.

The operation of point of arrival relay 2587 of area N22 closes its make contacts 2589 and 2590, and closes a potential circuit from the route travel lines upon the Route Board.

The operation of relay 2587 causes it to lock up over a path from the positive lead 778, break contacts 751 of relay 896, lead 1778, winding of relay 2587, closed make contacts 2593, winding of relay 2594, lead 2595, lead 783, to the negative lead 776. The operation of relay 2594 in area N22 closes its make contacts 2601 and 2602 and 2603 closing potential circuits to the Information Board of the operators.

The closing of make contacts 2577 and 2578 by point of departure relay 2570 of area N21, and the closing of make contacts 2589 and 2590 by point of arrival relay 2587 of area N22 closed a circuit through the route travel lines on the Route Board, over a path from the positive lead 778, lead 789, through rectifier 790, lead 2032, closed contacts 2577 of relay 2570, lead 2601, through express route line 813, through rectifier 6813, through local route line 2612, through rectifier 2611, break contacts 3071 of relay 3072, contacts 2609 of relay 2610, lead 814, lead 2613, break contacts 2614 of relay 2623, lead 2615, winding of relay 2616 of Transfer point #1, lead 2617, through rectifier 2618, break contacts 2619 of relay 2622, lead 2620, winding of relay 2621, winding of relay 860, through rectifier 2014, winding of relay 2042, route line 999, break contacts 759 of relay 766, through rectifier 2013, winding of slow operating relay 861, break contacts 2022 of relay 2023, break contacts 4008 of relay 4009, through the continuation of route line 999, break contacts 4008 of fast operating relay 4009, contacts 846 of relay 876, break contacts 845 of slow operating relay 852, rectifier 897, winding of relay 2065, break contacts 896 of slow operating relay 877, break contacts 870 of relay 1870, route line 818, winding of relay 4006, line 818, break contacts 2048 of relay 2024, break contacts 2627 of relay 2030, rectifier 2628, lead 2629, winding of relay 2605, lead 2630, break contacts 2631 of relay 2632, break contacts 2633 of relay 2634, lead 821, lead 2635, closed make contacts 2589 of relay 2587, lead 7813, rectifier 809, lead 810, the winding of timed relay 811, break contacts 751 of relay 896, lead 1778, winding of relay 2573, make contacts 2571 of relay 2570, winding of relay 2570, lead 783, to the negative lead 776, thus operating relays 2616, 2621, 860, 2042, 861, 4006, 2065, 2605 and 811.

Relay 2616, in operating, closes its make contacts 2624, 2625 and 2626, closing potential circuits at these contacts to the information panels on the various operators' Information Boards.

Relay 2621, in operating, closes its contacts but no closed circuit is effected through these contacts at this time.

Relays 860 and 2042, in operating, close make contacts 2040 and 2041 respectively, closing a circuit from route travel line 999, through make contacts 2040, the winding of relay 2857, make contacts 2041, back over route travel line 999, thus operating relay 2857.

Relay 2857, in operating, opens its contacts 1857 and 2636 preventing a back-track circuit from route travel line 999 through these closed make contacts 1857 and 2636. Relay 861, in operating, opens its break contacts 2044, 760, 2050 and 2051, preventing a double circuit or back-track circuit through these contacts.

Relay 2065, in operating, closes its make contacts 2066, 2067 and 2068, closing a potential circuit through these contacts to an information panel on each of the operators' Information Boards.

Relay 2605, in operating, closed its respective contacts 2606, 2607 and 2608, closing a potential circuit through these contacts to the information panels on the Information Boards.

Relay 4006, in operating, opened its contacts 4007 and thus prevents a back-track circuit through travel line 819.

Relay 811 is a timed relay allowing the Route Board mechanism to condition itself before its make contacts 895, 6895 and 6896 are closed, after which a circuit is closed from lead 140 from the Route Board and Information Board control mechanisms of operator #2, over a path through closed make contacts 6895 of relay 811, the middle winding of relay 896, lead 6897, the closed contacts 2575 of relay 2573, to the Information Board of operator #2, thus also operating relay 896.

Relay 896, in operating, opens its break contacts 751, opening the circuits of all the operated relays upon the Route Board, which now release. Relay 2570 falls back, opening its make contacts 2571, 2577, 2578. Relay 2573 falls back, opening its make contacts 2502, 2574 and 2575. Relay 2587 falls back, opening its make contacts 2593, 2589 and 2590. Relay 2594 falls back, opening its make contacts 2601, 2602 and 2603. Relay 860 falls back, opening its make contacts 2040. Relay 2042 falls back, opening its make contacts 2041. Relay 2621 falls back, opening its make contacts. Relay 861 falls back, closing its break contacts 2044, 760, 2050 and 2051. Relay 2616 falls back, closing its break contacts 2044, 760, 2050 and 2051. Relay 2616 falls back and opens its make contacts 2624, 2625 and 2626. Relay 2065 falls back, opening its make contacts 2066, 2067 and 2068. Relay 4006 falls back and closes its break contacts 4007. Relay 2605 falls back, opening its make contacts 2606, 2607 and 2608. Relay 811 falls back, opening its make contacts 895, 6895 and 6896. Relay 896 falls back, closing its break contacts 751. Relay 2857 falls back, closing contacts 1857 and 2636.

The Route Board is now neutralized and ready to receive another address including a point of departure address and a point of arrival address.

The station of embarkation for the point of departure address Tab Street—Manhattan and Bridle Ave., is illuminated on the Information Board through a circuit closed from the Route Board in area N21 over lead 6579 which operates relay 7579. This relay, in operating, locks up over its own contacts and energizes lamp 7580. This lamp illuminates the station Broadway and Main Streets for operator #2 which station is nearest the point of departure address.

The operation of relay 2616 at Transfer point #1 in the Route Board closed a circuit over lead 6646 which operates relay 4010, in operating, locks up and energizes lamp 4014, in turn, illuminating the transfer station 59th Street—to D train.

The operation of relay 2065 at Transfer point #4 in the Route Board closed a circuit over lead 6899 which for the Information Board for operator #2 corresponds to lead 899 extending to the Information Board for operator #1. The circuit closed through lead 6899 energizes and operates relay 4011 which, in turn, locks up and energizes lamp 4015. The lighting of lamp 4015 illuminates the transfer station 4th Street—To F train.

The operation of relay 2605 at Transfer point

#5 in the Route Board closed a circuit over lead 6642 which operated relay 7642 in the Information Board for operator #2. Relay 7642, in operating, locks up and energizes lamp 7643, in turn, illuminating the transfer station Delancey Street—From Jamaica—BMT.

The operation of point of arrival relay 2594 in area N22 on the Route Board closed a circuit over lead 2643 which operates relay 6643 in the Information Board for operator #2. Relay 6643, in operating, locks up and lights up lamp 7644, in turn, illuminating the station of deembarkation Robin Ave.—M Street.

The operation of Vertical Area Group relay 2386 in the Route Board for Robin Ave. in Brooklyn closed a circuit over lead 2415 which extends to the specific Within Area information panel for operator #2 and operates relay 7415 in series with its lamp, in turn, locking up over its own contacts and illuminating a street intersection two blocks south of the Point corresponding to the center of the area of the point of arrival address. Since the station of de-embarkation is always located at the Point or center of the Within Area panel, the direction to be taken to reach the precise point of arrival address is readily observed by the operator.

When the foregoing lamps light up on the information panel, the operator will give the following specific instructions to the caller in order to enable him to travel between the point of departure address and the point of arrival address: "Take the Broadway IRT Express—Uptown at Broadway and Main Street, change to the uptown local at 42nd Street, change at 59th Street to the D train 6th Ave. line going toward Brooklyn, then change at 4th Street to F train, 6th Ave. line, going downtown, then change at Delancey Street to the from Jamaica train on the BMT line, and disembark at Robin Ave.—M Street Station. After disembarking, walk two blocks south to Robin Ave. and O Street, which is the intersection corresponding to the precise point of arrival."

After these instructions are passed on to the calling subscriber, operator #2 will depress her off-key K, which, in turn, opens the locking circuits for all of the locked-up relays on the Information Board control mechanism, and causes these relays to fall back. The entire system is now restored to normal, and is ready to receive another address.

Relay 2610 on the Route Board with its break contacts 2609, and relay 824 on the Route Board with its break contacts 825 serve to prevent a double circuit through the local route lines 814 and 822, with express route line 813, and local route lines 823 and 816 with express route line 815. This condition may occur when there are established both a point of departure and a point of arrival above and below the Transfer points #1 and #2 on the Broadway route lines (where the transfer points are on a local station stop such as on the 59th St. station stop on the Broadway IRT line), assuming that the affected areas are both on Broadway.

Let it be assumed that the point of departure has been set at area N21 by means of relay 2570 locking its own circuit through contacts 2571 and closing the potential positive circuit to the route lines by closing its make contacts 2577 and 2578. Let it also be assumed that the point of arrival has been set at area N11 by relay 768 locking its own circuit by closing its make contacts 3085 and by closing its make contacts 785 and 786, thus closing a potential circuit from the route lines.

With these assumptions, a circuit will be closed over a path traceable through closed make contacts 2577 of relay 2570, lead 2601, express route line 813 and rectifier 6813, winding of relay 2610 on express route line 813, rectifier 2020, route line 813 continued, local route line 822, closed make contacts 786 of relay 768, thus operating relay 2610.

Relay 2610, in operating, opens its break contact 2609 and prevents a double circuit from closed make contacts 2577 and 2578 of relay 2570, through lead 2601, through express route line 813, through local route line 2612, through rectifier 2611, through break contacts 3071 of relay 3072, now opened contacts 2609 of relay 2610, through route local line 814, through express route line 813, through local route line 822, through closed make contacts 786 of relay 768.

Relay 3072 prevents a double circuit in the situation where both areas are on the same side of the Transfer points 1 and 2. Let it be assumed that area N21 is the point of departure and area N19 is the point of arrival. When area N21 is set, its relay 2570 will be locked up and a circuit closed at its make contacts 2571, and a potential circuit to the route travel lines is closed at its contacts 2577, 2578. When area N19 is set, its relay 3075 will be locked up and a circuit will be closed from its closed contacts 3073 and 3074 from the route travel lines. A closed circuit will then be made through closed contacts 2577 of relay 2570, lead 2601, route express line 813, local route line 822, winding of relay 3072, lead 3077, closed make contacts 3074 of relay 3075, to operate relay 3072.

Relay 3072, in operating, opens its break contacts 3071 preventing another circuit from closed contacts 2577 of relay 2570, over a path through lead 2601, express route line 813, lead 2612, rectifier 2611, through now opened contacts 3071 of relay 3072, break contacts 2609 of relay 2610, local route line 814, contacts 2614 on relay 2623, winding of relay 2616 of Transfer point #1, rectifier 2618, break contacts 2619 of relay 2622, winding of relay 2621, winding of relay 860, break contacts 2636 of relay 2857 of Transfer point #2, rectifier 3078, break contacts 3079 of relay 3080, lead 823, and through closed contacts 3073 of relay 3075 of area N19.

It will be understood that although a modification of a conventional type of keyboard has been described in setting up the addresses, the invention is not limited to any type of keyboard, since if desired a keyboard of the well known steno-type can be employed. Moreover, where a very well known destination or point of departure address is involved, such as, for example, the Yankee Stadium or the Polo Grounds in New York city, the system can be so arranged that the depression of keys bearing the indicia Yankee Stadium or Polo Grounds will establish the desired circuits without the necessity for typing up precise address information.

What is claimed is:

1. In a route indicating system employing a keyboard arranged similarly to a typewriter keyboard, and wherein separate circuits are assigned to the different regions of the area being serviced, the method of automatically indicating the travel route to be taken between two terminal addresses, which includes the following steps: (1) typing up on the keyboard each terminal address by depressing a plurality of keys representative of the name and number of the thorofare or the name of the thorofare and its intersecting street, (2) storing each symbol or character of the addresses set up on the keyboard, (3) converting the stored symbols of each address into a plurality of electrical pulses which occur sequentially after the completion of step 1, (4) selectively operating in response to said pulses those electrical circuits which are assigned to the regions in which the terminal addresses lie and other circuits which indicate the travel route, and (5) selectively illuminating information furnishing the precise travel route to be taken between said terminal addresses.

2. The method of automatically indicating a travel route to be taken between two terminal addresses, which includes the following steps: (1) setting up the terminal addresses on a keyboard, (2) storing each symbol of the addresses set up on the keyboard, (3) converting the stored symbols of each address into a plurality of electrical pulses which occur sequentially in the same order in which the symbols were originally stored, (4) causing said pulses to selectively operate circuits which are assigned to the geographical areas of said terminal addresses and other circuits which are assigned to the route to be taken between said addresses, and (5) and selectively illuminating information furnishing the precise travel route to be taken between said terminal addresses.

3. An information indicating system comprising a keyboard-operated storage circuit, said keyboard having a plurality of keys each of which is an electrical switch, said storage circuit having a plurality of electrical devices for storing information corresponding to the question set up by the depression of the keys on the keyboard, said storage circuit also having means for causing said electrical devices to operate sequentially in a predetermined order in response to actuation of said keys, an electrically-operated information display board having a plurality of symbols and a plurality of illuminating devices associated with said symbols for indicating the resultant information corresponding to the answer to the question set up on said keyboard, electrical circuits between said storage circuit and said information display board for receiving the information stored in said storage circuit and for selectively operating only those illuminating devices in the display board which supply the resultant information corresponding to the answer to the question, and a switching element in circuit with said storage circuit and adapted to be operated after the information corresponding to the complete question has been stored for causing said storage circuit to transmit the stored information, constituting the stored question, to said electrical circuits.

4. An information indicating system comprising a plurality of operator's positions located at a central office and each including a keyboard-operated storage circuit, each storage circuit having a plurality of elements for storing a point of departure and a geographically spaced point of arrival address set up by the depression of the keys on the associated keyboard, individual electrically-operated information display boards for each of said operator's positions, each display board having a plurality of symbols and a plurality of illuminating devices associated with said symbols for indicating the route to be taken between said addresses as set up on the keyboard of the same operator's position, electrical circuits in common to all operator's positions for receiving electrical pulses corresponding to the addresses stored in any one operator's position and for selectively operating certain illuminating devices in the display board of that one operator's position, and means for preventing more than one storage circuit at a time from emptying its stored addresses into said common electrical circuits.

5. An information indicating system comprising a plurality of operator's positions each including a keyboard-operated storage circuit, each storage circuit having a plurality of elements for storing signals corresponding to a pair of geographically spaced terminal addresses set up by the depression of the keys on the associated keyboard, individual electrically-operated information display boards for said operator's positions, each display board having a plurality of symbols and a plurality of illuminating devices associated with said symbols for indicating the route to be taken between said addresses as set up on the keyboard of the same operator's position, electrical circuits in common to all operator's positions for receiving electrical pulses corresponding to the terminal addresses stored in any one operator's position and for selectively operating certain illuminating devices in the display board of that one operator's position, and means for preventing more than one storage circuit at a time from emptying its stored signals into said common electrical circuits, means for enabling the different storage circuits in the different operators' positions to sequentially empty the signals stored in said storage circuits into said common electrical circuits, and means adapted, when started, to execute a time control function of a duration sufficient to enable the common electrical circuits to fulfill its functions after receiving the signals from one storage circuit before receiving signals from another storage circuit.

6. In combination, a series of electrical devices, a keyboard, means responsive to the actuation of the keys on said keyboard for causing the sequential operation of said electrical devices in an invariable relative order, a switch, means responsive to the actuation of said switch for causing said devices to release sequentially in the same invariable relative order in which they were originally operated, and means individual to and in circuit with each of said devices for assuring its continued operation until after said switch is actuated.

7. In combination, a series of banks of relays, a keyboard, circuits for causing only a single relay in a bank to operate the lock-up upon the actuation of a key on said keyboard and different relays in different banks to operate and lock-up sequentially in an invariable relative order in response to the sequential actuation of the keys on said keyboard, a set-key, and other relays individual to said banks and sequentially responsive to a single operation of said set-key for sequentially releasing the locked-up relays in said banks of relays.

8. In combination, a keyboard-operated storage system having a series of electrical circuits and a keyboard, means including sequence-in relays responsive to the actuation of the keys on said keyboard for causing the sequential operation of said electrical circuits, a sequence-out relay individual to each of said electrical circuits for assuring the sequential release of said electrical circuits in the order in which they were originally operated, other similar keyboard-operated storage systems, a plurality of set-keys one for each storage system, connections between the set-key for each storage system and said sequence-out relays in that storage system for causing the operation of said sequence-out relays upon the actuation of the associated set key, to thereby release the electrical circuits of that storage system in the aforementioned predetermined order, and interlocking means in circuit with said set-keys for preventing the electrical circuits of more than one storage system from releasing at the same time.

9. In combination, a keyboard-operated storage system having a series of electrical circuits and a keyboard, means responsive to the actuation of the keys on said keyboard for causing the sequential operation of said electrical circuits in an invariable relative order, elements individual to said electrical circuits for assuring the sequential release of said electrical circuits in the order in which they were originally operated, other similar keyboard-operated storage systems, a common electrical utilization circuit connected to all of said storage systems and adapted to receive electrical pulses therefrom, a plurality of set keys one for each storage system, connections between the set-key for each storage system and said elements in that storage system for causing the operation of said elements upon the actuation of the associated set key, to thereby release the electrical circuits of that storage system in the aforementioned predetermined order, and interlocking means in circuit with said set-keys for preventing the electrical circuits of more than one storage system from releasing at the same time, and means adapted, when started, to execute a time control function of a duration sufficient to enable the complete utilization of the pulses from one storage system before receiving the pulses from another storage system.

10. In combination, a series of banks of relays, a keyboard, circuits for causing only a single relay in a bank to operate and lock-up upon the actuation of a key on said keyboard and different relays in different banks to operate and lock-up sequentially in an invariable relative order in response to the sequential actuation of the keys on said keyboard, a set-key, and other relays individual to said banks and sequentially responsive to a single operation of said set-key for sequentially releasing the locked-up relays in said banks of relays in the same order in which they were originally operated, the relays in said banks having contacts, a utilization circuit connected to said contacts, said other relays being adapted to operate over circuit paths which extend through said contacts to said utilization circuit.

11. A system for indicating the travel route to be taken between two geographically spaced terminal addresses, comprising a keyboard for setting up the addresses, a storage circuit electrically operated from said keyboard for storing the symbols or characters typed up on the keyboard in the order in which the keys on the keyboard are depressed, an address board circuit for receiving the stored symbols or characters from said storage circuit and for operating specific circuits which correspond to the regions or areas containing said addresses, a manually operable transfer circuit including a switch for enabling said storage circuit to empty its stored symbols or characters into said address board circuit in the form of electrical pulses and in the same order as the symbols or characters were originally stored, a route board circuit responsive to the operation of said specific circuits in the address board for selectively establishing circuits which indicate the travel route to be taken between said addresses, an information board connected to said route board and controlled thereby, said information board having a plurality of lamps for illuminating information indicating said travel route.

12. An electrical route indicating system for indicating the travel route to be taken between two geographically spaced terminal addresses, comprising a plan representing a transport system, electrical display devices representing on said plan a plurality of individual points within said system and the conveyance to be used at said points, an electrical storage circuit under control of a keyboard arranged similarly to a typewriter keyboard for storing a plurality of symbols representative of each of the terminal addresses set up on the keyboard, said keyboard having a plurality of individual self-restoring keys representative of different letters of the alphabet and also having a plurality of special purpose self-restoring keys, circuits responsive to the output from said storage circuit for selectively operating those display devices which indicate the mode of travel and the points of transfer on the route to be taken between said two terminal addresses, switch-actuated mechanism for causing energy representative of the symbols stored in said storage circuit to flow into said last circuits, key-operated means for restoring to normal said storage circuit without affecting said other circuits, and additional key-operated means for controlling said other circuits to thereby restore said display devices to normal without affecting said storage circuit.

13. An electrical route indicating system for indicating the travel route to be taken between two geographically spaced terminal addresses, comprising a plan representing a transport system, electrical display devices representing on said plan a plurality of individual points within said system and the conveyance to be used at said points, an electrical storage circuit under control of a keyboard arranged similarly to a typewriter keyboard for storing the symbols of the terminal addresses set up on the keyboard, said keyboard having a plurality of individual self-restoring keys representative of different letters of the alphabet and also having a plurality of special purpose self-restoring keys, said storage circuit including as many banks of electrical elements as there are characters required to set up the greatest number of combinations for both terminal addresses, said storage circuit also including means for operating said banks of elements in sequence in an invariable relative order in accordance with the sequential operation of the keys on said keyboard, circuits responsive to the output from said storage circuit for selectively operating those display devices which indicate the mode of travel and the points of transfer on the route to be taken between said two terminal addresses, and switch-actuated mechanism for causing enerby representative of symbols stored in said storage circuit to flow into said last circuits.

14. An electrical route indicating system for indicating the travel route to be taken between two geographically spaced terminal addresses, comprising a plan representing a transport system, electrical display devices representing on said plan a plurality of individual points within said system and the conveyance to be used at said points, an electrical storage circuit under control of a keyboard arranged similarly to a typewriter keyboard for storing the symbols of the terminal addresses set up on the keyboard, said keyboard having a plurality of individual self-restoring keys representative of different letters of the alphabet and also having a plurality of special purpose self-restoring keys, circuits responsive to the output from said storage circuit and including unidirectional current flow elements for selectively operating only those display devices which indicate the mode of travel and the points of transfer on the route to be taken between said two terminal addresses, and switch-actuated mechanism for causing energy representative of the symbols stored in said storage circuit to flow into said last circuits.

15. An electrical route indicating system for indicating the travel route to be taken between two geographically spaced terminal addresses, comprising a plan representing a transport system, electrical display devices representing a transport system, electrical display devices representing on said plan a plurality of individual points within said system and the conveyance to be used at said points, a keyboard-operated electrical storage circuit for storing the symbols of the terminal addresses set up on the keyboard, said keyboard having a plurality of individual self-restoring keys representative of different letters of the alphabet and also having a plurality of special purpose self-restoring keys, said storage circuit including as many banks of relays as there are characters required to set up the greatest number of combinations for both terminal addresses, said storage circuit also including means for operating said banks of relays in sequence in an invariable relative order in accordance with the sequential operation of the keys on said keyboard, circuits responsive to the output from said storage circuit and including unidirectional current flow elements for selectively operating only those display devices which indicate the mode of travel and the points of transfer on the route to be taken between said two terminal addresses, and switch-actuated mechanism for causing energy representative of the symbols stored in said storage circuit to flow into said last circuits.

16. An electrical route indicating system comprising a plan representing a public conveyance transport system, a plurality of indicia identifying respectively the different stations on said system, individual lamps for illuminating said indicia, keyboard-operated means for selectively energizing at least two of said lamps in response to the actuation of those keys on the keyboard which represent the terminal areas between which it is desired to find the travel route, said two lamps illuminating the indicia for the stations nearest said terminal areas, and a within-area panel having a reference point corresponding to the nearest terminal station and a plurality of illuminating devices physically disposed around said reference point to indicate different precise locations around said reference point, and means for selectively energizing one of said devices whenever the indicia of the terminal station corresponding to the reference point is illuminated.

17. In a travel route information system, a plurality of individual keyboard-operated address information storage circuits, each storage circuit including a plurality of elements electrically operable in an invariable relative order in response to the depression of the keys on its associated keyboard, the keyboard for each storage circuit including separate keys for the letters of the alphabet and the numerals 1 to 9, a common utilization circuit for said storage circuits, a plurality of leads extending from the elements in each storage circuit to said common utilization circuit, each lead being assigned to a particular information symbol to be passed along to said utilization circuit whereby there are as many leads in each storage circuit as there are symbols to be stored in said storage circuit, and key responsive means in common to all of said storage circuits for preventing more than one storage circuit at a time from emptying its address information into said utilization circuit.

18. In a travel route indicating system, a keyboard-operated storage system having means for storing symbols representative of the address information at any random speed at which the keys of the keyboard are depressed, a utilization circuit, a signal transfer circuit connected between said utilization circuit and said storage system, means in said transfer circuit responsive to the operation of a manually operable switch after said storage system has stored said symbols for causing the storage system to empty the stored symbols at a uniform rate said utilization circuit including a plurality of illuminating devices selectively responsive to the signals from said storage system.

HJALMAR AHO.

REFERENCES CITED

The following references are of record in the file of this patent:

UNITED STATES PATENTS

| Number | Name | Date |
|---|---|---|
| Re. 22,723 | Kleinschmidt | Feb. 19, 1946 |
| 607,239 | Hildburgh | July 12, 1898 |
| 1,547,964 | Semat | July 28, 1925 |
| 1,943,654 | Collings | Jan. 16, 1934 |
| 2,010,338 | White | Aug. 6, 1935 |
| 2,046,381 | Hicks | July 7, 1936 |
| 2,053,774 | Hershey | Sept. 8, 1936 |
| 2,183,941 | Pruden | Dec. 19, 1939 |
| 2,225,680 | Boswau | Dec. 24, 1940 |
| 2,259,561 | Hailes | Oct. 21, 1941 |
| 2,265,351 | Coley | Dec. 9, 1941 |
| 2,276,607 | Bruno | Mar. 17, 1942 |
| 2,317,995 | Krum | May 4, 1943 |
| 2,383,805 | Korneke | Aug. 28, 1945 |